(12) United States Patent
Rogers et al.

(10) Patent No.: US 12,472,507 B2
(45) Date of Patent: Nov. 18, 2025

(54) INTEGRATING INTELLIGENT SENSING AND SAFETY ASSURANCE INTO ORGANIC MATTER PROCESSING APPARATUS

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Ismail Uluturk, San Francisco, CA (US); Karthik Kumsi Vadiraja, San Jose, CA (US); Nikhil Ramish, San Francisco, CA (US); Jaideep Singh Chavan, Mountain View, CA (US); Tom Ayotte, Hayward, CA (US); Chen Li, Fremont, CA (US); Kelly Joan Veit, San Francisco, CA (US); Pinida Jan Moolsintong, San Francisco, CA (US); Geoffrey Becker Hill, Seattle, WA (US)

(73) Assignee: Chewie Labs LLC, San Bruno, CA (US)

( * ) Notice: Subject to any disclaimer, the term of this patent is extended or adjusted under 35 U.S.C. 154(b) by 713 days.

(21) Appl. No.: 17/897,518

(22) Filed: Aug. 29, 2022

(65) Prior Publication Data

US 2023/0083366 A1 Mar. 16, 2023

Related U.S. Application Data

(60) Provisional application No. 63/392,412, filed on Jul. 26, 2022, provisional application No. 63/239,852, filed on Sep. 1, 2021.

(51) Int. Cl.
*B02C 25/00* (2006.01)
*G06F 1/3246* (2019.01)

(52) U.S. Cl.
CPC .......... *B02C 25/00* (2013.01); *G06F 1/3246* (2013.01)

(58) Field of Classification Search
CPC ....... B02C 25/00; B02C 18/188; B02C 18/14; B02C 18/0084; G06F 1/3246; C05F 17/00; C05F 17/964; C05F 17/971; C05F 17/979

See application file for complete search history.

(56) References Cited

U.S. PATENT DOCUMENTS

| 5,340,536 A | 8/1994 | Datar et al. |
| 5,634,600 A | 6/1997 | Kubota et al. |

(Continued)

FOREIGN PATENT DOCUMENTS

| EP | 0791568 | 8/1997 | |
| GB | 2533643 B | * 5/2017 | ............. B02C 23/18 |

(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.

(Continued)

*Primary Examiner* — Michael L Hobbs
(74) *Attorney, Agent, or Firm* — Van Court & Aldridge LLP

(57) ABSTRACT

Embodiments disclosed herein provide an organic matter processing apparatus and method for the use thereof to convert organic matter into a ground and desiccated product. This can be accomplished using a bucket assembly that can grind, paddle, and heat organic matter contained therein. An air treatment system is provided to treat the air interacting with the organic matter. The processing apparatus is outfitted (Continued)

with sensors and switches that provide feedback data to a processing unit and a safety monitor. The feedback data is used to monitor the operating conditions and the status of various components, as well as control the operation of the processing apparatus. In addition, the feedback data is used to enforce a safety protocol.

26 Claims, 44 Drawing Sheets

(56) References Cited

U.S. PATENT DOCUMENTS

| | | |
|---|---|---|
| 6,150,939 A | 11/2000 | Lin |
| 7,240,865 B2 | 7/2007 | Choi |
| 9,308,535 B2 | 4/2016 | Delgado et al. |
| 9,597,620 B2 | 3/2017 | Verdegan et al. |
| 9,895,726 B1 | 2/2018 | Atkinson et al. |
| 10,065,196 B1 | 9/2018 | Tran et al. |
| 10,906,046 B2 | 2/2021 | Crepeau et al. |
| 11,241,694 B2 | 2/2022 | Crepeau et al. |
| 11,278,908 B2 | 3/2022 | Crepeau et al. |
| 11,389,804 B2 | 7/2022 | Hayman et al. |
| 11,541,397 B2 | 1/2023 | Crepeau et al. |
| 2003/0155228 A1 | 8/2003 | Mills |
| 2004/0175303 A1 | 9/2004 | Lin |
| 2004/0251339 A1 | 12/2004 | Strutz |
| 2004/0265197 A1 | 12/2004 | Lin |
| 2007/0190212 A1 | 8/2007 | Lee |
| 2008/0067270 A1 | 3/2008 | Strutz |
| 2009/0113791 A1 | 5/2009 | Bertin et al. |
| 2009/0200180 A1 | 8/2009 | Capote |
| 2010/0140248 A1 | 6/2010 | Yi et al. |
| 2011/0020184 A1 | 1/2011 | Sun |
| 2011/0062259 A1 | 3/2011 | Gregoire |
| 2011/0151553 A1 | 6/2011 | Cruson et al. |
| 2012/0021504 A1 | 1/2012 | Bradlee |
| 2012/0034350 A1 | 2/2012 | Gard et al. |
| 2012/0298658 A1 | 11/2012 | Bosetti et al. |
| 2013/0217111 A1 | 8/2013 | Chang |
| 2013/0263786 A1 | 10/2013 | Meisel, III et al. |
| 2014/0117126 A1 | 5/2014 | Ceru et al. |
| 2015/0031123 A1* | 1/2015 | Delgado ............... C05F 17/907 435/290.4 |
| 2015/0196920 A1 | 7/2015 | Celli et al. |
| 2015/0376882 A1 | 12/2015 | Park |
| 2016/0022112 A1 | 1/2016 | Davenport |
| 2016/0207845 A1 | 7/2016 | Delgado et al. |
| 2016/0295906 A1 | 10/2016 | Jacobsen et al. |
| 2017/0197857 A1 | 7/2017 | Whitener et al. |
| 2017/0226466 A1 | 8/2017 | Grillo et al. |
| 2017/0260111 A1 | 9/2017 | Maghas et al. |
| 2017/0349501 A1 | 12/2017 | Buzruk |
| 2018/0093814 A1 | 4/2018 | Espinosa |
| 2018/0148391 A1 | 5/2018 | Ashbee et al. |
| 2019/0030544 A1 | 1/2019 | Kratzer, III et al. |
| 2019/0083989 A1 | 3/2019 | Tran et al. |
| 2019/0152698 A1 | 5/2019 | Zhao |
| 2020/0001389 A1 | 1/2020 | Ryan et al. |
| 2020/0147617 A1 | 5/2020 | Atkinson et al. |
| 2020/0148604 A1 | 5/2020 | Atkinson et al. |
| 2020/0353473 A1 | 11/2020 | Hayman et al. |
| 2020/0353474 A1 | 11/2020 | Crepeau et al. |
| 2021/0154676 A1 | 5/2021 | Crepeau et al. |
| 2022/0242799 A1 | 8/2022 | Ying et al. |
| 2022/0347693 A1 | 11/2022 | Hayman et al. |
| 2023/0142555 A1 | 5/2023 | Hotte et al. |
| 2023/0149939 A1 | 5/2023 | Crepeau et al. |

FOREIGN PATENT DOCUMENTS

| | | |
|---|---|---|
| JP | 2002-001262 | 1/2002 |
| JP | 2004-216253 | 12/2004 |
| JP | 2006255592 | 9/2006 |
| KR | 19980047631 | 9/1998 |
| KR | 100692243 | 3/2007 |
| KR | 100694645 B1 | 3/2007 |
| KR | 100694646 B1 | 3/2007 |
| KR | 20090123375 | 12/2009 |
| KR | 101017615 B1 | 2/2011 |
| KR | 101017616 B1 | 2/2011 |
| KR | 101053035 B1 | 8/2011 |
| KR | 101187381 | 10/2012 |
| KR | 101332453 | 11/2013 |
| KR | 101461608 | 12/2014 |
| KR | 20150112689 | 10/2015 |
| KR | 102474495 B1 | 4/2016 |
| KR | 20160044110 | 4/2016 |
| KR | 101866863 | 6/2018 |
| KR | 300966490 S | 7/2018 |
| KR | 101882829 B1 | 8/2018 |
| KR | 101884662 B1 | 8/2018 |
| KR | 101921624 B1 | 11/2018 |
| KR | 101941620 | 1/2019 |
| KR | 301095230 S | 2/2021 |
| KR | 301109396 S | 5/2021 |
| KR | 301109397 S | 5/2021 |
| KR | 301109403 S | 5/2021 |
| KR | 301109404 S | 5/2021 |
| KR | 301154947 S | 3/2022 |
| KR | 301140601 S | 12/2022 |
| KR | 301202238 S | 2/2023 |
| KR | 1020230060939 A | 5/2023 |
| KR | 301223966 S | 11/2023 |
| WO | WO2008030997 | 3/2008 |
| WO | WO2009157744 | 12/2009 |
| WO | WO2015182929 | 3/2015 |
| WO | WO2016060290 | 4/2016 |
| WO | WO2016102947 | 6/2016 |
| WO | WO2017083944 | 5/2017 |
| WO | WO2022055212 A1 | 3/2022 |

OTHER PUBLICATIONS

Zhu, "Food Waste Drum Sieve Design"; Mar. 26, 2015; Technology, Communication and Transport; Sovonia University of Applied Sciences.

* cited by examiner

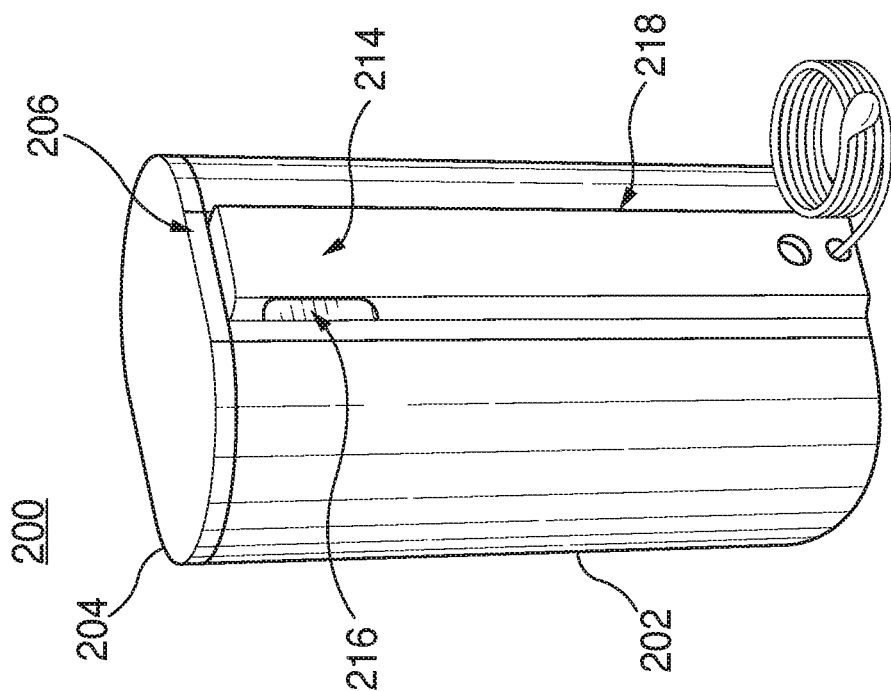
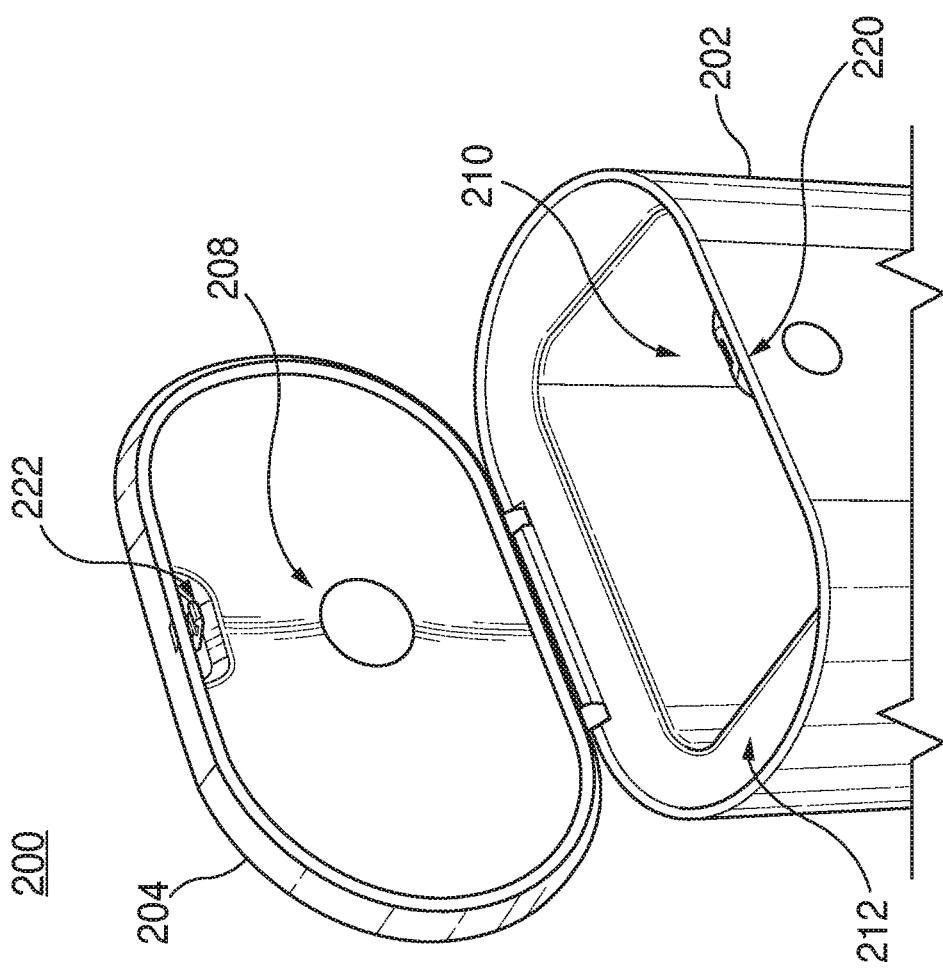

| Component or Sensor | Function | Data |
|---|---|---|
| Lid Switch 1 | Detects Lid Open/Close Status | Open/Close Status |
| Lid Switch 1 | Detects Lid Open/Close Status | Open/Close Status |
| Latch Switch | Detects Latch Lock/Unlock Status | Lock/Unlock Status |
| Lid VOC Sensor & Temp/RH Sensor | Monitors VOCs, Temperature, and Relative Humidity in the Lid | VOCs contained in air being forced into the bucket assembly and the temperature and relative humidity of that air |
| Lid Fan | Pulls in ambient air from outside of the OMPA and forces the (optionally heated) ambient air into the bucket assembly | Fan Speed; Electrical Characteristics (e.g., current consumption, power consumption) |
| Lid Heater | Heats ambient air supplied by the Lid Fan | Heater Temperature |
| Lid Motor | Opens and Closes the Lid | Electrical Characteristics (e.g., current consumption, power consumption) |
| Encoder | Monitors position of the motor | Position of the lid angle |
| Physical Safety Switch | Detects Lid Open/Close Status | Open/Close Status |

FIG. 15A

| Component or Sensor | Function | Data |
|---|---|---|
| ATS Inlet VOC Sensor & Temp/RH Sensor | Monitors VOCs, Temperature, and Relative Humidity of untreated air entering the Air Treatment System | VOCs contained in untreated air being pulled from the bucket assembly into the ATS and the temperature and relative humidity of that untreated air |
| ATS Fan | Pulls untreated air from the bucket assembly into the ATS | Fan Speed; Electrical Characteristics (e.g., current consumption, power consumption) |
| ATS Outlet VOC Sensor & Temp/RH Sensor | Monitors VOCs, Temperature, and Relative Humidity in the Lid | VOCs contained in treated air being forced out of the OMPA and the temperature and relative humidity of that treated air |
| Mass Sensors | Each sensor provides a mass value | Mass values |
| PCB with Mass Processor and Temp Sensor | Aggregates mass values received from the Mass Sensors and applies temperature correction based on the temperature sensor | Temperature corrected mass values |

FIG. 15B

| Component or Sensor | Function | Data |
|---|---|---|
| Bucket Heater | Heats Bucket | Electrical Characteristics |
| Temperature Sensor 1 | Monitors temperature of the bucket | Temperature of the Bucket Heater |
| Temperature Sensor 2 | Monitors temperature of the bucket | Temperature of the Bucket Heater |
| Cutoff Switch(es) | Thermal based switch that disables the bucket heater | If cutoff switch(es) are tripped, the trip event is represented by an electrical characteristic |
| Bucket Motor | Drives the cut and paddle assembly | Motor speed; Motor torque; Electrical Characteristics |
| Electrical Interface | Provides power to the heater and signal connectivity for the the temperature sensors 1 and 2 | Electrical Characteristics; Bucket Present Determination |
| Bucket Present Switch | Detects whether the bucket is inserted or removed | Bucket is inserted into the OMPA or is removed |
| Blade Position Sensor | Detects position of the cut and paddle assembly | Position of the cut and paddle assembly |

FIG. 15C

| Safety Monitor Specified Feedback |
|---|
| Lid Switch 1 |
| Temperature Sensor 1 |
| Bucket Present Switch |
| Physical Safety Switch |

1710

| MCU Specified Feedback | |
|---|---|
| Latch Switch | Lid Switch 2 |
| Temperature Sensor 2 | Bucket Motor and its Electrical Characteristics |
| Lid VOC Sensor & Temp/RH Sensor | Lid Motor and its Electrical Characteristics |
| ATS Input VOC Sensor & Temp/RH Sensor | Lid Motor Encoder |
| ATS Output VOC Sensor & Temp/RH Sensor | Electrical Connection and its Electrical Characteristics |
| Pedal Sensor Switch | Lid Fan and its Electrical Characteristics |
| Mass Sensors and PCB with Mass Processor and Temperature Sensor | Lid Heater and its Electrical Characteristics |
| Position Sensor | ATS Fan and its Electrical Characteristics |

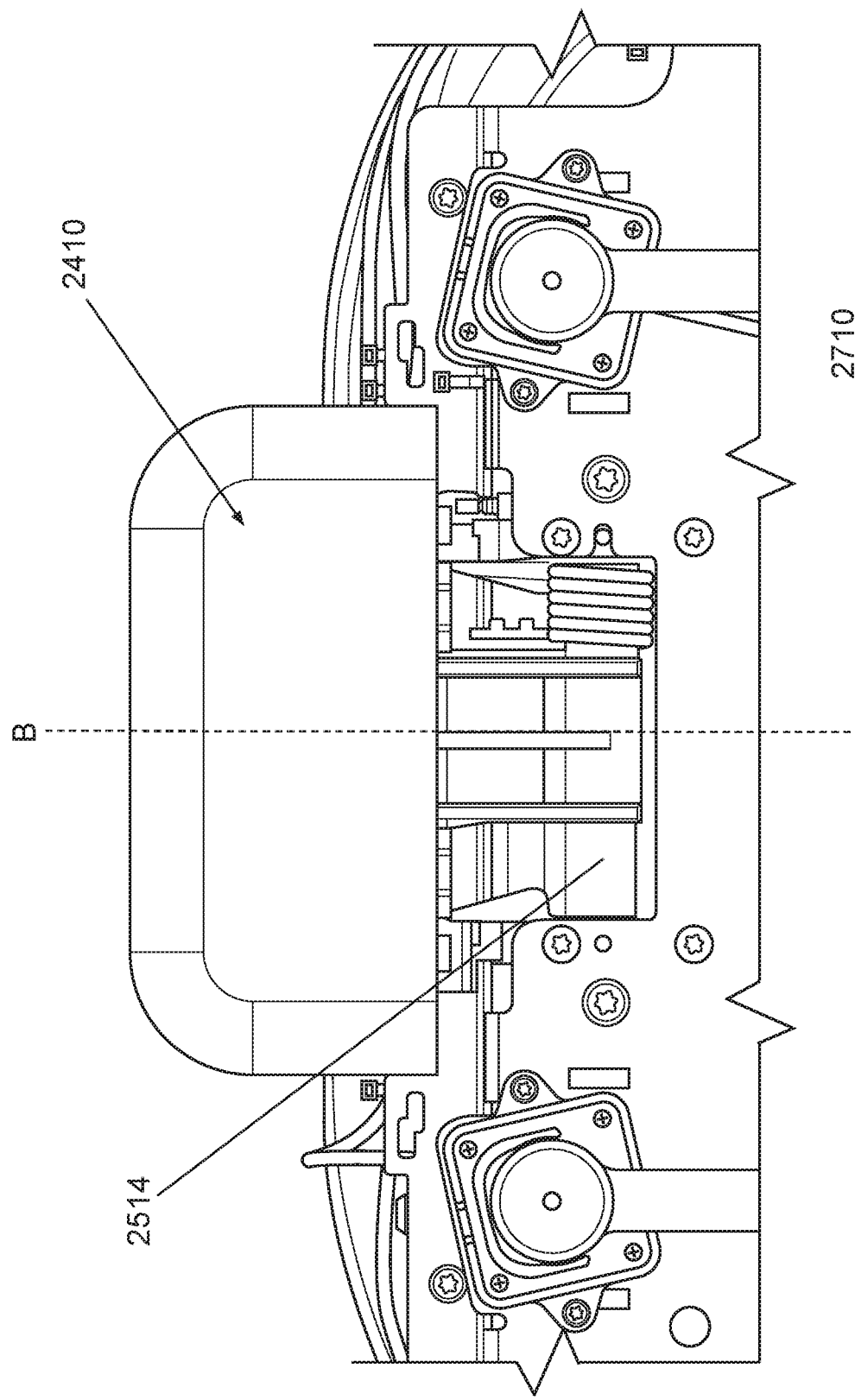

INTEGRATING INTELLIGENT SENSING AND SAFETY ASSURANCE INTO ORGANIC MATTER PROCESSING APPARATUS

CROSS-REFERENCE TO A RELATED APPLICATION

This patent application claims the benefit of U.S. Provisional Application No. 63/239,852, filed Sep. 1, 2021, and U.S. Provisional Application No. 63/392,412, filed Jul. 26, 2022, the disclosures of which are incorporated herein in their entireties.

TECHNICAL FIELD

This patent specification relates to an organic matter processing apparatus, and more particularly to data acquisition for processing organic matter and for safely operating the apparatus.

BACKGROUND

Individuals, groups of people, and families living and eating in their respective residences generate resident-based organic matter that degrades into methane—a powerful greenhouse gas—without oxygen. These harmful emissions can be avoided by diverting the resident-based organic matter such as uneaten or spoiled food from landfills. One way to divert food and other organic matter from landfills is to process the food and other organic matter into a partially desiccated product using a conventional food recycler or food grinder. These conventional food recyclers and food grinders, however, are not efficient in processing food and other organic matter.

The food industry (e.g., restaurants, grocery stores, etc.) has followed many traditional paths for handling food. For example, the food industry strives to prevent food from non-use or spoil by attempting to sell the food according to a first in first out method where older product is prioritized by sale. If the food is fit for consumption, such food may be provided to a food bank or charity. If the food is unfit for human consumption, but is safe for use as animal feed, the food can be used as animal feed. If the food is unsafe for human consumption and for animal feed, the food can be turned into compost. If the food is unsuitable for composting, the food may be converted into energy through anaerobic digestion (e.g., microorganisms convert the food into a biogas). Lastly, the food can be sent to a landfill if any of the other options are not viable. Each of these paths, however, require transportation of non-desiccated (and relatively heavy) food matter to the appropriate facilities. The volume and weight of the food may require use of heavy internal combustion engine trucks—thereby further contributing to greenhouse gas—to transport the food. In addition, the heavy trucks further increase wear and tear on roads and other infrastructure, and require cost for manpower and equipment.

Accordingly, what is needed is a residential or consumer oriented organic matter processing apparatus capable of efficiently and consistently rendering an end product that is curated according to specific properties to enable lightweight and lowcost shipping of the end product for use in a regulatory approved upcycling process.

BRIEF SUMMARY

Embodiments disclosed herein provide an organic matter processing apparatus and method for the use thereof to convert organic matter into a ground and desiccated product. This can be accomplished using a bucket assembly that can grind, paddle, and heat organic matter contained therein. An air treatment system is provided to treat the air interacting with the organic matter. The processing apparatus is outfitted with sensors and switches that provide feedback data to a processing unit and a safety monitor. The feedback data is used to monitor the operating conditions and the status of various components, as well as control the operation of the processing apparatus. In addition, the feedback data is used to enforce a safety protocol.

A further understanding of the nature and advantages of the embodiments discussed herein may be realized by reference to the remaining portions of the specification and the drawings.

BRIEF DESCRIPTION OF THE DRAWINGS

FIG. 2A includes a perspective view of an organic matter processing apparatus that includes a lid in a closed position according to embodiment.

FIG. 2B includes another perspective view of the organic matter processing apparatus with the lid in an open position according to embodiment.

FIGS. 15A-15C show a table identifying a component or sensor, its function, and its associated data according to an embodiment.

FIG. 17A shows tables illustrating the first subset of feedback designated specifically to the safety monitor and second subset of feedback designated specifically to the MCU according to an embodiment.

FIG. 27A shows an illustrative bottom view of a pedal assembly when viewed from the bottom of the OMPA according to an embodiment.

Figure 1:
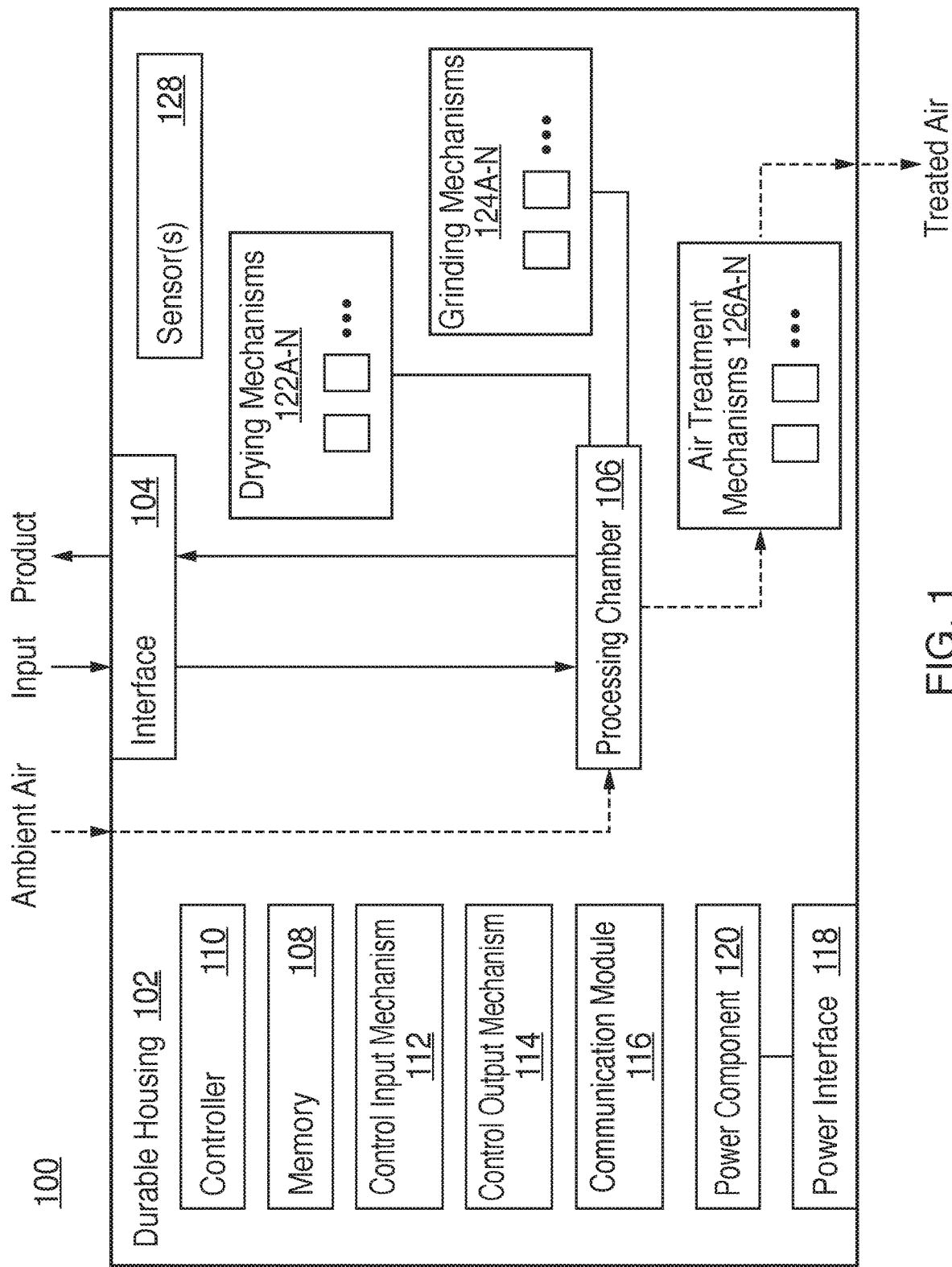
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Overview of Organic Matter Processing Apparatus

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may to request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Figure 3A:
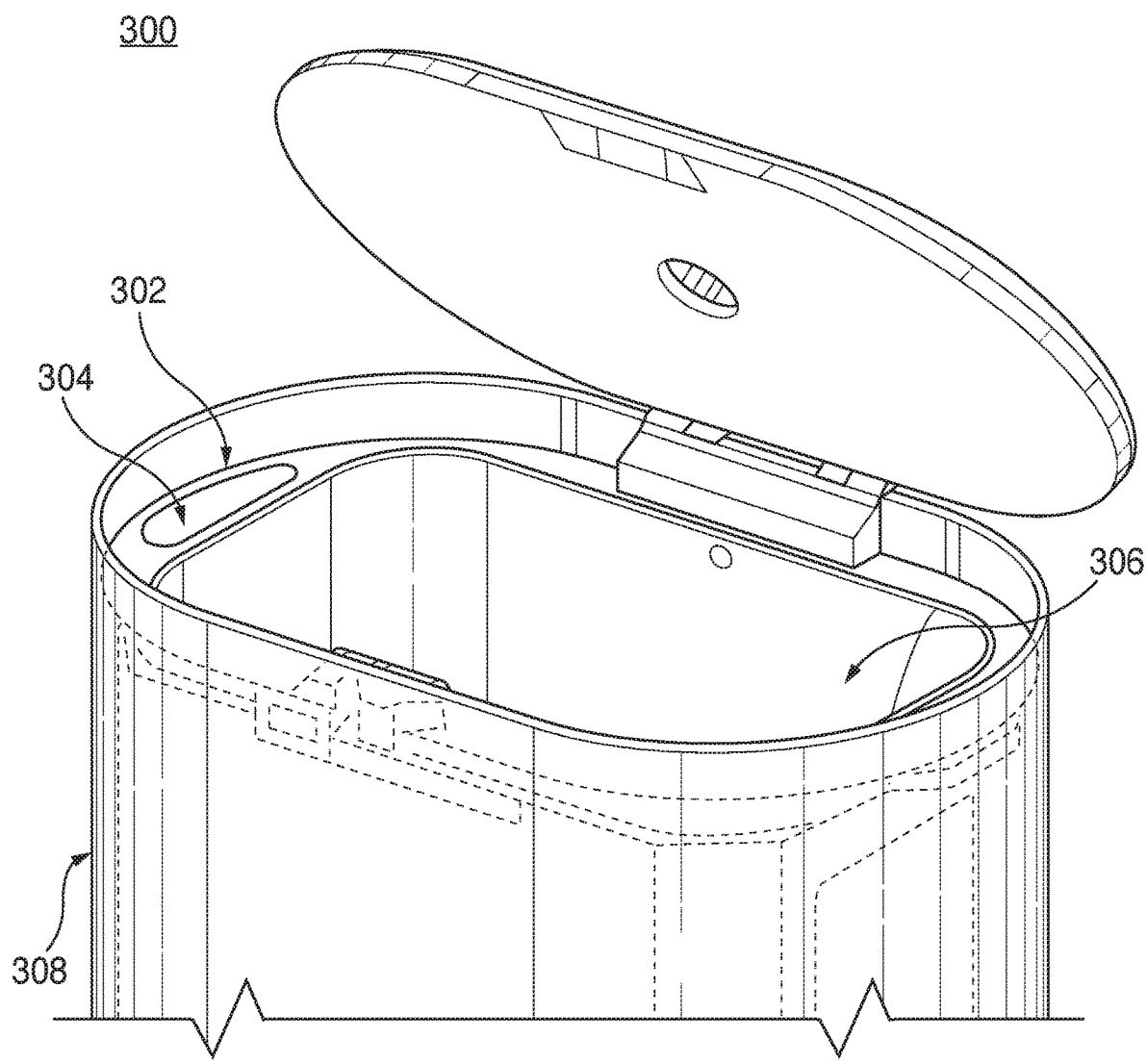
FIG. 3A includes a perspective view of an organic matter processing apparatus without its bezel to illustrate one possible location for the exhaust hood that extends over an intake vent according to embodiment.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptable is installed within the cavity, the used-air intake vent is positioned proximate to an upper end of the receptacle. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

Figure 3B:
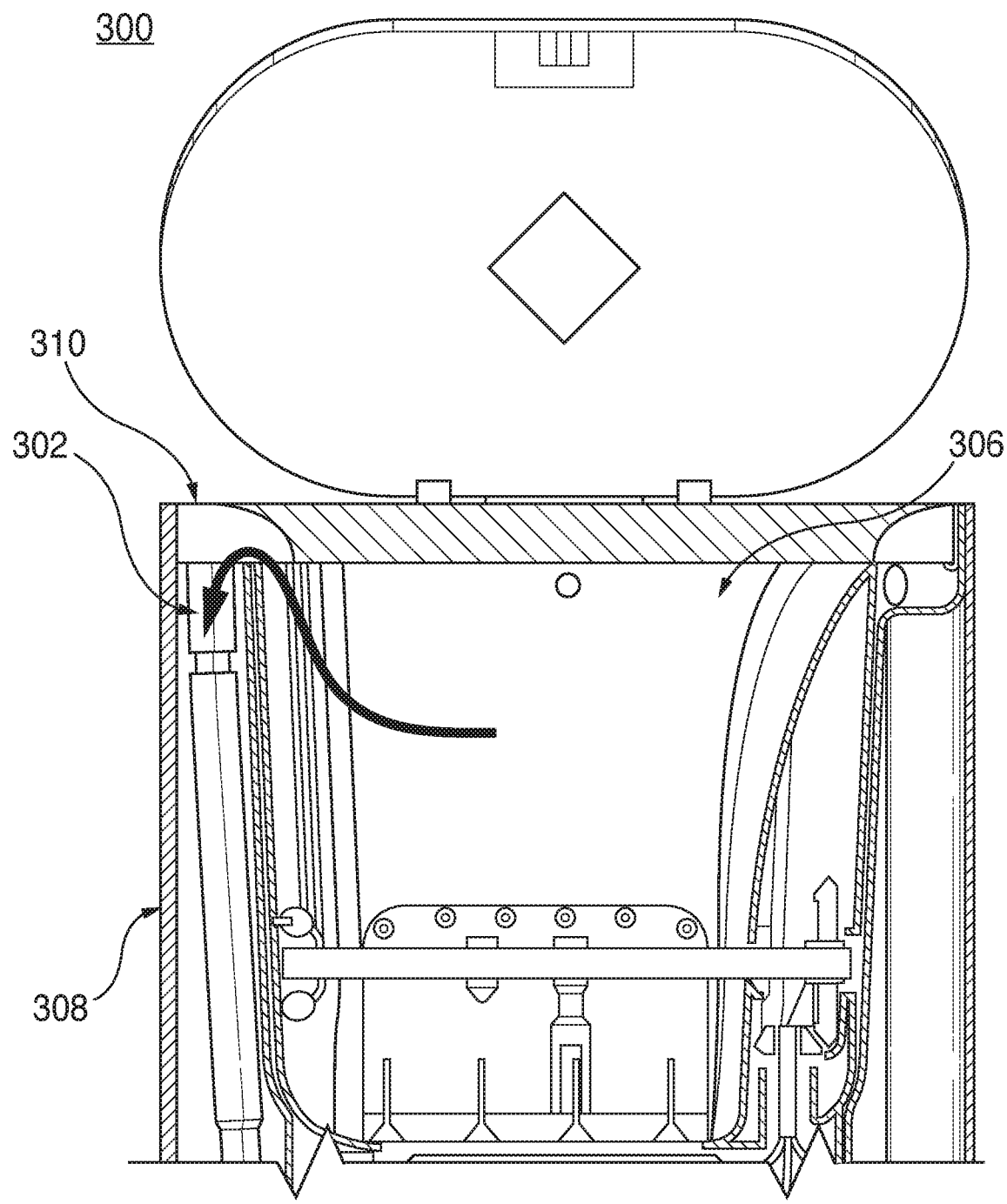
FIG. 3B illustrates how, when the bezel is installed in the organic matter processing apparatus, air in the processing chamber can flow underneath the bezel into a space above the edge of the receptacle and then downward through the used-air intake vent according to embodiment.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

Figure 4A:
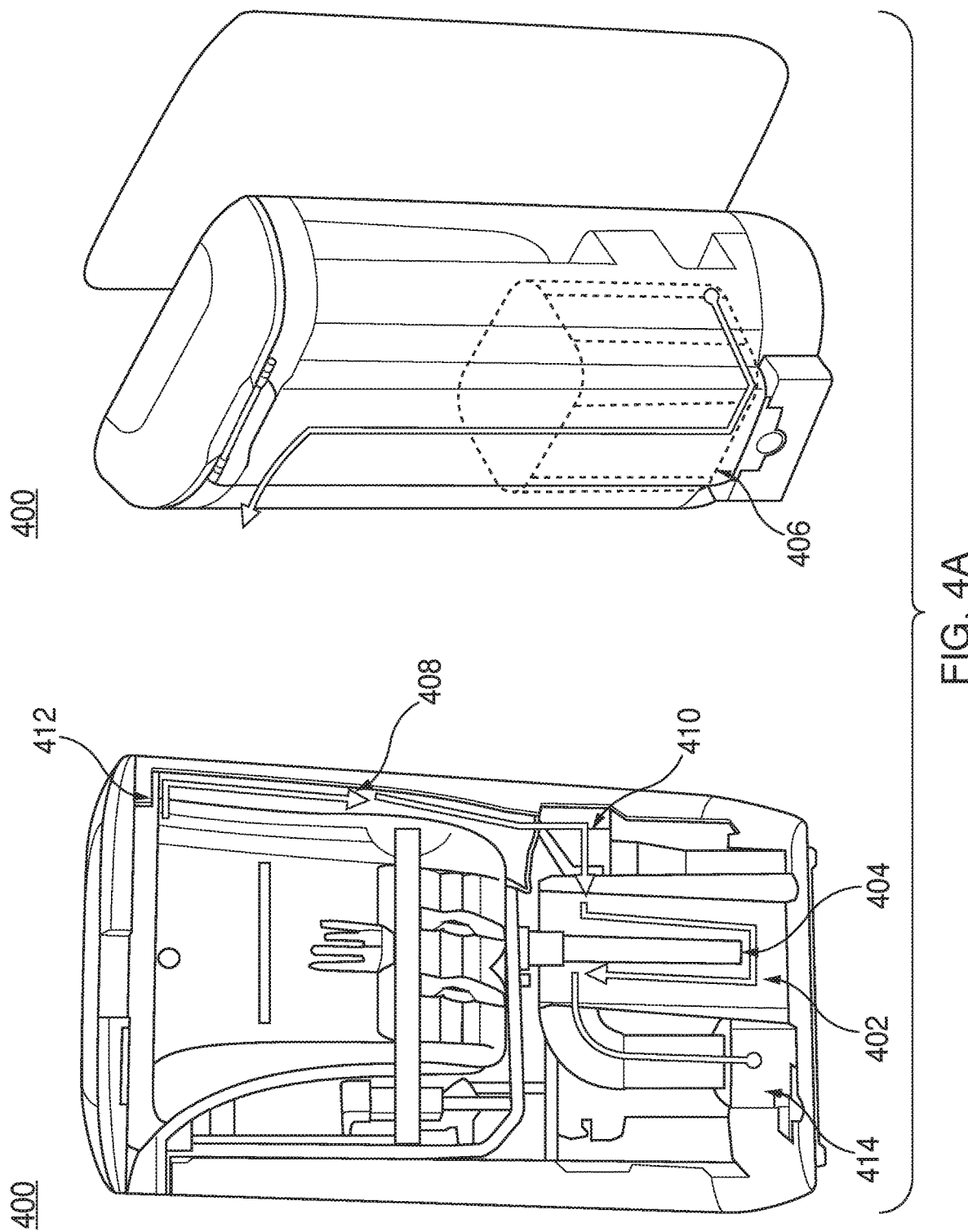
FIG. 4A includes isometric front and rear perspective views of an organic matter processing apparatus where the durable housing is transparent to show additional details according to embodiment.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
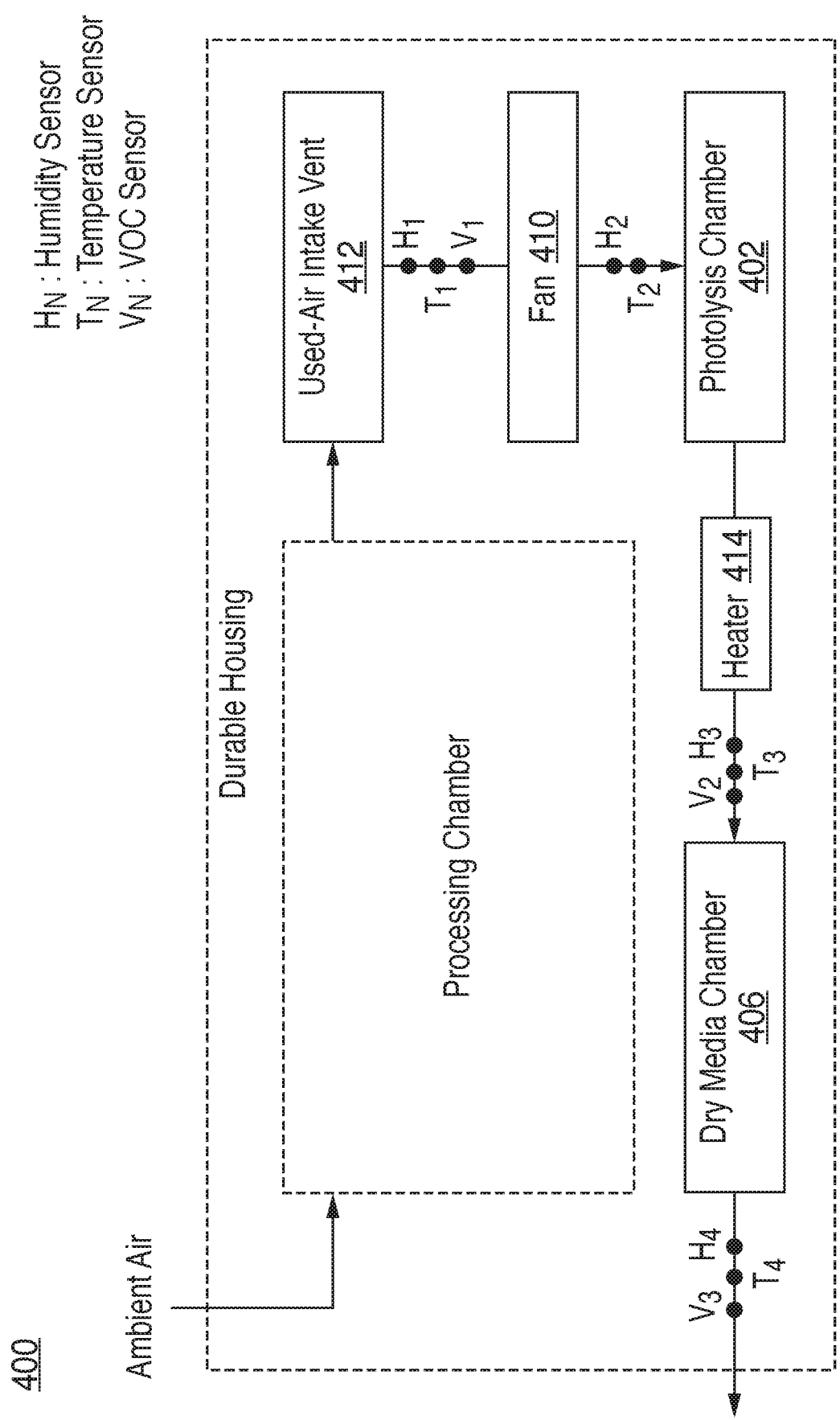
FIG. 4B includes a conceptual diagram that identifies possible locations for different types of sensors according to embodiment.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide ($CO_2$), carbon monoxide (CO), dioxygen ($O_2$), hydrogen sulfide ($H_2S$), nitrogen dioxide ($NO_2$), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber), For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
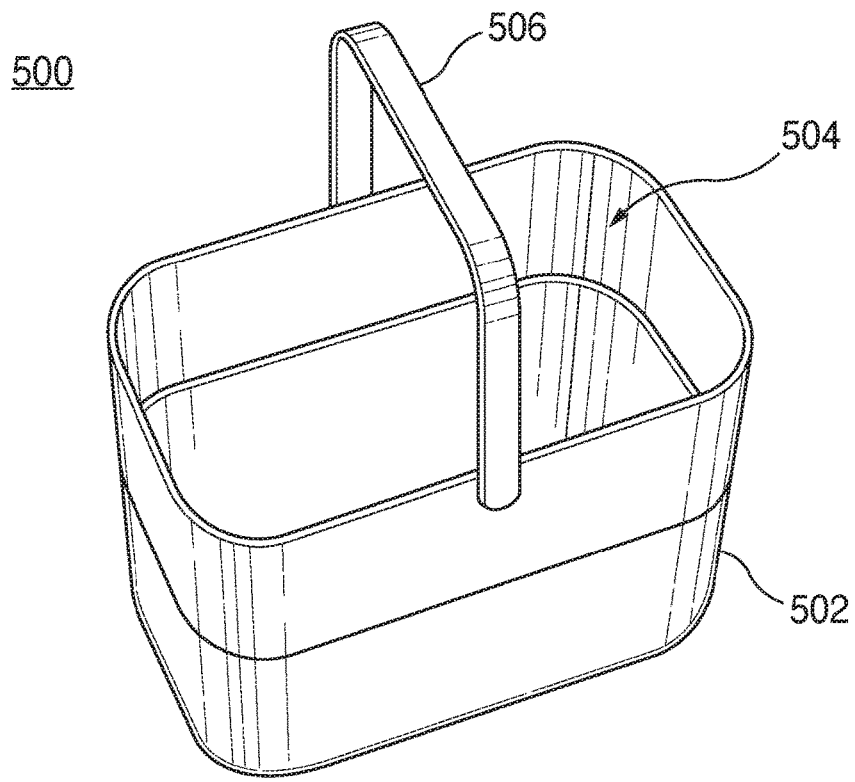
FIG. 5 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
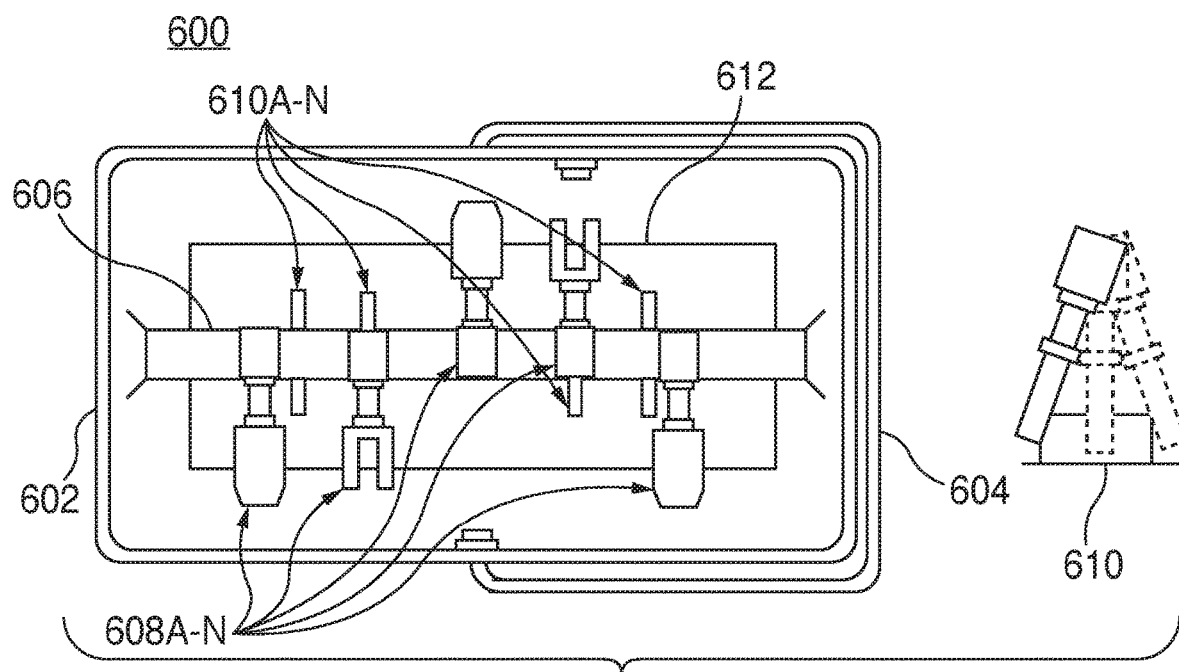
FIG. 6 includes a top view of a processing chamber that includes a bucket with a handle pivotably connected thereto according to embodiment.

FIG. 6 includes a top view of a processing chamber 600 that includes a bucket 602 with a handle 604 pivotably connected thereto. As mentioned above, a OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar—though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
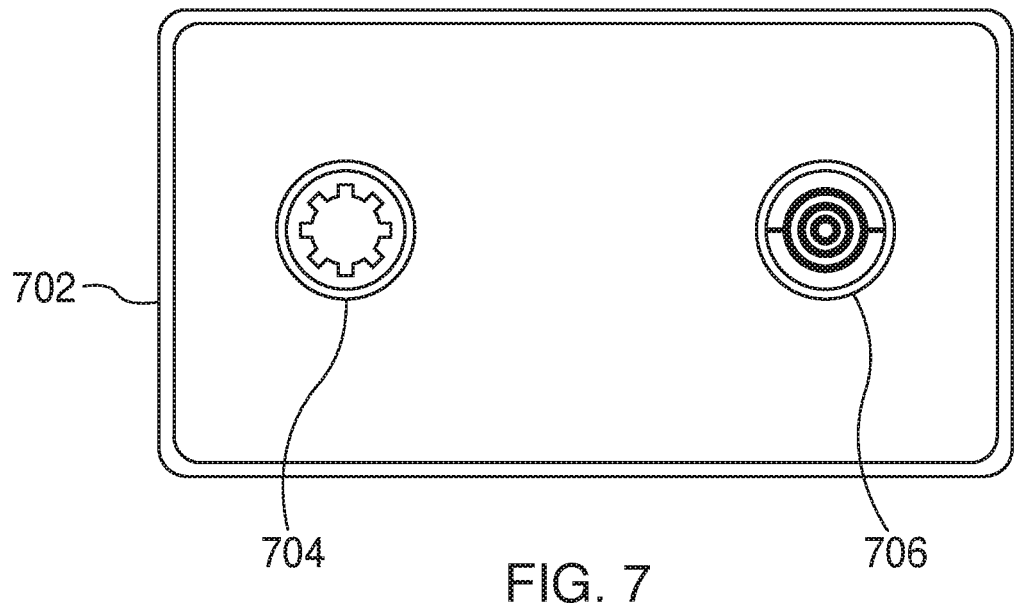
FIG. 7 includes a top view of a cavity in a durable housing that includes a mechanical coupling and an electrical coupling according to embodiment.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Figure 8:
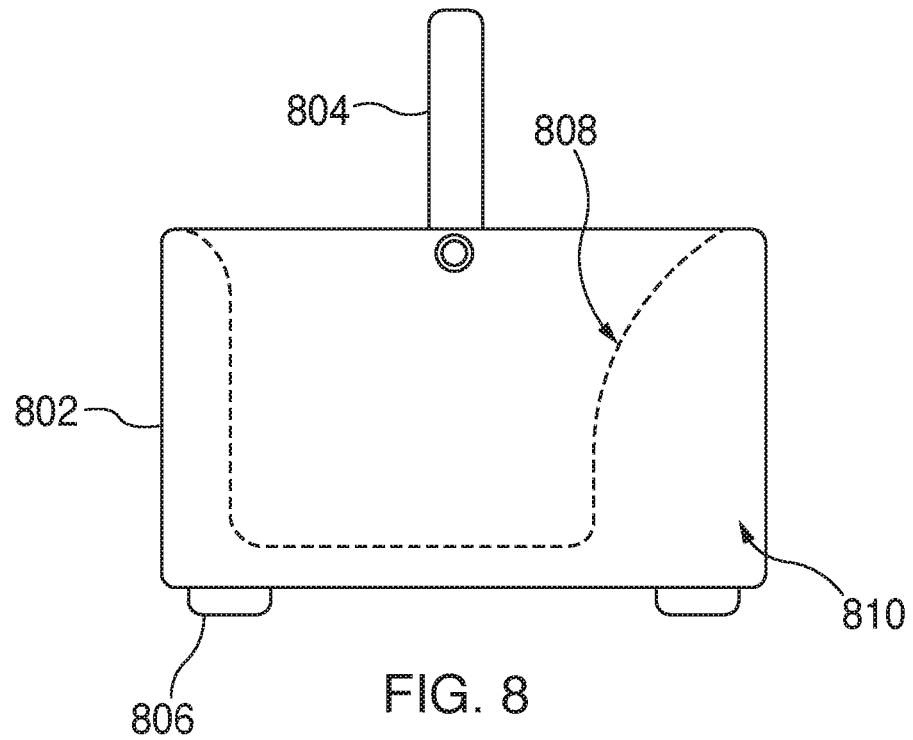
FIG. 8 includes a side profile view of a bucket in which organic matter can be deposited according to embodiment.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
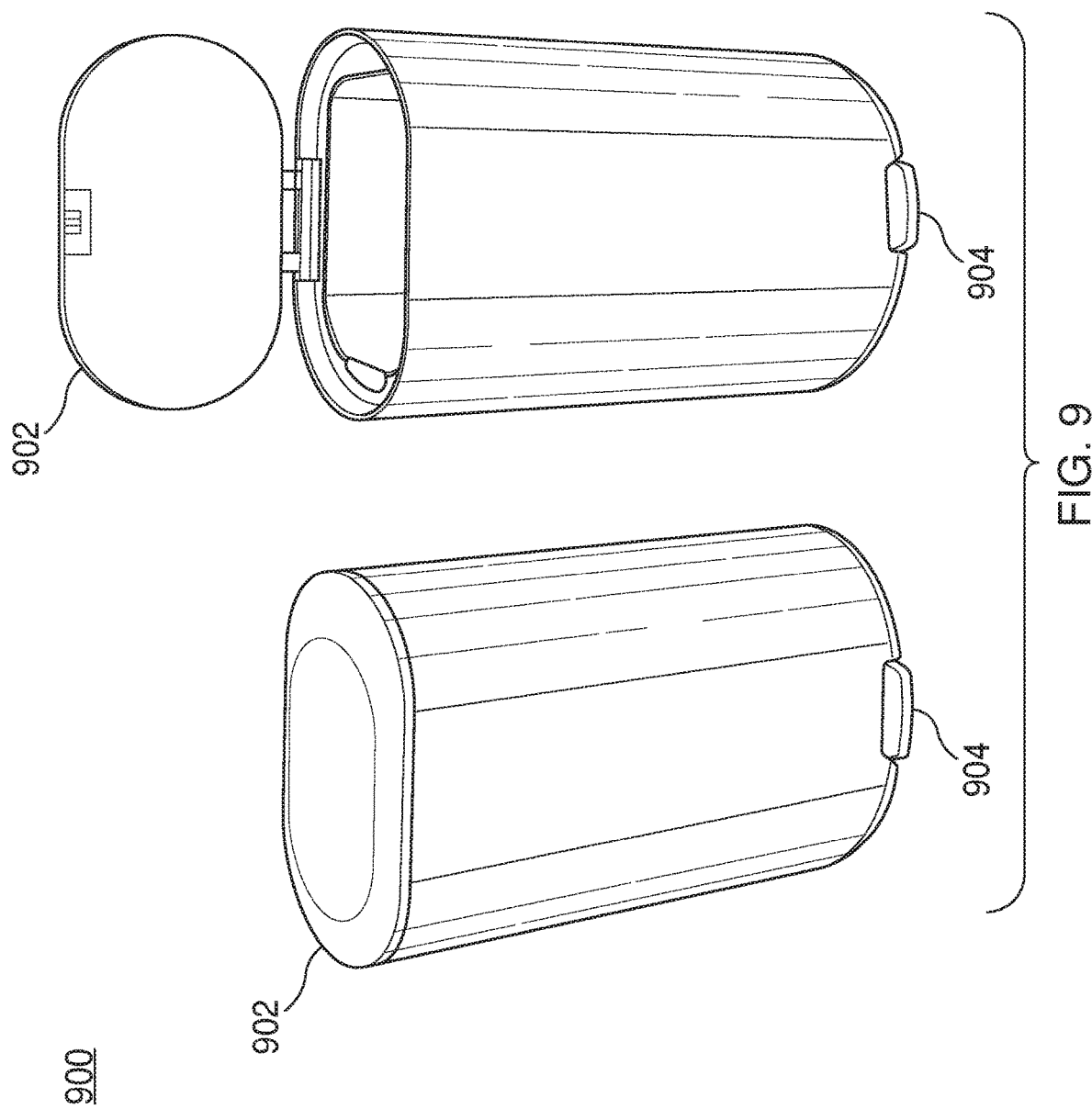
FIG. 9 includes front perspective views of an organic matter processing apparatus with the lid in a closed position and an open position according to embodiment.

As an example, a user may not only be able to open the lid with her hands, but also by interacting with an electromechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
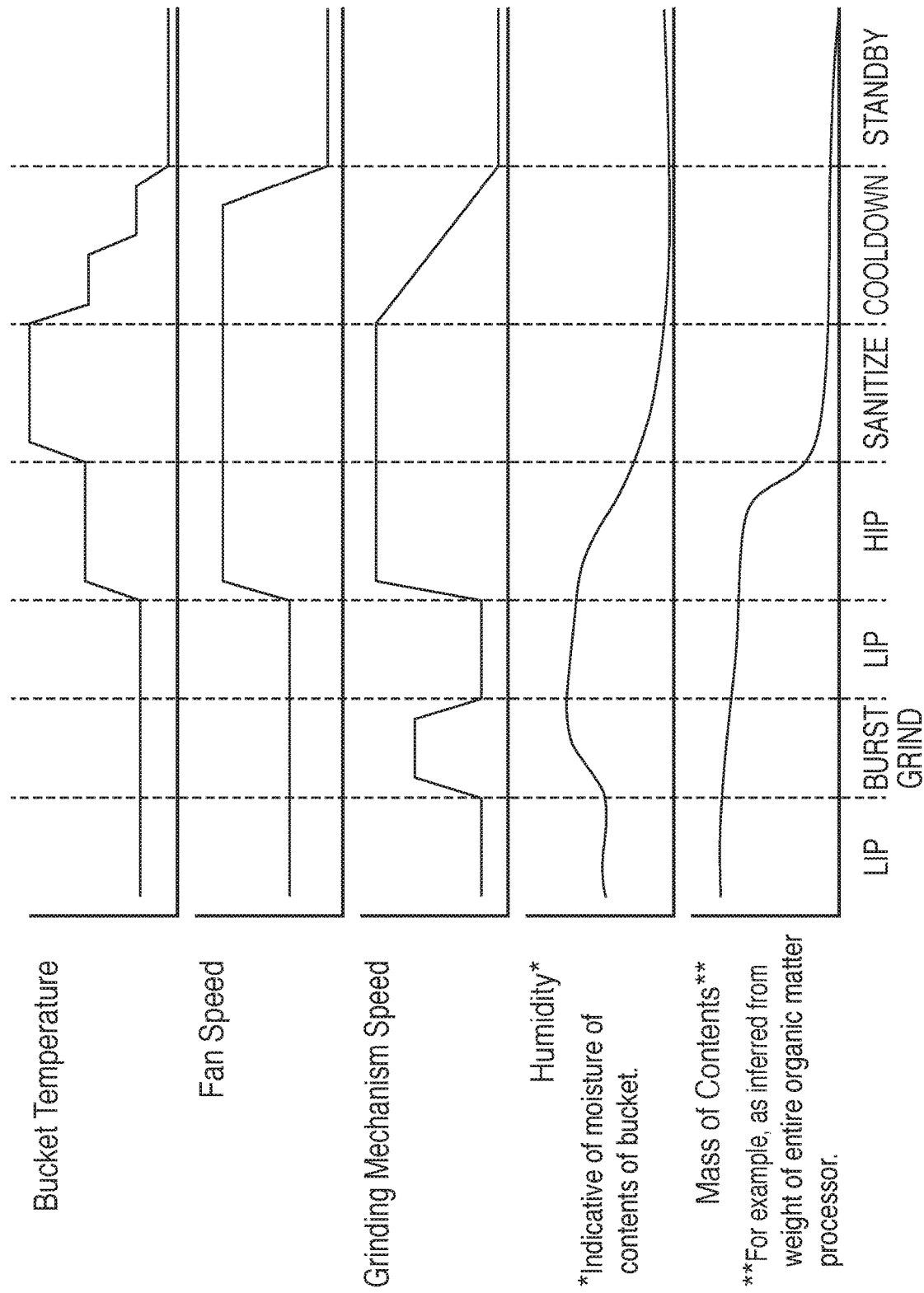
FIG. 10 includes an example of an operating diagram that illustrates how control parameters can be dynamically computed in accordance with an intelligent time recipe in order to process the contents of an organic matter processing apparatus according to embodiment.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states. Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE I

Descriptions of states for processing OMPA input.

| State Identifier (ID) | State Description |
| --- | --- |
| High Intensity Processing (HIP) | Goal: Achieve the target moisture level at a given temperature.<br>Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| Sanitize | Goal: Kill at least a predetermined number (e.g., greater than 99 percent) of pathogens.<br>Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours).<br>Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier.<br>Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached.<br>Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber.<br>Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with a OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
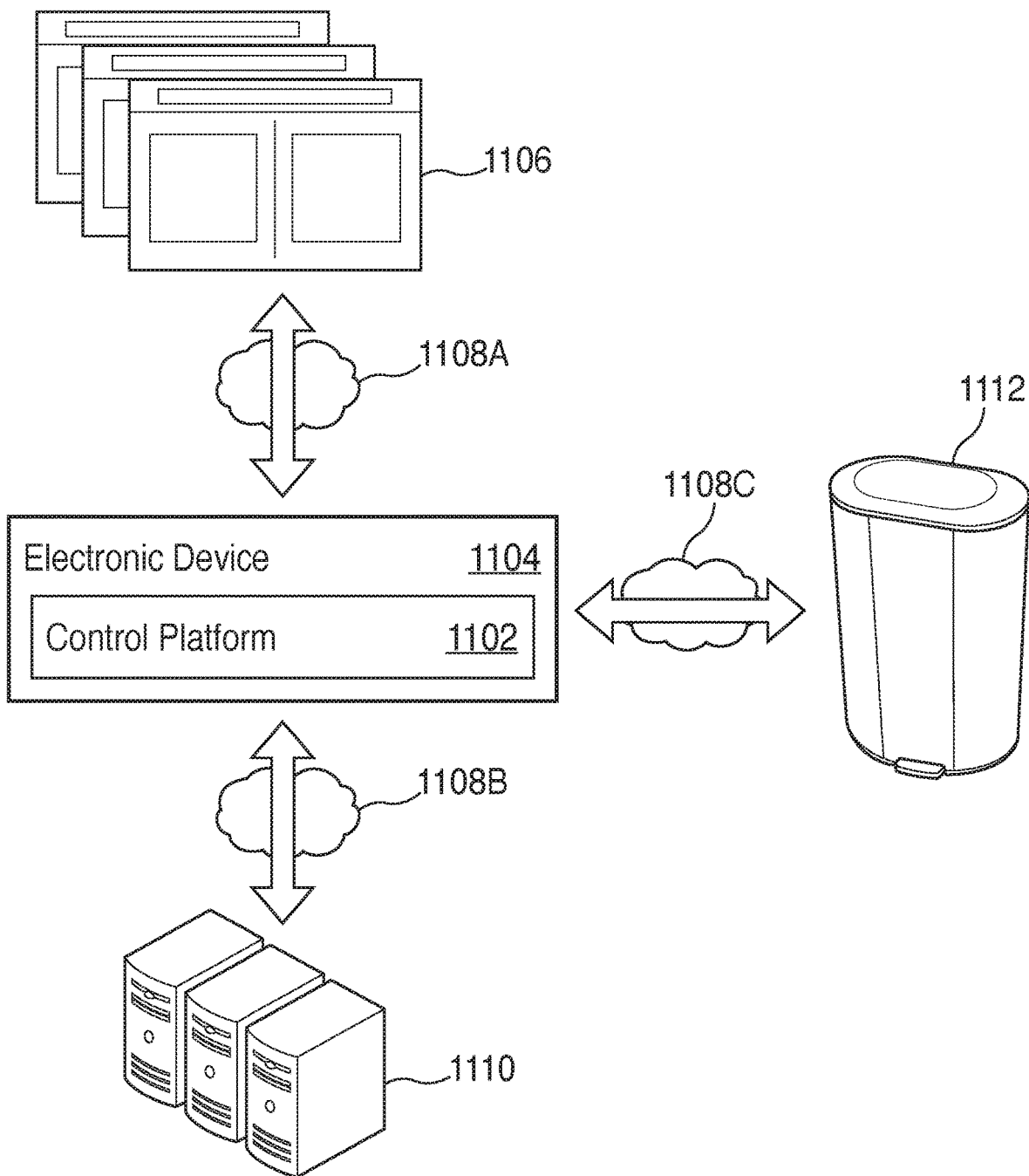
FIG. 11 illustrates a network environment that includes a control platform according to embodiment.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices—including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
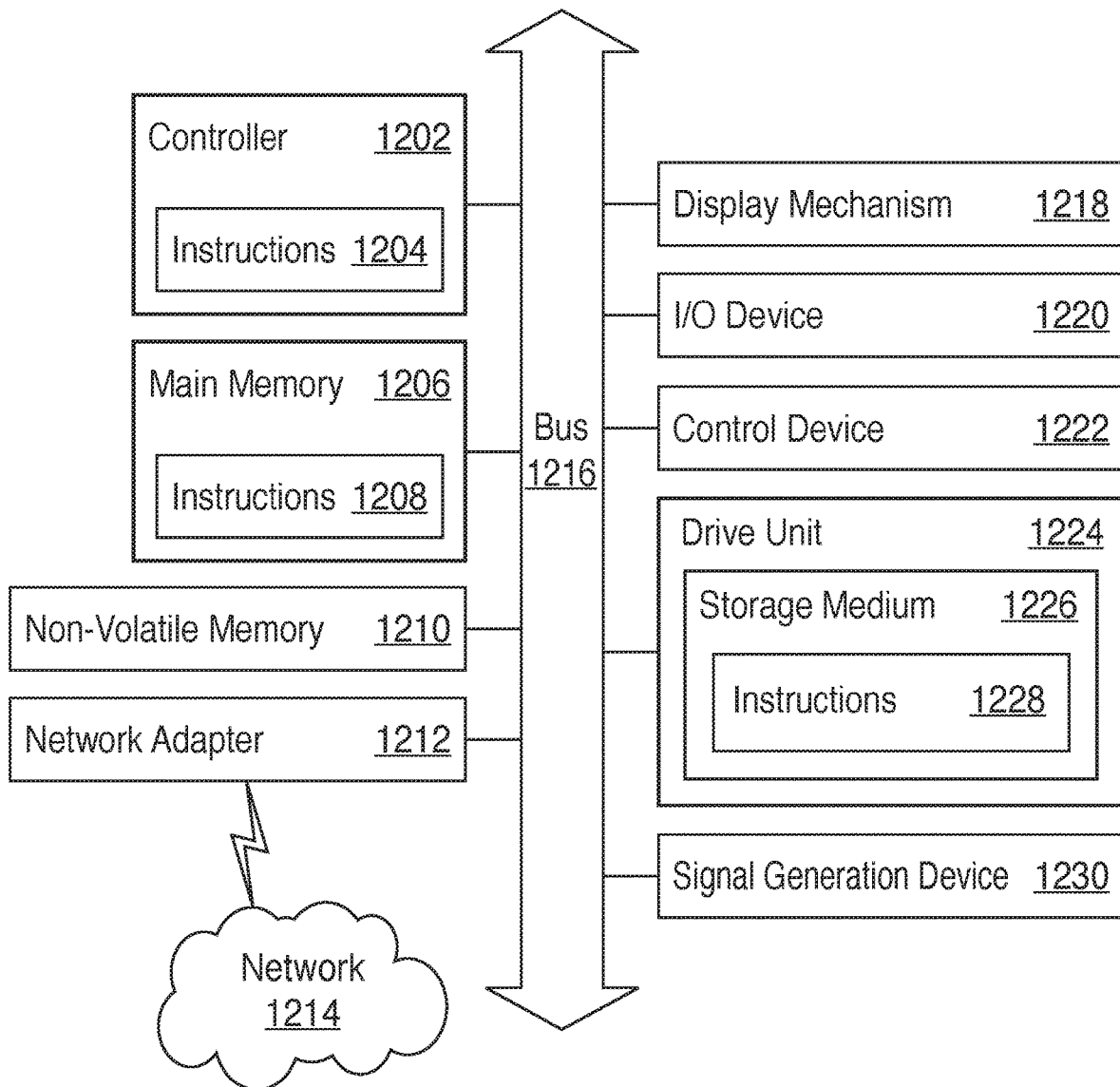
FIG. 12 is a block diagram illustrating an example of a computing system in which at least some operations described herein can be implemented according to embodiment.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 1210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

Figure 13:
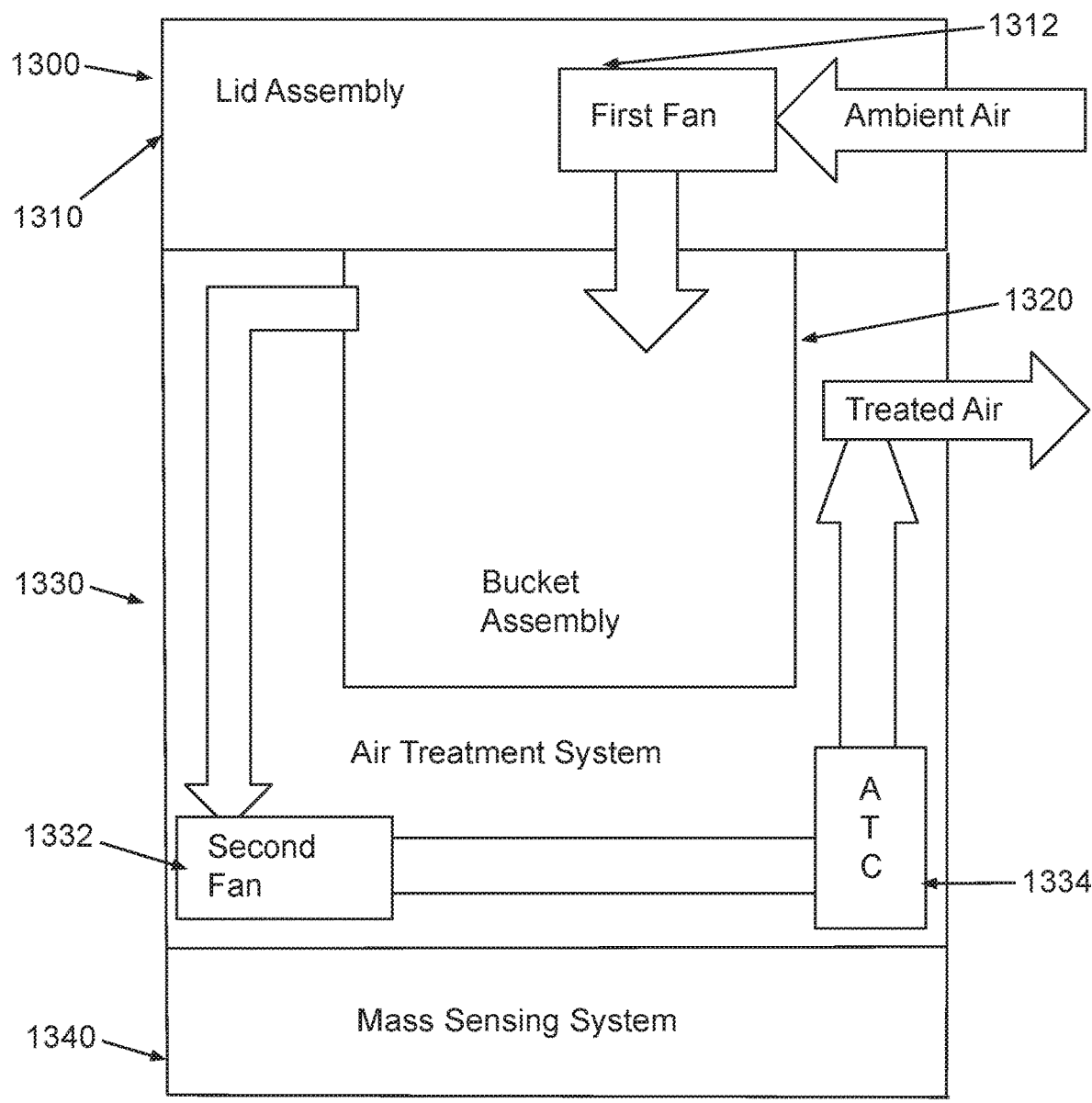
FIG. 13 shows a simplified illustrative block diagram of an OMPA and airflow paths according to an embodiment.

FIG. 13 shows a simplified illustrative block diagram of OMPA 1300 and airflow paths according to an embodiment. OMPA 1300 can include lid assembly 1310, bucket assembly 1320, air treatment system 1330, and mass sensor system 1340. Lid assembly 1310 may be akin to lid 204 of FIG. 2, embodiments discussed below, and FIGS. 16A-26 discussed in U.S. Provisional Application No. 63/392,339, filed Jul. 26, 2022, entitled "Lid Assembly, Air Treatment System, and Airflow control system for an Organic Matter Processing Apparatus and Method for the use thereof," hereinafter referred to as the '339 application," the disclosure of which is incorporated by reference in its entirety. Bucket assembly 1320 may be akin to processing chambers of FIGS. 5-7 and the bucket of FIG. 8 and embodiments disclosed in U.S. Provisional Application No. 63/313,946, filed Feb. 25, 2022, the disclosure of which is incorporated by reference in its entirety. Air treatment system 1330 may be akin to the air treatment system discussed above in connection with FIGS. 3A, 3B, 4A, and 4B, embodiments discussed in detail below, and FIGS. 27A-32 of '339 application.

OMPA 1300 has a length corresponding to an X axis, a width corresponding to a Z axis, and a height corresponding to a Y axis.

Lid assembly 1310 can open and close a movable lid. The movable lid can be opened in response to a user command (e.g., pressing of a pedal at the bottom of OMPA 1300) to enable the user to deposit OMPA input into bucket assembly 1320 or to remove bucket assembly 1320. When the movable lid is closed, OMPA 1300 may engage OMPA input processing. Lid assembly 1310 may be responsible for controlling a first airflow path in which ambient air is pulled into lid assembly 1310 by first fan 1312 and directed into bucket assembly 1320. The first air flow path forces air into bucket assembly 1320 to assist bucket assembly 1320 in the desiccation of any OMPA input that is being processed by bucket assembly 1320. Bucket assembly 1320 is operative to cut and grind and heat OMPA input to convert it to OMPA output. Lid assembly 1310 may optionally preheat the ambient air using a heater (not shown) prior to directing the air into bucket assembly 1320. The heated air may further assist bucket assembly 1320 with processing OMPA input to produce OMPA output. Heating the ambient air also reduces the moisture content of the air being injecting into bucket assembly 1320 and the moisture of the air being treated by air treatment system 1330. Reducing the moisture content of the air circulating in the OMPA can improve efficiency of OMPA input processing and air treatment.

Air treatment system 1330 may be responsible for controlling a second airflow path in which untreated air is drawn from bucket assembly 1320 by second fan 1332 and directed through air treatment chamber 1334, which converts the untreated air to treated air that is exhausted away from OMPA 1300. As defined herein, untreated air refers to air that has been in the vicinity of bucket assembly 1320 and has potentially been imparted with particles or compounds that have odorous qualities. As defined herein, treated air refers to air that been "scrubbed" or "cleaned" of particles or compounds that have odorous qualities. Air treatment chamber (ATS) 1334 can one or more of an activated carbon chamber and an ultraviolet light chamber. Air treatment system 1330 may heat the untreated air using a heater (not shown) to reduce moisture content of the untreated air before it the air is pushed through an activated carbon filter (not shown). The activated carbon filter can extract odor causing molecules from the air as it passes through the filter such that treated air is exhausted out of OMPA 1300.

When lid assembly 1310 is in a closed configuration and OMPA 1300 is managing operations that require use of first fan 1312 and second fan 1332, OMPA 1300 may ensure that a negative pressure differential is maintained between inlet air and exhausted air. This negative pressure differential can be achieved by operating second fan 1332 at a higher airflow rate (e.g., higher cubic feet per minute (CFM)) than first fan 1312. In other words, the airflow rate (or volume) of treated air exiting out of OMPA 1300 is greater than the airflow rate (or volume) of ambient air being pulled into OMPA 1300. This can ensure that air treatment system 1330 controls the flow of air from bucket assembly 1320 to the exhaust port and prevents any untreated air from prematurely exiting OMPA 1300.

Mass sensing system 1340 may be responsible for obtaining mass measurements of the OMPA. Mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor. One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). The mass sensor(s) included in the OMPA may continually or periodically output measurements that can be used to calculate, infer, or otherwise establish the total weight of the bucket (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play a key role in ensuring that the OMPA can dynamically react to changes in the state of the OMPA input. Additional details of how mass or weight measurements are used, collected, and communicated by the OMPA are discussed in more detail below.

Figure 14:
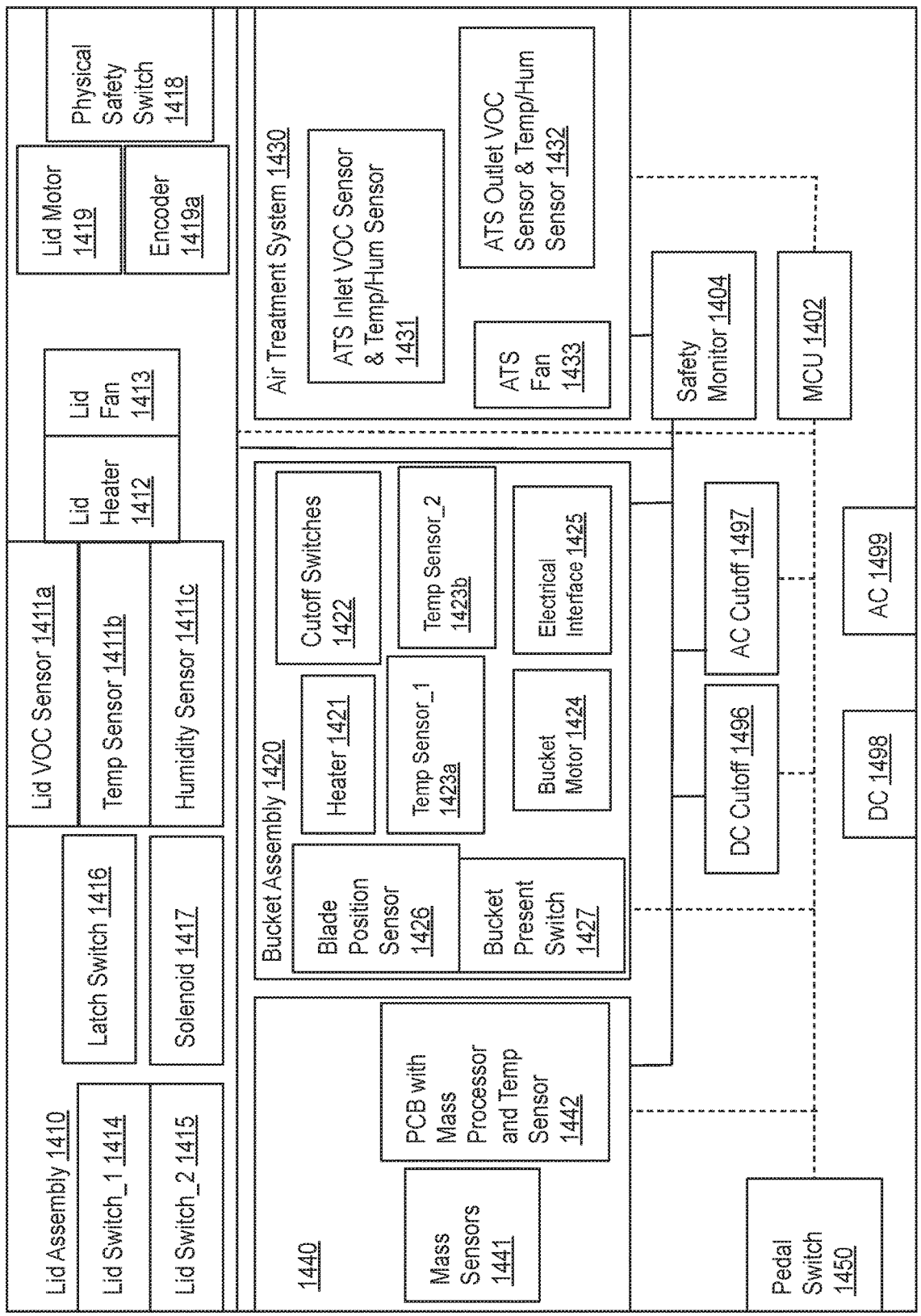
FIG. 14 shows an illustrative block diagram showing sensors and components of an OMPA according to an embodiment.

FIG. 14 shows an illustrative block diagram showing sensors and components of OMPA 1400. The sensors are operative to provide sensor based data to a processor such as, for example, master control unit (MCU) 1402 or safety monitor 1404. The components can be classified according to two different data types: feedback data and control data. Components (e.g., switches) may be dedicated specifically to only providing feedback data (e.g., switch is either ON or OFF). Other components can provide both feedback to a processor and be controlled by a processor. For example, the bucket motor may be controlled by a processor (e.g., MCU 1402). The inputs provided by the processor to the motor may be used as control data. In addition, during operation of the bucket motor, the electrical characteristics (e.g., current consumption, torque load, etc.) of the bucket motor can be used as feedback data. Yet other components may be dedicated specifically to only being controlled and are not able to provide feedback data. The sensors and components are strategically placed within OMPA 1400 to reliably procure feedback data and control data for use in various operational embodiments discussed herein. The sensors and components are discussed in conjunction with FIGS. 15A-15C, which shows a table identifying the component or sensor, its function, and its associated data.

Lid assembly 1410 can include lid VOC sensor 1411a, lid temperature sensor 1411b, lid humidity sensor 1411c, lid heater 1412, lid fan 1413, lid switch_1 1414, lid switch_2 1415, latch switch 1416, solenoid 1417, physical safety switch 1418, and lid motor with encoder 1419a. In some embodiments, volatile organic compound (VOC) sensor 1411a may be a standalone sensor that resides on shared circuit board with lid temperature sensor 1411b and humidity sensor 1411c. VOC sensor 1411a may be selected to monitor a subset of potential VOCs. In a further embodiment, lid temperature sensor 1411b and humidity sensor 1411c can be integrated into a single sensor that monitors both temperature and humidity. The monitored humidity can be absolute humidity or relative humidity. VOC sensor 1411a, temperature sensor 1411b, and humidity sensor 1411c may positioned with lid assembly 1410 to monitor air characteristics of the optionally heated ambient air being forced into bucket assembly 1420. For example, sensors 1411a-1411c may be positioned next to an access port of a manifold that directs the optionally heated ambient air into bucket assembly 1420. See FIG. 21 of the '339 application, which show an access port in a manifold where sensors 1411a-1411c can monitor air characteristics.

Lid heater 1412 and lid fan 1413 may operate under the control of MCU 1402 and provide electrical characteristics feedback to MCU 1402 and/or safety monitor 1404

Lid switch_1 1414 may be a mechanical switch that detects whether the lid is closed. Switch 1414 may be tactile switch that is depressed when a movable portion of the lid is fully closed. In one embodiment, switch 1414 may be depressed when a latch interfaces with switch 1414 when the lid is closed. See, for example, FIG. 16A of the '339 application. Lid switch_2 1415 may be hall effect switch that electrically detects whether the lid is closed. In one embodiment, a magnet may be included in the latch or other portion of the movable lid and the hall effect switch can detect the presence of the magnet when the lid is closed. See, for example, FIG. 16C of the '339 application. In some embodiments, OMPA 1400 may include only one of switch 1414 and switch 1415 because switches 1414 and 1415 are redundant.

Latch switch 1416 may be a mechanical switch that detects whether a latch sliding block, which is designed to interface with the latch, has successfully locked the lid. Solenoid 1417 may be operative to move the latch sliding block along a track depending on whether the MCU instructs the solenoid 1417 to lock the latch of the lid. When the latch sliding block is positioned in the locked position, the latch sliding block can depress latch switch 1416, confirming that the latch is locked. See FIG. 16A of the '339 application for example embodiment of the latch switch, solenoid, and latch sliding block.

In one embodiment, physical safety switch 1418 may be a mechanical switch that detects whether the lid is closed. Switch 1418 may be mounted on the rear of OMPA 1400 and is operative to interface with an actuation arm that causes the lid to open and close. Switch 1418 may be activated when the lid is closed and deactivated when the lid is open. In another embodiment, physical safety switch can be an electromechanical switch such as, for example, a reed switch that can placed near the top of the bucket assembly (e.g., next to the air treatment system inlet port). A reed switch can detect a magnet secured in the lid when the lid is closed. For example, the presence of the magnet can cause the reed switch to close and open when the magnet is no longer next to the switch. In one embodiment, physical safety switch 1418 can activate/disable AC cutoff 1497 and DC cutoff 1496 independently of safety monitor 1402 and MCU 1402. Incorporating physical safety switch 1418 adds yet another layer of safety to the OMPA that does not need to rely on the safety monitor or the MCU.

Lid motor 1419 is a component that can operate under the control of MCU 1402. The motor can provide electrical characteristics feedback to MCU 1402 and/or safety monitor 1403. Encoder 1419*a* can also provide feedback data to MCU 1402. Encoder 1419*a* can indicate the position of the lid.

It should be noted that the components and sensors that are associated with lid assembly 1410 are merely illustrative and that some components or sensors may be omitted. For example, in an embodiment where a motor is not used to open or close the lid, but a mechanical linkage actuation system is used to open and close the lid, lid motor 1419 and encoder 1419*a* can be omitted. In this embodiment, physical safety switch 1418 can be repurposed to detect operation of the mechanical actuation system to provide feedback as to whether the lid is open.

Bucket assembly 1420 can include heater 1421, cutoff switches 1422, temperature sensor_1 1423*a*, temperature sensor_2 1423*b*, bucket motor 1424, electrical interface 1425, position sensor 1426, and bucket present switch 1427. Heater 1421 may be a component that is controlled by MCU 1402 to impart heat into a bucket being used to process OMPA input. Electrical characteristics of heater 1421 may be provided to MCU 1402, safety monitor 1404, or both. Cutoff switches 1422 may be integrally formed within heater 1421 and are operative to open the heater circuitry to prevent thermal runaway. If cutoff switches 1422 are opened, the electrical characteristics of heater 1421 (e.g., the open circuit) can be provided as feedback data. Temperature Sensor_1 1423*a* and temperature sensor_2 1423*b* may be components that provide temperature feedback data. Two temperature sensors provide redundant heater 1421 monitoring.

Bucket motor 1424 may be a component that operation under the control of MCU 1402 to drive a cut and paddle assembly (not shown) to grind and cut OMPA input contained in the bucket. Bucket motor 1424 may be powered by DC source 1498. Electrical characteristics of bucket motor 1424 may be provided as feedback data. For example, the current draw, torque output, and speed of bucket motor 1424 may be provided as feedback data. Electrical interface 1425 may be provide a conduit through which power and signals are routed. For example, AC power supplied by AC source 1499 may be provided heater 1421. Signals provided by sensors 1423*a* and 1423*b* may be provided to MCU 1402 or safety monitor 1404. In some embodiments, electrical interface 1425 may include a switch or sensor that can detect whether the bucket is inserted or removed. Such a switch or sensor can be used as feedback data.

Blade position sensor 1426 may provide feedback indicating the position of the cut and paddle assembly (not shown) within the bucket. In some embodiments, position sensor 1426 can be implemented using a magnet and Hall Effect sensor. The magnet may be mounted to or within a gear that turns in conjunction with the cut and paddle assembly. When the magnet passes by the Hall Effect sensor, this can trigger a response indicative of cut and paddle assembly's orientation within the bucket. In another embodiment, position sensor may be embodied as an encoder that monitors the position of bucket motor 1424. Based on the encoder information, the position of the cut and paddle assembly can be inferred.

Bucket present switch 1427 can provide feedback indicating whether the bucket is present. The bucket can be removed from and inserted into the OMPA. Switch 1427 can confirm the bucket status: present or not present. In some embodiments, bucket present switch 1427 can be omitted and bucket detection can be determined by examining an electrical characteristic of electrical interface 1425. For example, a thermistor may exist within electrical interface 1425. The thermistor can provide information that identifies whether the bucket is present.

It should be noted that the components and sensors that are associated with bucket assembly 1420 are merely illustrative and that some components or sensors may be omitted, new components or sensors may be added, or the positioning of one or more sensor or components can be rearranged with the OMPA. For example, in one embodiment, the bucket can be relatively simple device devoid of a heater and associated temperature sensors. In this embodiment, the heater and temperature sensors be positioned adjacent to the bucket when the bucket is inserted into the OMPA.

Air treatment system 1430 can include ATS inlet VOC sensor and temperature/humidity sensor 1431, ATS outlet VOC sensor and temperature/humidity sensor 1432, and ATS fan 1433. Sensors 1431 and 1432 can perform the same function as sensors 1411*a*-1411*c* as discussed above. Sensor 1431 may be positioned to monitor characteristics of air entering the air treatment system. For example, sensor 1431 may be positioned at an inlet port the enables untreated air emanating from the bucket to enter the air treatment system. Sensor 1432 may be positioned to monitor characteristics of air exiting the air treatment system. For example, sensor 1432 may be positioned downstream from an air treatment chamber (e.g., an activated carbon media chamber). Sensors 1431 and 1432 can provide feedback data on VOCs, temperature, and humidity of monitored air.

It should be noted that the components and sensors that are associated with air treatment system 1430 are merely illustrative and that some components or sensors may be omitted, added, or repositioned within the OMPA.

Mass sensing system 1440 can include mass sensors 1441 and printed circuit board (PCB) with processor and temperature sensor 1442. Mass sensors 1441 can provide mass measurement feedback. In one embodiment, the mass measurements can be provided to PCB with processor and temperature sensor 1442, which processes the mass measurements based on a temperature measured by the on board temperature sensor. The temperature corrected mass measurement can be provided as feedback data to MCU 1402 or safety monitor 1404. Additional details of mass sensing system 1440 are discussed below.

OMPA 1400 can include pedal sensor switch 1450 that operative to detect a user initiated event to open the lid. When the user depresses a pedal to initiate a lid open event, the depression of the pedal can trigger pedal sensor switch 1450, which provide feedback indicating that the user desires to open the lid. Pedal sensor switch 1450 can be used in an OMPA embodiment that uses a motor (e.g., motor 1419) to open and close the lid or in an OMPA embodiment that uses a mechanical linkage actuation system (sans motor) to open and close the lid.

OMPA 1400 can include DC cutoff 1496 and AC cutoff 1497. DC cutoff 1496 and AC cutoff 1497 may be controlled by MCU 1402, safety monitor 1404, or both. DC cutoff 1496 can be operative to disconnect DC source 1498 from received by various DC supplied components within OMPA 1400. For example, when DC source cutoff 1496 is activated, DC power may be cut from supplying bucket motor 1424 and any other DC powered component (e.g., fan 1413 or fan 1433). AC cutoff 1497 can be operative to disconnect AC source 1499 from being received by various AC supplied components within OMPA 1400. For example, AC power to heater 1421 and heater 1412 may be cutoff when AC cutoff 1497 is activated.

MCU 1402 may be a firmware controller designed to control the OMPA and provide safety features. MCU 1402 is intended to be the primary controller of the OMPA and is capable of detecting safety concerns and handling them as appropriate. MCU 1402 may be responsible for controlling the OMPA input to OMPA output conversion process, controlling on-board displays, controlling wireless communications, monitoring component health, and all other general purpose functionality of the OMPA. Safety monitor 1404 serves as a hardware backup to MCU 1402 to ensure safe operation of the OMPA in the event MCU 1402 is not functioning properly or bypassed.

Safety monitor 1404 can be ROM based circuitry designed to provide hardware based safety functionality for the OMPA. Safety monitor 1404 may operate independently of MCU 1402 by operating in response to various safety monitor inputs. Safety monitor 1404 can operate as a hardware watchdog by requiring all threads to check in on a periodic basis. The threads may be associated with various sensors and components in the OMPA. If any thread fails, safety monitor 1404 may initiate a reboot of OMPA 1400.

Figure 16:
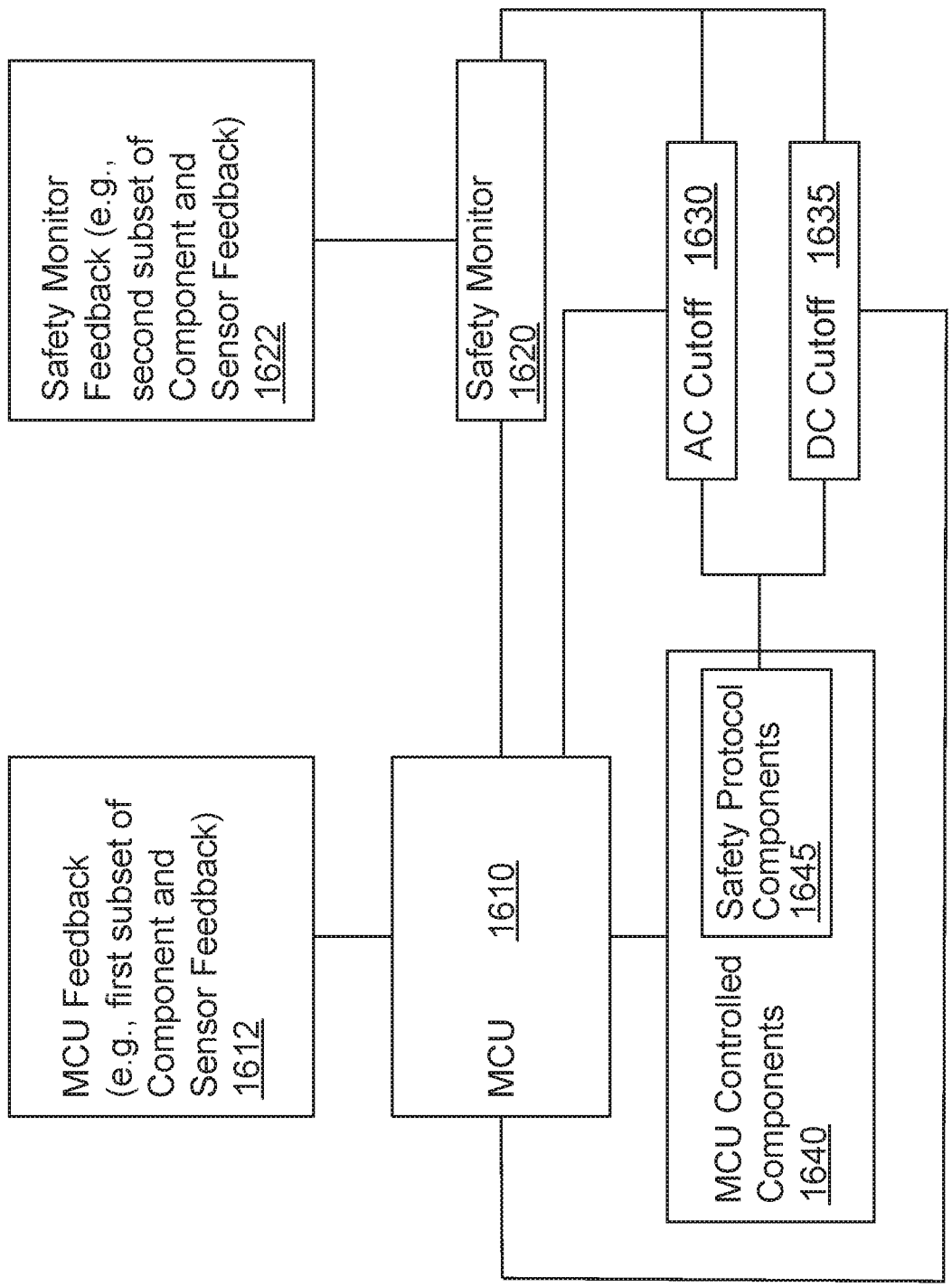
FIG. 16 shows an illustrative block diagram of a MCU and a safety monitor according to an embodiment.

FIG. 16 shows an illustrative block diagram of an MCU, a safety monitor, the inputs provided to the MCU and the safety monitor, and the components that are controlled by the MCU and the safety monitor according to an embodiment. MCU 1610 can receive MCU specified feedback data 1612 as inputs. MCU specified feedback data can include feedback data provided by a first subset of the sensors or components (as discussed in connection with FIGS. 14 and 15A-15C). MCU 1610 can control operation of various MCU controlled components, as shown in box 1640. Some of MCU controlled components 1640 may be designated as safety protocol components 1645. Safety protocol components 1645 may be turned off via signal control or such components may have their power supply cutoff by AC cutoff 1630 or DC cutoff 1635. Examples of safety components can include a bucket motor, a bucket heater, a lid fan, a lid heater, an ATS fan, or any other suitable component. Safety monitor 1620 can receive safety monitor specified feedback data 1622 as inputs. Safety monitor specified feedback data 1622 can include feedback data provided by a second subset of sensor or components. In one embodiment, the first and second subsets can be mutually exclusive in that there are no feedback data sources shared among MCU 1610 and safety monitor 1620. In another embodiment, first and second subsets can be configured such that one or more feedback data sources are shared among MCU 1610 and safety monitor 1620. Safety monitor 1620 can control operation of components that are jointly controlled by MCU 1610 and safety monitor 1620, as shown in box 1630. MCU 1610 and safety monitor 1620 can communicate with each other. For example, a "heart beat" signal may be exchanged between MCU 1610 and safety monitor 1620 to indicate that MCU 1610 and/or safety monitor 1620 are operating properly.

MCU 1610 and safety monitor 1620 can jointly control AC cutoff 1630 and DC cutoff 1635. For example, if MCU 1610 receives data in its MCU feedback 1612 that indicates a safety protocol should be enforced, MCU 1610 can instruct safety protocol components 1645 to stop operating via signal control and MCU 1610 can enable power cutoff to safety protocol components 1645 by engaging AC cutoff 1630 and DC cutoff 1635. If safety monitor 1620 receives data in its safety monitor 1622 that indicates a safety protocol should be enforced, safety monitor 1620 can enable power cutoff to safety protocol components 1645 by engaging AC cutoff 1630 and DC cutoff 1635.

FIG. 17A shows a table 1710 illustrating the first subset of feedback designated specifically to the safety monitor according to an embodiment. As shown, the safety monitor specified feedback can include a first lid switch for detecting whether the lid is closed (e.g., lid sensor 1414), a first temperature sensor for monitoring temperature of the bucket (e.g., temperature sensor_1 1423a), a bucket present switch for detecting whether the bucket is present (e.g., bucket present switch 1427), and backup switch for detecting whether the lid is closed (e.g., physical safety switch 1418). The four safety monitor inputs identified in table 1710 can enable the safety monitor to effectively monitor essential "checkpoints" for ensuring safe and optimal operation of the OMPA. Limiting the number of safety monitor inputs to just four inputs simplifies the logic and wiring interfacing requirements for the safety monitor, thereby ensuring that the safety monitor is configured in a robust and simple manner.

FIG. 17A also shows table 1720 illustrating the second subset of feedback designated specifically to the MCU according to an embodiment. Some of this feedback may be used for enforcing a safety protocol while other feedback may be used for executing operation of the OMPA. As shown, the MCU specified feedback can include a latch switch (e.g., latch switch 1416), a second lid switch (e.g., lid switch_2 1415), a second temperature sensor for monitoring temperature of the bucket (e.g., temperature sensor_2 1423b), the lid VOC sensor and temperature/humidity sensor (e.g., sensors 1411a-1411c), the ATS input VOC sensor and temperature/humidity sensor (e.g., 1431), the ATS output VOC sensor and temperature/humidity sensor (e.g., 1432), the pedal switch (e.g., switch 1450), the mass sensors (e.g., sensors 1441), temperature compensation processor (e.g., PCB 1442), the position sensor indicating the position of the cut and paddle assembly (e.g., 1426), the lid motor encoder (e.g., encoder 1419a), and the electrical characteristics of the bucket motor (e.g., motor 1424), the lid motor (e.g., motor 1419), electrical connection (e.g., interface 1425), lid fan (e.g., fan 1413), lid heater (e.g., heater 1412), and the ATS fan (e.g., fan 1433).

Figure 17B:
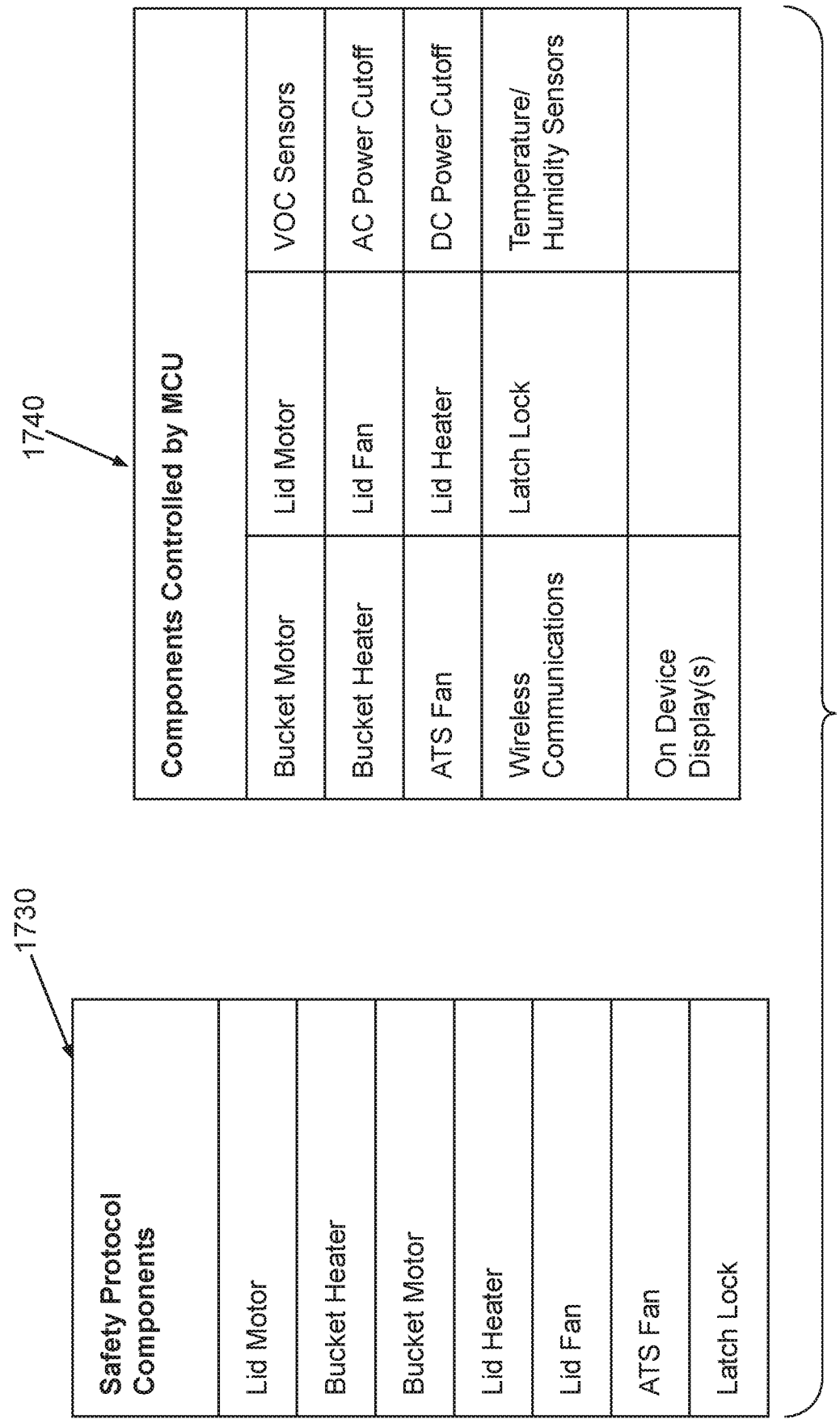
FIG. 17B shows tables illustrating which components can serve as safety protocol components and which components can be controlled by the MCU according to an embodiment.

FIG. 17B shows table 1730 illustrating which components can serve as safety protocol components. One or more of these components can be turned off or powered off during enforcement of a safety protocol. The safety protocol can be enforced by turning the components off (e.g., through use of control signals) or by cutting power to the components. These components can include an AC power cutoff (e.g., 1499), a DC power cutoff (e.g., 1498), the bucket heater for heating the bucket (e.g., 1421), the bucket motor for turning the cut and paddle assembly (e.g., bucket motor 1424), the lid motor for opening and closing the lid (e.g., lid motor 1419), the lid heater for heating ambient air being pushed into the bucket (e.g., lid heater 1412), the lid fan for drawing in ambient air from outside the OMPA (e.g., lid fan 1413), the air treatment fan for pulling in untreated air from the bucket (e.g., ATS fan 1433), and the latch lock (e.g., solenoid 1417 for locking the latch). In one embodiment, components such as the lid motor, lid heater, bucket heater, bucket motor, ATS fan, and latch lock may be deactivated with control signals. When the AC and DC power cutoffs are activated, then the power being supplied to those components may be cutoff, thereby ensuring that the components cannot be activated.

Table 1740 illustrates which components can be controlled by the MCU. These components can include, the bucket motor, the bucket heater, the lid motor, the lid fan, the lid heater, the latch lock, the ATS fan, wireless communications, on device display(s). The MCU may control these components to execute operations of the OMPA. When the MCU sends control signals to a particular component (e.g., the bucket motor) to perform an action (e.g., rotate in a first direction at a predetermined speed), the electrical characteristics of that component can be feedback to the MCU as input. This way, the MCU can monitor whether the component is operating as expected (e.g., continues to rotate in the first direction at the predetermined speed) or if there are conditions present that require a change in control signals (e.g., reverse direction of the motor) being provided to that component.

It should be understood the list of components in table 1740 is not exhaustive and that additional components may be controlled by the MCU. For example, the mass sensors may be controlled by the MCU.

Figure 18:
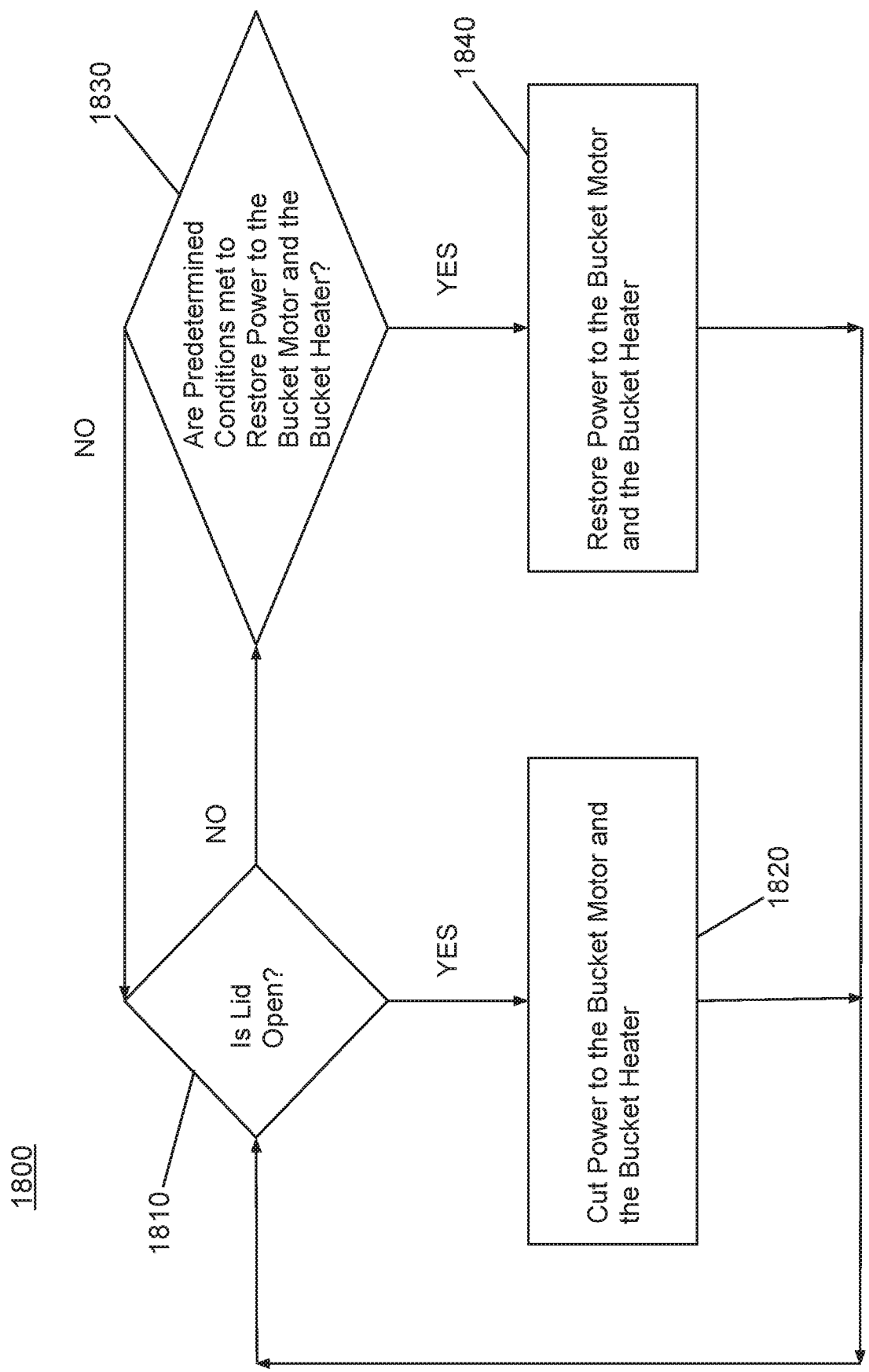
FIG. 18 shows a process for enforcing a safety protocol according to an embodiment.

FIG. 18 shows a process for enforcing a safety protocol according to an embodiment. Process 1800 can begin by determining whether the lid of the OMPA is open at step 1810. This determination can be made by the MCU, safety monitor, or both. The MCU is provided with MCU specified feedback data and the safety monitor is provided with safety monitor specified feedback data. If the MCU, in response to detecting a lid open event in the MCU specified feedback data, or if the safety monitor, in response to detecting a lid open event in the safety monitor specified feedback data, the MCU or the safety monitor can cut power to the bucket motor and bucket heater (and any other component as deemed necessary such as the lid fan, lid heater, and ATS fan), as indicated in step 1820. Cutting power to at least the bucket motor and the bucket heater ensures that the safety protocol is enabled whenever the lid is open. Process 1800 may revert back to step 1810 after power is cut.

If at step 1810, it is determined that the lid is closed, process 1800 may determine whether predetermined conditions are met before power can be restored to the bucket motor and the bucket heater (and any other components that may have had their power cut) at step 1830. The predetermined conditions can include verification of whether the bucket is present, whether all feedback data that provides lid closure data is in agreement, whether the latch is locked, and any other suitable criteria. If the determination at step 1830 is NO, process 1800 may revert back to step 1810. If the determination at step 1830 is YES, power may be restored to the bucket motor and the bucket heater (and any other components that may have had their power cut) at step 1840. Process 1800 may revert back to step 1810 after power is restored.

It should be understood that the steps shown in FIG. 18 are illustrative and the order of the steps may be changed, additional steps may be added, or steps may be omitted.

Figure 19A:
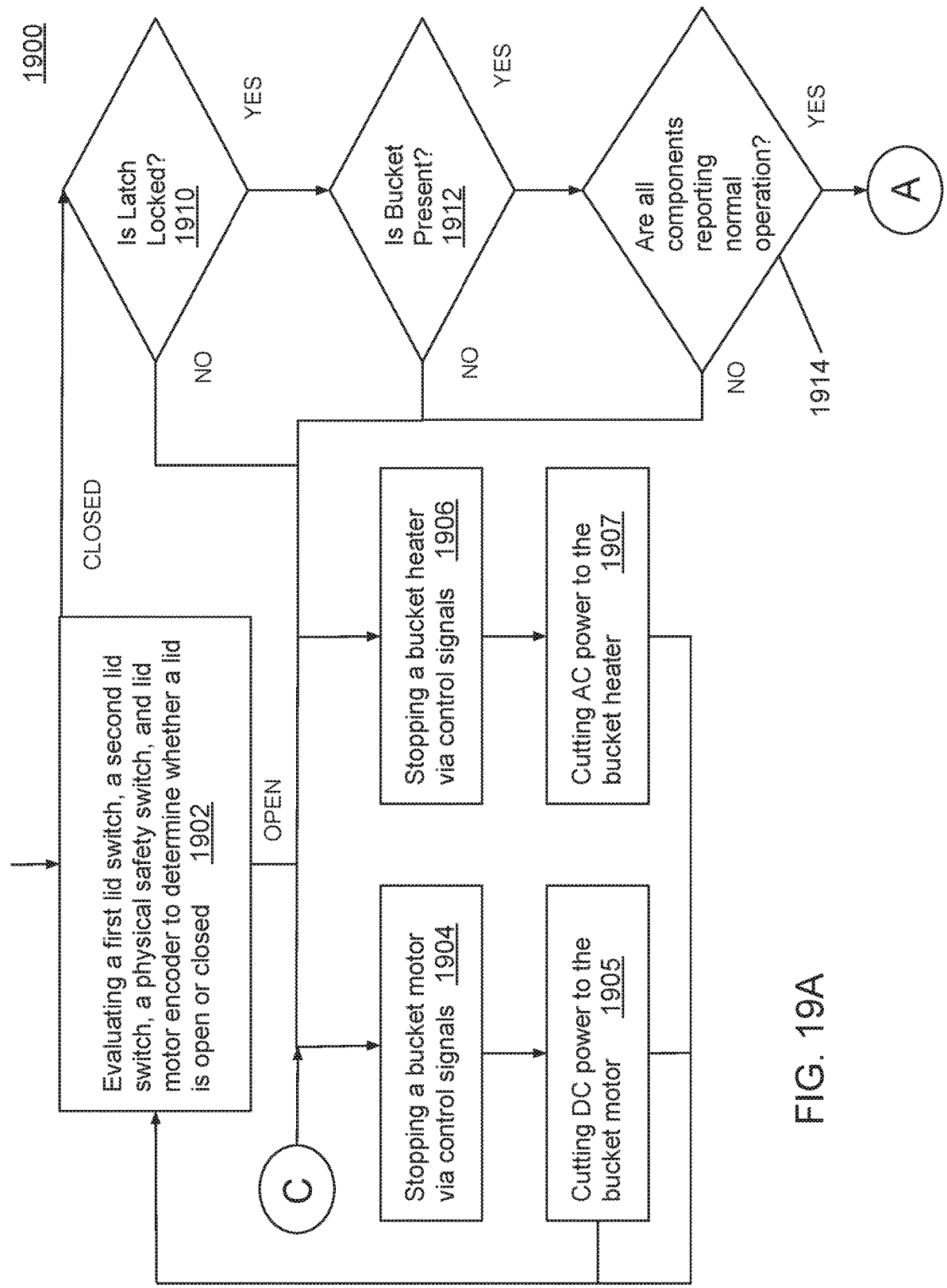
FIGS. 19A-19C show an illustrative process for enforcing a safety protocol in an OMPA according to an embodiment.
Figure 19B:
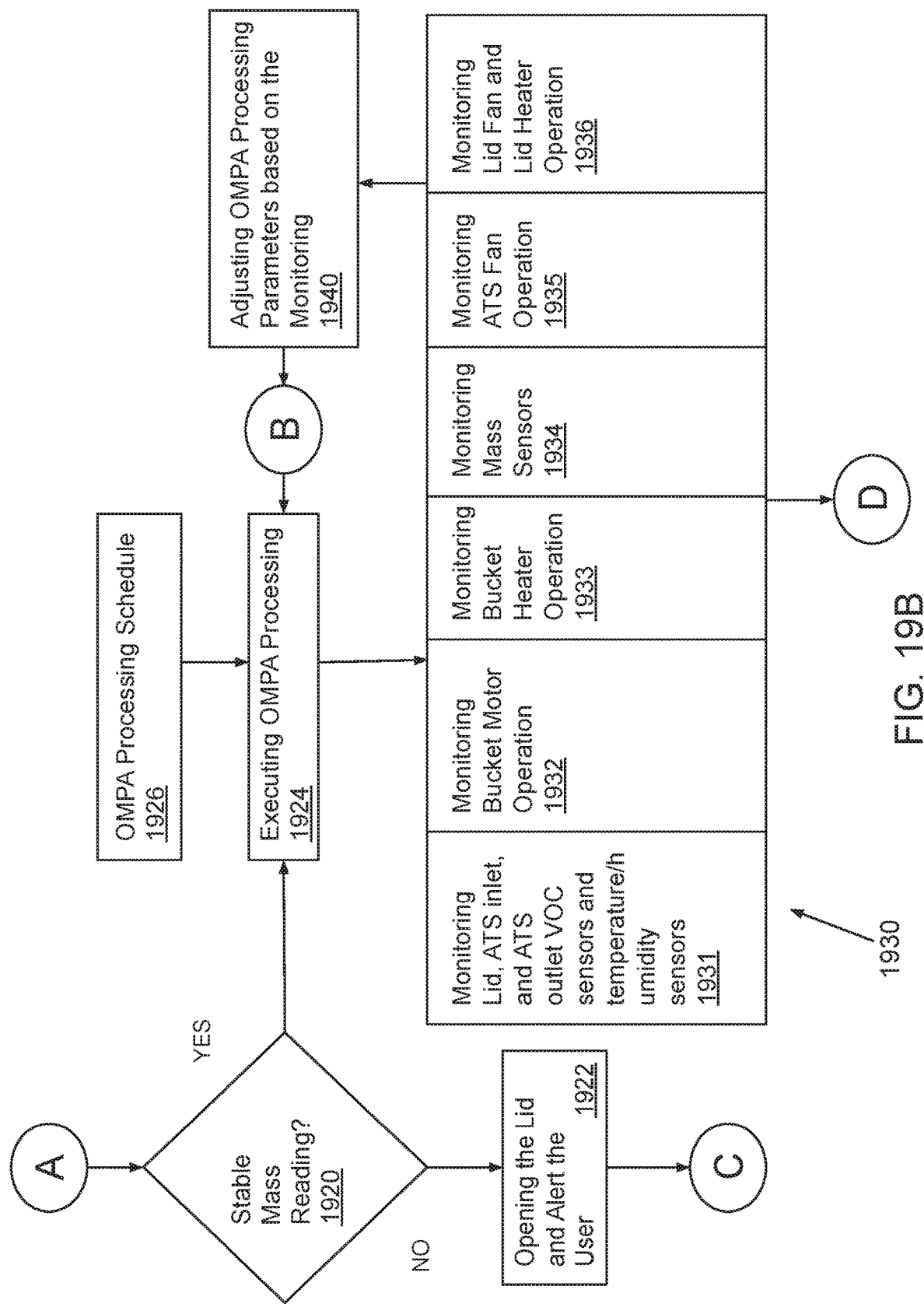
Figure 19C:
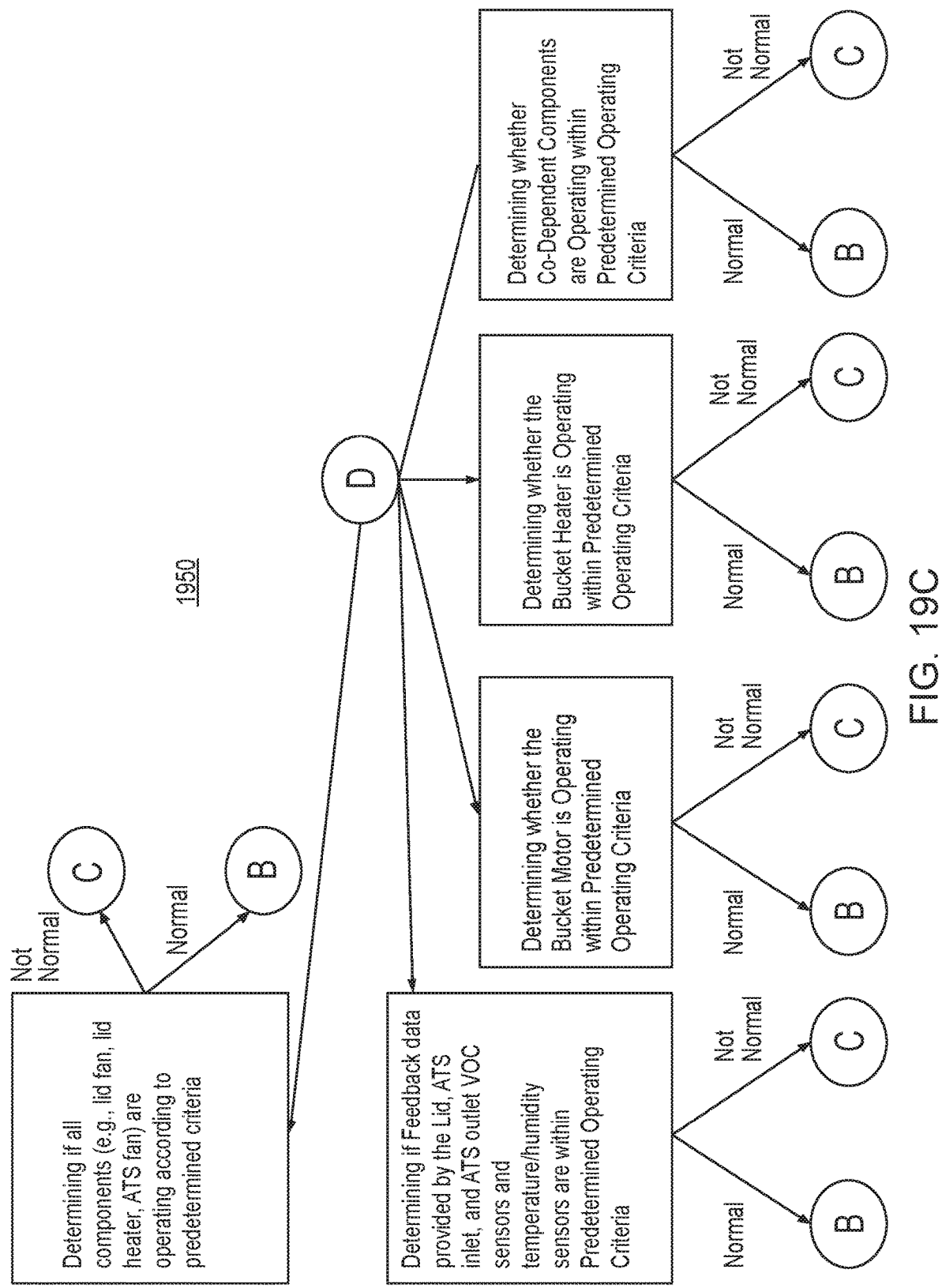

FIGS. 19A-19C show an illustrative process 1900 for enforcing a safety protocol in an OMPA according to an embodiment. Process 1900 may be implemented in an OMPA outfitted with sensors, components, a MCU, and a safety monitor such as that described above in connection with FIG. 14. Process 1900 may evaluate a first lid switch, a second lid switch, a physical safety switch, and lid motor encoder to determine whether a lid is open or closed, at indicated by step 1902. If, at any time, a determination is made that the lid is open, process 1900 proceeds to steps 1904 and 1906. At step 1904, a bucket motor can be stopped through use of control signals, and at step 1906, a bucket heater can be stopped with control signals. Thus, if either the bucket motor or bucket heater was in operation at the time of the lid open event, control signals stopping its operation are provided to stop its operation. In addition to stopping operation of the bucket motor and the bucket heater via control signals, DC power is cut from being supplied to the bucket motor (at step 1905) and AC power is cut from being supplied to the bucket heater (at step 1907). In some embodiments, power (regardless of whether the power is AC or DC) can be cut to the bucket motor, the bucket heater, and any other components selected for being cutoff from a power source when the lid is determined to be open.

If the lid is closed, process 1900 can determine if the latch is locked at step 1910. If the latch is not locked, process 1900 returns to steps 1904-1907. If latch is determined to be locked, process 1900 may determine if the bucket is present at step 1912. If the bucket is not present, process 1900 returns to steps 1904-1907. If the bucket is determined to be present, process 1900 may determine whether all components are reporting in as operating normally at step 1914. For example, the report in can be part of a thread assessment implemented by the safety monitor. If there is an issue with one or more components, process 1900 returns to steps 1904-1907, otherwise process 1900 can proceed to step 1920 (as shown in FIG. 19B).

At step 1920, a determination is made as to whether mass readings are stable. Stable, unchanging, mass readings may be required to confirm that the OMPA input is suitable for OMPA processing and that the OMPA is positioned on a stable surface. If the mass readings are not stable, the lid may be opened and the user may be alerted at step 1922, and then process 1900 returns to steps 1904-1907. If mass readings are stable at step 1920, process 1900 may execute OMPA processing at step 1924. OMPA processing may operate according to an OMPA processing schedule provided by step 1926.

While OMPA processing is being executed, the monitoring of sensors and components can be performed in step 1930. In particular, lid, ATS inlet, and ATS outlet VOC sensors and temperature/humidity sensors can be monitored at step 1931. The bucket motor operation can be monitored at step 1932. The bucket heater operation can be monitored at step 1933. The mass sensors can be monitored at step 1934. The ATS fan operation can be monitored at step 1935. The lid fan and lid heater operation can be monitored at step 1936. The monitoring can be performed in real-time so that a safety protocol can be enforced (in step 1950 of FIG. 19C) and so that the OMPA processing parameters can be adjusted based on the monitoring, at step 1940. The OMPA processing parameters can follow a recipe or a OMPA processing cycle to convert OMPA input to OMPA output the data acquired during the monitoring steps 1930-1936 can be used as inputs for controlling and monitoring the conversion process.

Step 1950 can represent enforcement of a safety protocol while the OMPA is operating (e.g., executing OMPA processing) by monitoring various specific feedback data and components to ensure their compliance with predetermined operating criteria. If the feedback and components are operating within the predetermined operating criteria, process 1900 can proceed back to step 1924. If, however, any of the feedback or components are not operating with the predetermined operating criteria, process 1900 may revert back to steps 1904-1907.

Step 1950 can be sub-divided into steps 1951-1955, as shown in FIG. 19C. Step 1951 may determine whether the bucket motor is operating within predetermined operating criteria. For example, predetermined operating criteria for the bucket motor can include a maximum current draw for a specified period of time, a maximum torque load for a specified period of time, and an unjamming procedure (e.g., used to re-mobilize the cut and paddle assembly if OMPA matters includes a substance that does not facture cut in a first instance). Step 1952 may determine whether the bucket heater is operating within predetermined operating criteria. For example, the bucket heater may operate with in a fixed temperature range. If the heater falls below that range or exceeds it while in steady state operation, then process 1900 may return to steps 1904-1907.

Step 1953 may determine if feedback data provided by the lid, ATS inlet, and ATS outlet VOC sensors and temperature/humidity sensors are within predetermined operating criteria. For example, if a VOC sensor detects a noxious or flammable gas, the OMPA may be shut down via steps 1904-1907 and the user may be informed. As another example, if a humidity sensor detects a high level of humidity for a prolonged period of time, such data may infer that excessive liquid has been deposited into the OMPA and that the OMPA should be shut down via steps 1904-1907 and the user is informed of the issue.

Step 1954 may determine if all other components (e.g., lid fan, lid heater, ATS fan) are operating according to predetermined criteria. For example, if the ATS fan is unable to move a minimum volume of air for a unit of time, this may indicate that there is an issue with the ATS fan or that there an air leak within the ATS. Such an ATS fan issue may trigger shutdown of the OMPA, alert, or both.

Figure 20:
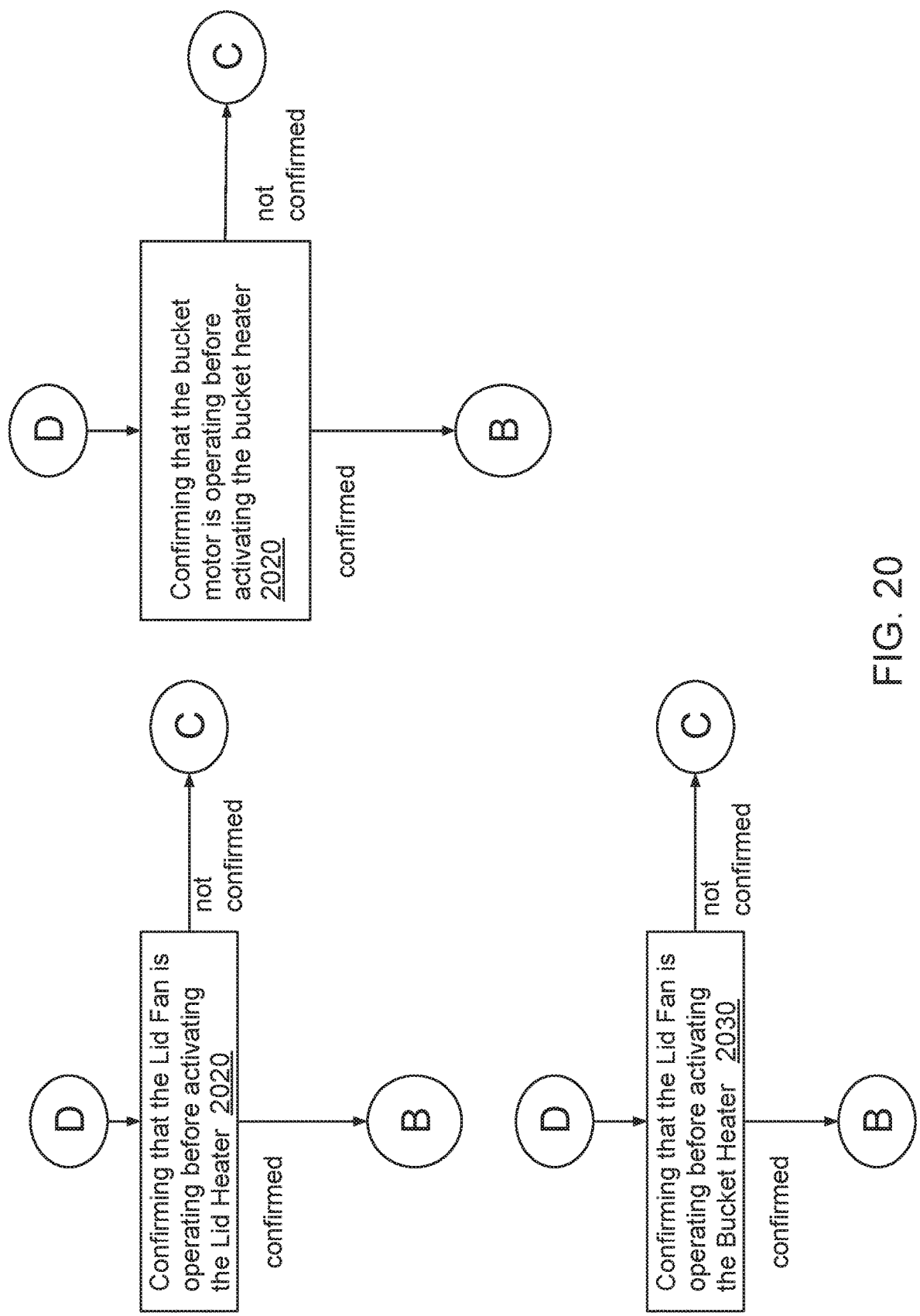
FIG. 20 shows several co-dependent component relationships that may be evaluated as part of a step in FIG. 19C according to an embodiment.

Step 1955 may determine whether co-dependent components are operating with predetermined operating conditions. Co-dependent component operation refers to a requirement that two or more components be operating together to ensure safe operation of the OMPA. FIG. 20 shows several co-dependent component relationships that may be evaluated as part of step 1955. Step 2010 may confirm that the lid fan is operating before activating the lid heater. Step 2020 can confirm that the bucket motor is running before activating the bucket heater. For example, the OMPA may be permitted to cut and grind OMPA matter for a fixed period of time while bucket is not being actively heated by the bucket heater, but the bucket heater is not permitted to run when the cut and paddle assembly is stationary. Step 2030 can confirm that the lid fan is operating before activating the bucket heater. This requirement may be enforced to ensure that bucket does not get too hot during operations. For all steps that are confirmed the process can revert to step 1924, and for steps that are not confirmed, the process may be revert to steps 1904-1907.

Figure 21:
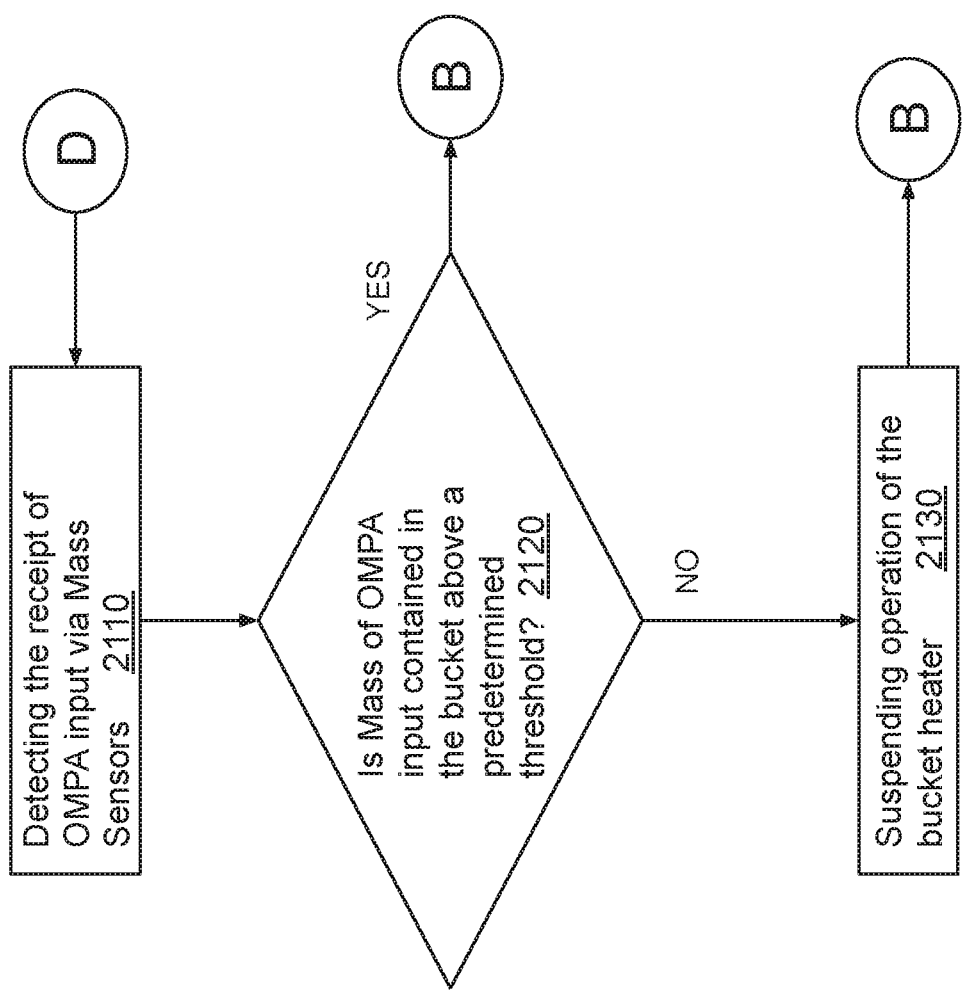
FIG. 21 shows a sequence of steps that may be executed following a step in FIG. 19B according to an embodiment.

FIG. 21 shows a sequence of steps that may be executed following step 1930 of FIG. 19B according to an embodiment. In step 2110, the receipt of OMPA input can be detected via the mass sensors. At step 2120, a determination can be made as to whether the mass of the OMPA input contained in the bucket is above a predetermined threshold. For example, if the user adds only a modest quantity of food scrap (e.g., a crust of bread), as measured by the mass sensors before and after the lid has been opened and closed, then it may be preferable not to fully activate OMPA processing. For example, the OMPA input may be cut, but the operation of the bucket heater may be suspended (as shown in step 2130) if the weight is below the predetermined threshold. This way, the OMPA is prevented from inadvertently charring the OMPA input by prematurely activating the bucket heater. If the determination in step 2120 is YES, the process can proceed to step 1924. After step 2130, the process can proceed to step 1924.

It should be understood that the steps shown in FIGS. 19A-19C, 20, and 21 are illustrative and the order of the steps may be changed, additional steps may be added, or steps may be omitted.

Figure 22:
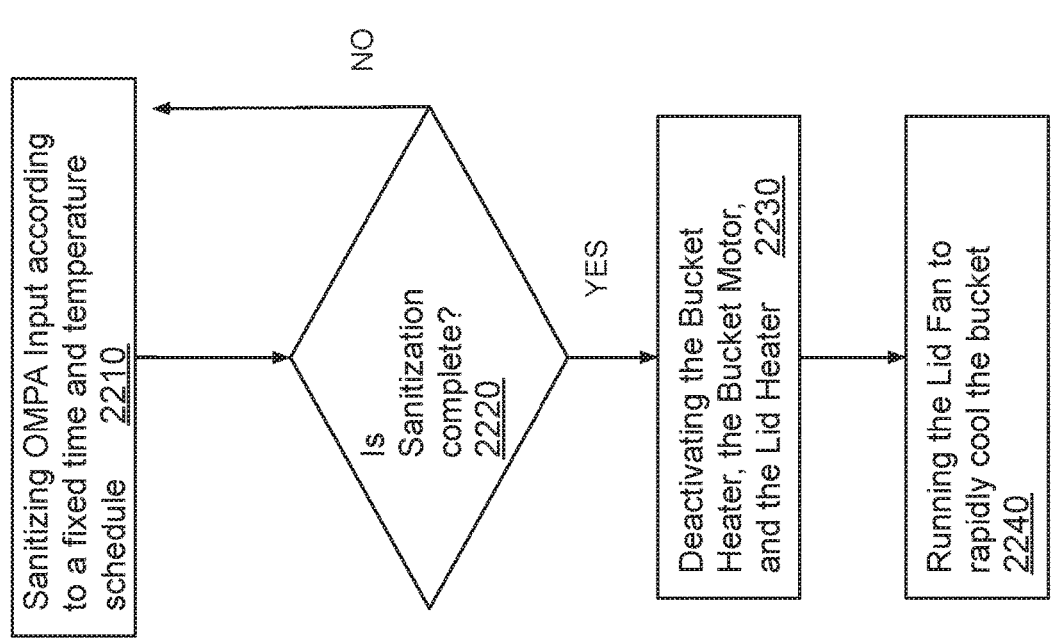
FIG. 22 shows an illustrative process for controlling heat of the bucket according to an embodiment.

FIG. 22 shows an illustrative process 2200 for controlling heat of the bucket according to an embodiment. At step 2210, the OMPA input is sanitized according to a fixed time and temperature schedule. The sanitizing process ensures any bacteria in the OMPA bucket and OMPA output is destroyed. This process requires that the bucket and contents therein be subjected to relatively high heat. The lid fan, lid heater, bucket motor, and bucket heater may be active in sanitizing. As a result, the bucket can reach temperatures that may be considered too hot to handle or touch. The latch may remain locked during the sanitization process to encourage the user not to open the lid. At step 2220, if sanitization is complete, process 2200 proceeds to step 2230 or reverts to step 2210. At step 2230, the bucket heater, the bucket motor, and the lid heater are deactivated, but the lid fan continues to run so that the bucket is cooled a relatively rapid pace. Rapid cooling may be desirable so that the user can gain access to the bucket as quick as possible and to reduce the temperature of the bucket for safe handling.

It should be understood that the steps shown in FIG. 22 are illustrative and the order of the steps may be changed, additional steps may be added, or steps may be omitted.

Figure 23:
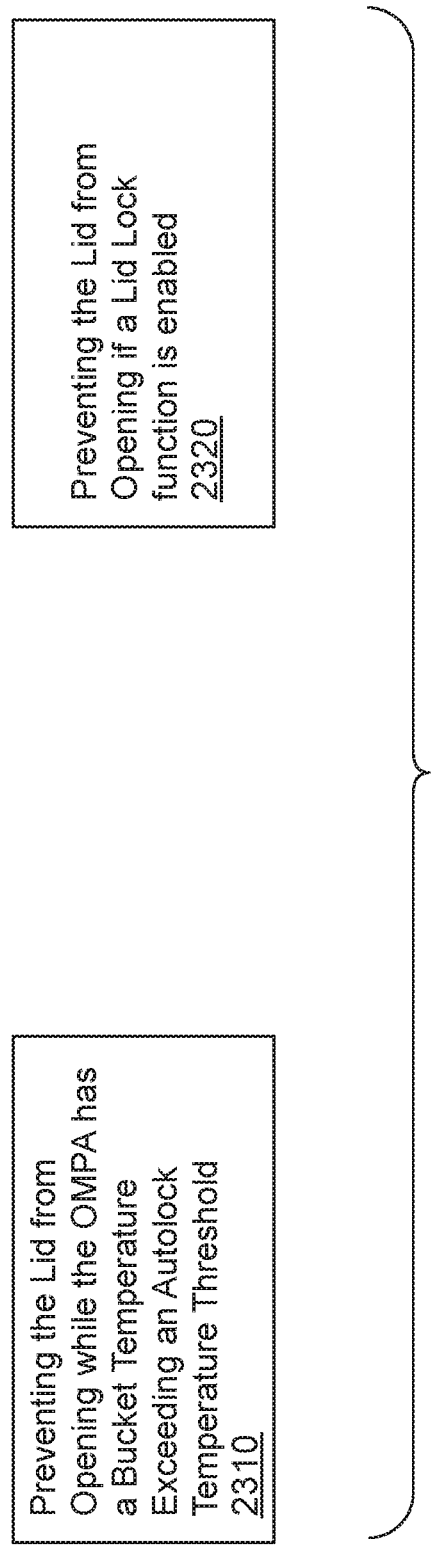
FIG. 23 shows examples of lid closure enforcement according to an embodiment.

FIG. 23 shows examples of lid closure enforcement according to an embodiment. Step 2310 can prevent the lid from opening while the OMPA has a bucket temperature that exceeds an autolock temperature threshold. For example, the bucket can be heated to relatively high temperatures (e.g., such as 160 degrees F. or temperatures that are too hot for safe handling). When the temperature of the bucket is above the autolock temperature threshold, the OMPA may keep the lid lock by controlling the latch lock solenoid. In addition, the OMPA may use the lid motor to make it difficult for the user to manually override the latch lock. In this approach, the OMPA may sense that the user is attempting to open the lid by observing the encoder, which can indicate that the lid is rotating upwards. In response to this determination, the motor can then activate to rotate the lid back down.

In step 2320, the lid can be prevented from being opened if a lid lock function has been enabled. The lid lock may a user defined function (e.g., set by a parent) that prevents the lid from being opened unless an override feature is enabled (e.g., via an application). This way, the owner or parent can prevent a guest, child, or pet from accessing the OMPA unless the appropriate override command is provided or the lid lock function is turned off.

Figure 24B:
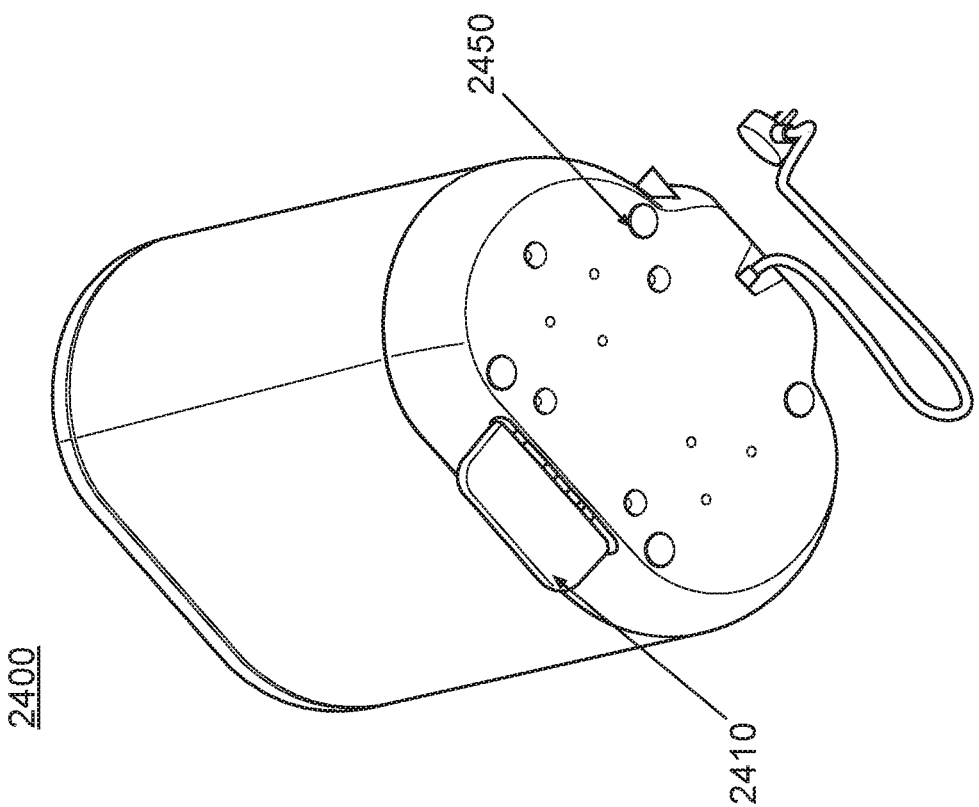
FIGS. 24A-24D show different illustrative views of an OMPA according to an embodiment.
Figure 24A:
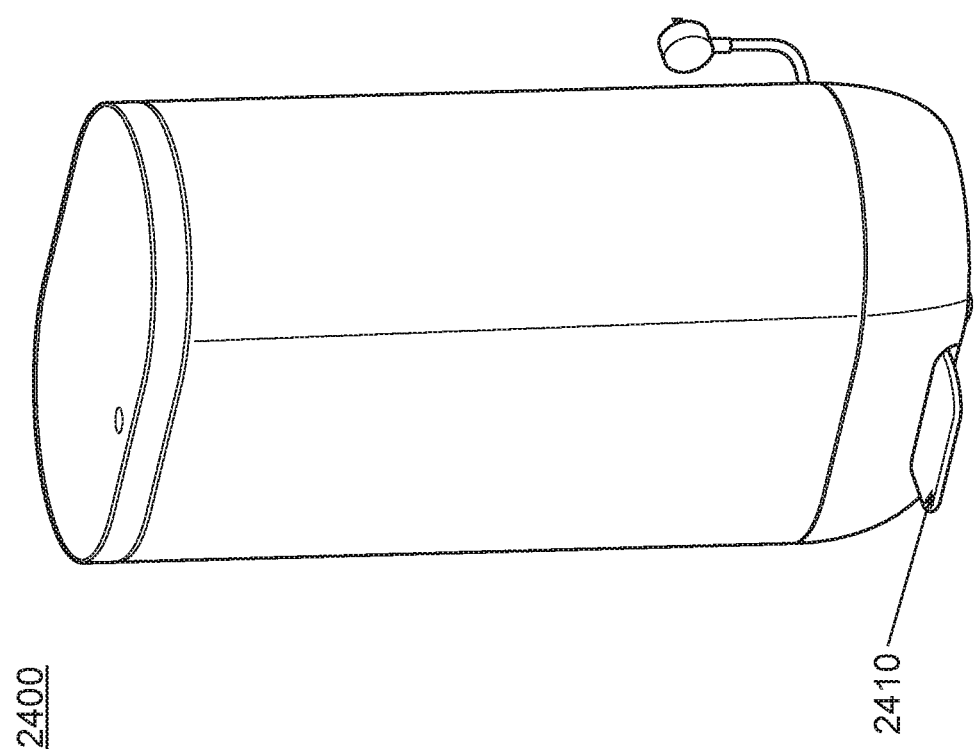
Figure 24C:
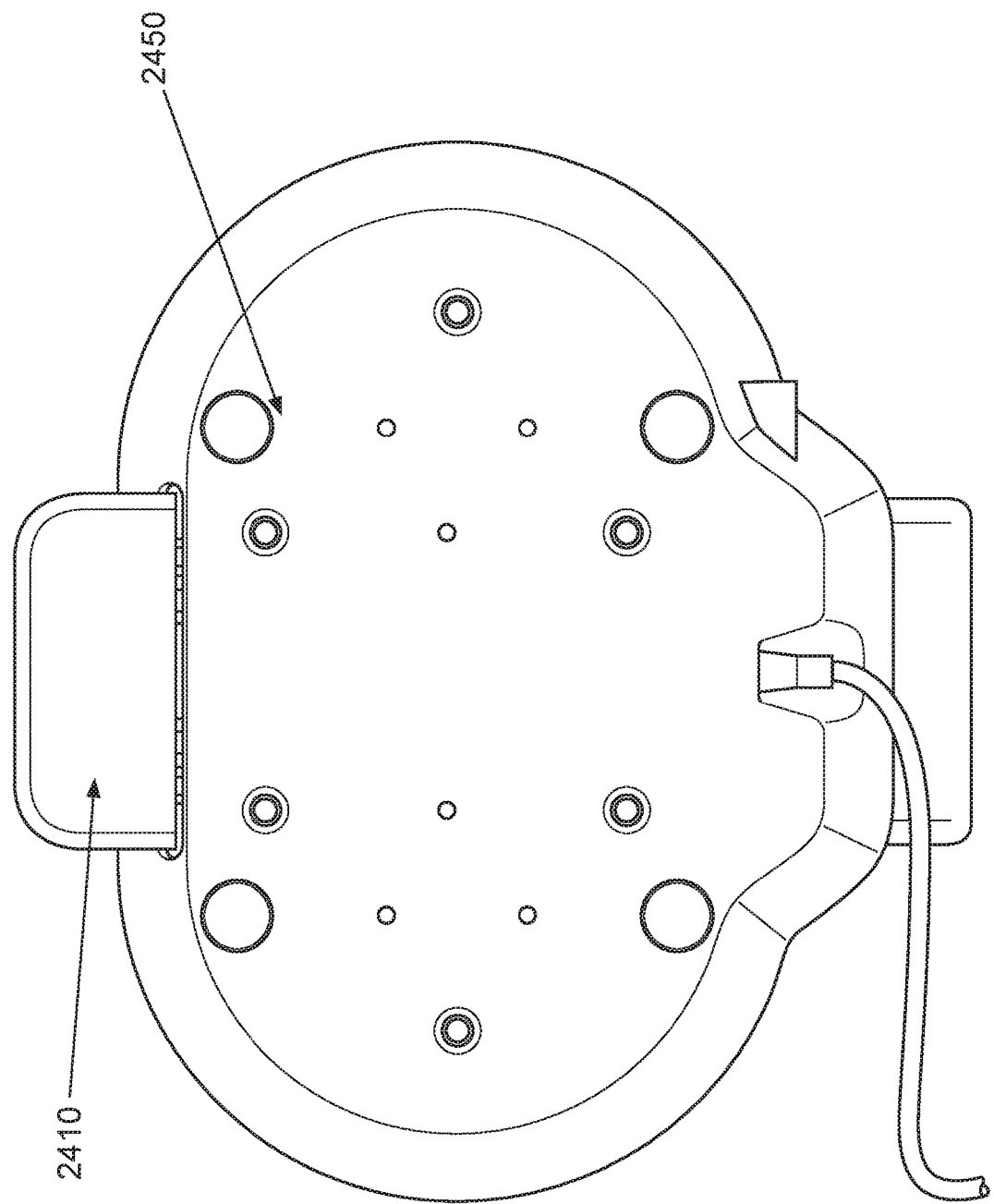
Figure 24D:
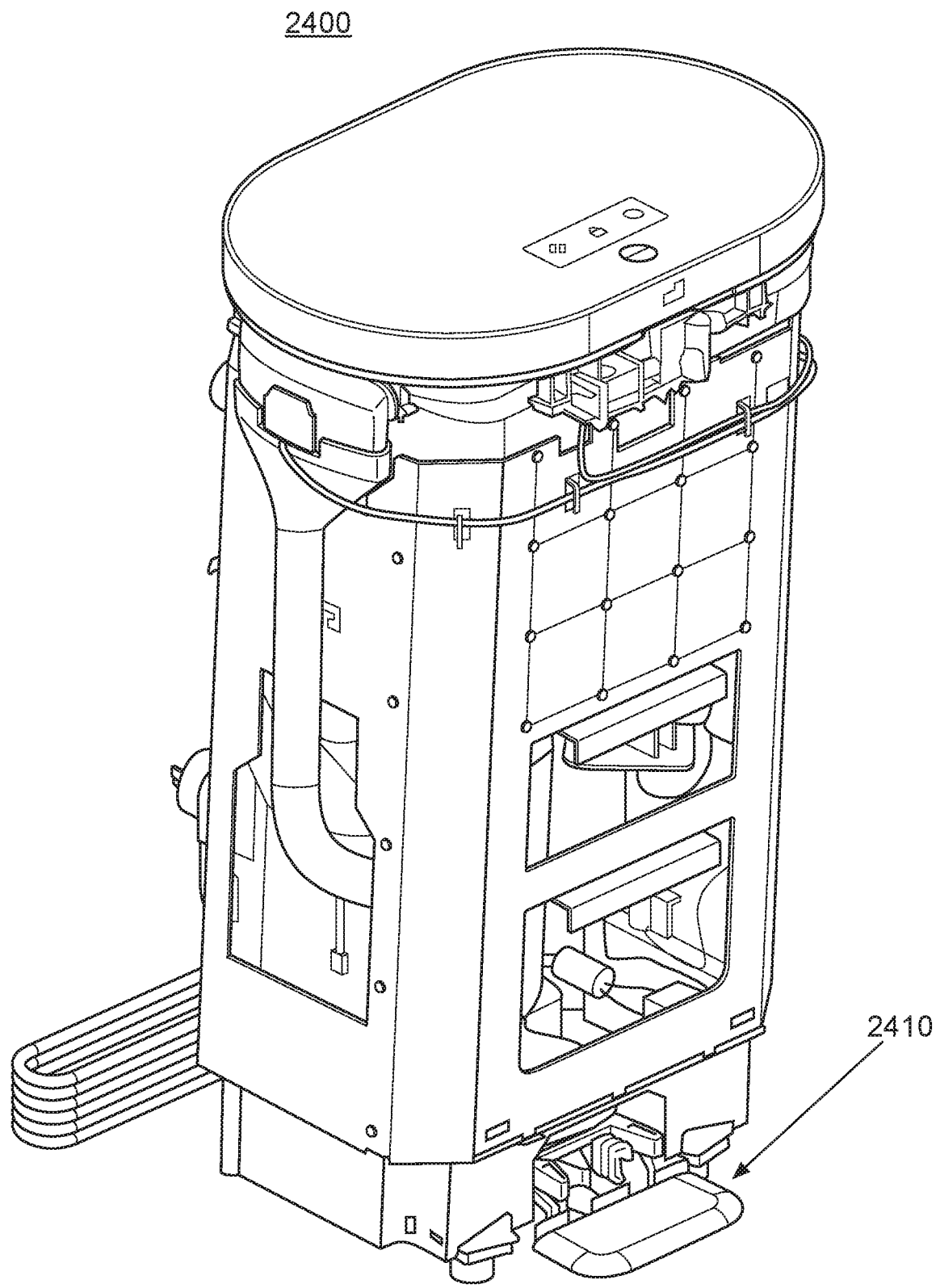

FIGS. 24A-24D show different illustrative views of an OMPA according to an embodiment. In particular, FIG. 24A shows a side perspective view of OMPA 2400 with emphasis on pedal assembly 2410, FIG. 24B shows a bottom perspective view of OMPA 2400 with emphasis on the mass sensing system 2450 and pedal assembly 2410, and FIG. 24C shows a bottom view of OMPA 2400 with emphasis on pedal assembly 2410 and mass sensing system 2450. FIG. 24D shows a OMPA 2400 with its cosmetic cover sleeve removed. As shown, pedal assembly 2410 is positioned near the bottom of OMPA 2400 and has a pedal member 2412 that extends outward and away from a front vertical surface of OMPA 2400 so that a user can press down on pedal member with his or her foot. Pedal assembly 2410 may include a switch, that when depressed, can cause a motor to activate and open the lid of OMPA 2400. In another embodiment, pedal assembly 2410 can be mechanically linked to the lid and is able to open the lid when pedal member 2412 is depressed. An electric switch embodiment of pedal assembly 2410 is discussed in more detail in connection with the text accompanying FIGS. 25-27. Mass sensing system 2450 is positioned at the bottom of OMPA 2400. As shown, mass sensing system 2450 can include four device feet 2451-2454 that serves as support structures that support the entirety of OMPA 2400. Additional details of mass sensing system 2450 are discussed below in connection with the test accompanying FIGS. 28-32.

Figure 25A:
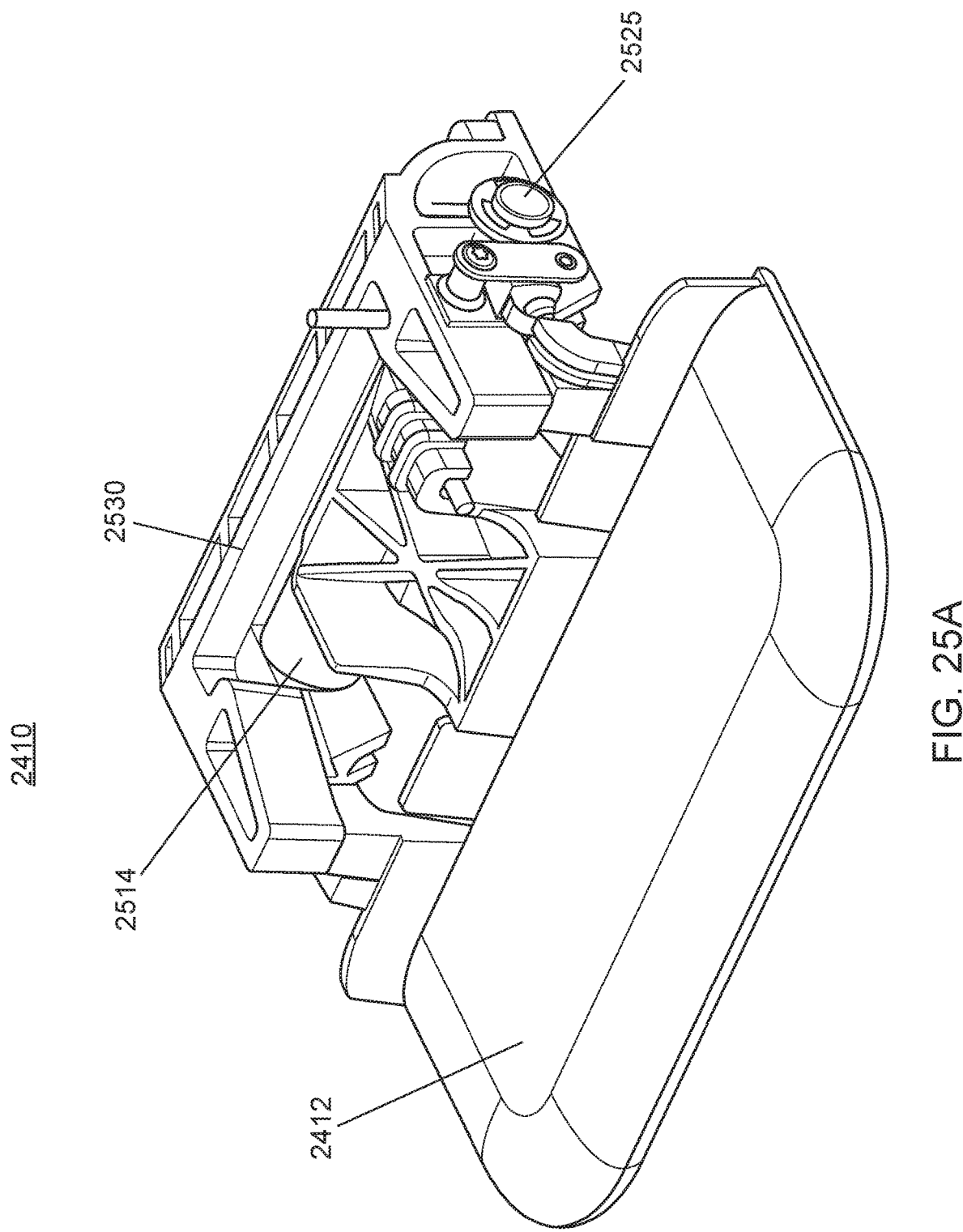
FIGS. 25A-25C show different illustrative views of a pedal assembly according to an embodiment.
Figures 25B, 26:
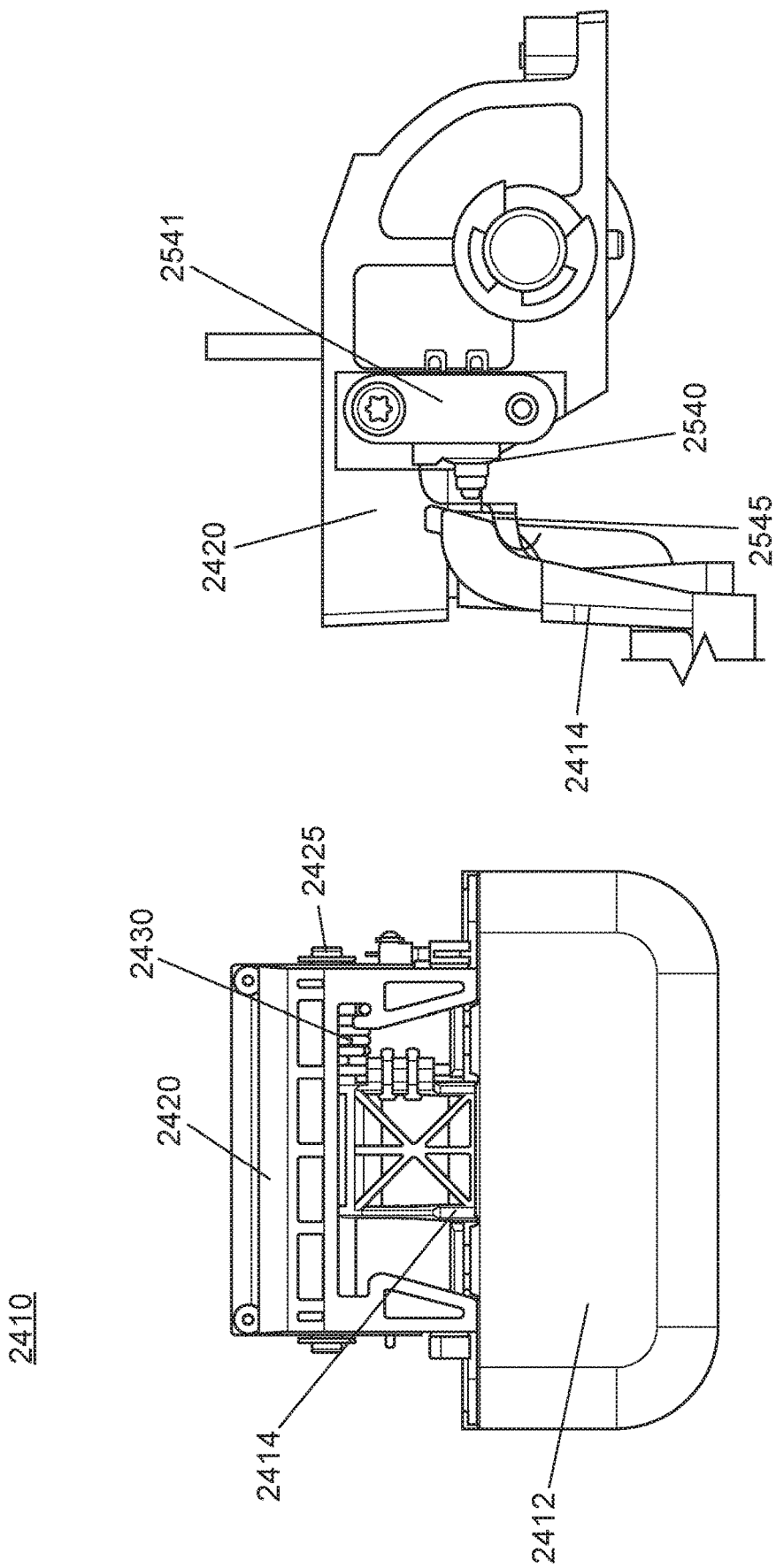
FIG. 26 shows an enlarged side view of a portion of the pedal assembly according to an embodiment.
Figure 25C:
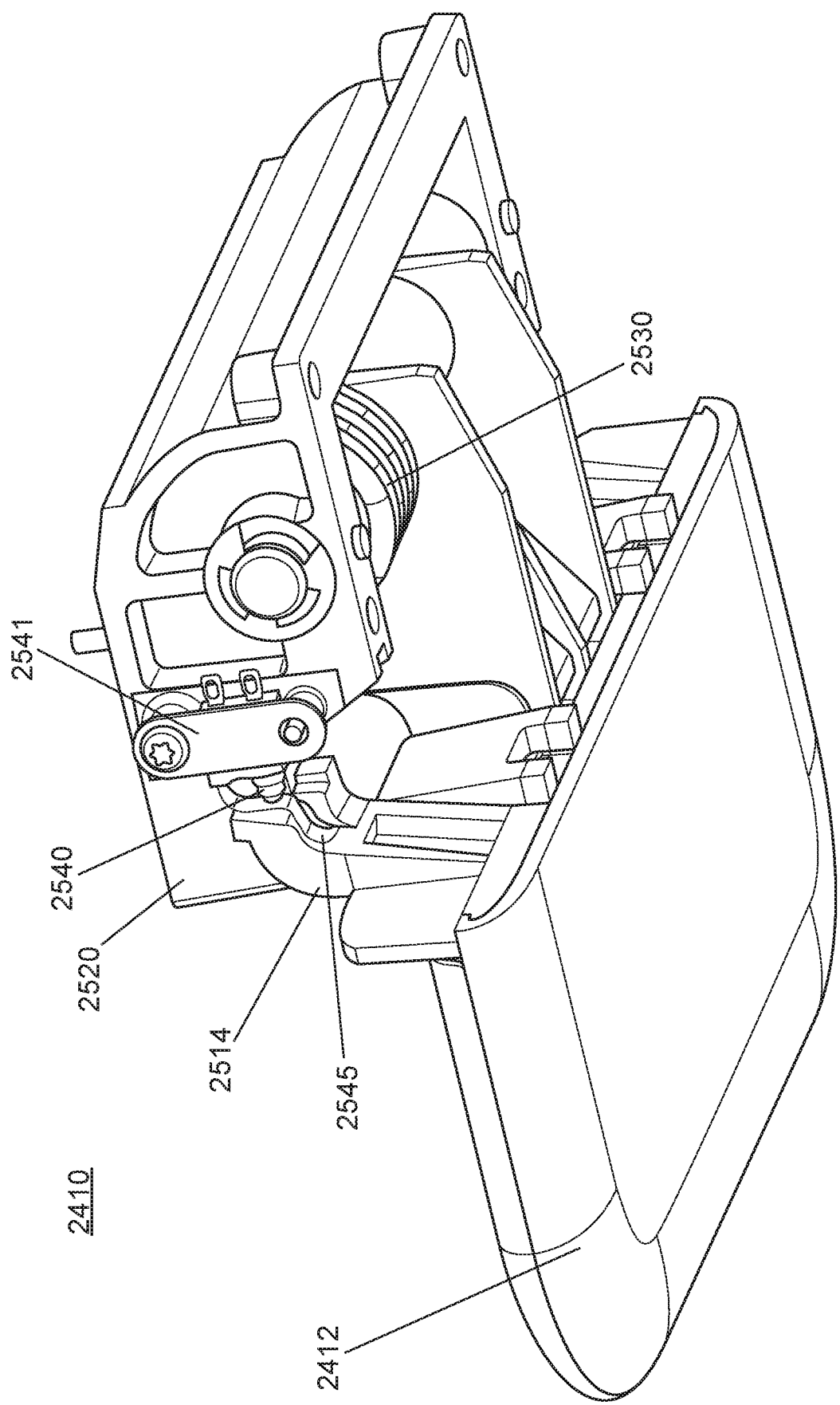

FIGS. 25A-25C show different illustrative views of pedal assembly 2410 according to an embodiment. FIGS. 25A-25C are referenced collectively in the following discussion. Pedal assembly 2410 includes pedal member 2412, pedal block core 2514, which is connected to pedal member 2412, pedal block mount 2520, which is connected to pedal block core 2514 via shaft 2525. Pedal member 2412 and pedal block core 2514 rotate about a rotation axis provided by shaft 2525. A pedal spring 2530 may be mounted along pedal shaft 2525, secured to pedal block core 2514, and to pedal block mount 2520. Pedal spring 2530 may bias pedal member 2412 to be in a non-depressed position. The non-depressed position may be when a planar surface of pedal member 2412 is substantially parallel to the floor or ground on which OMPA 2400 resides. In a depressed position, pedal member 2412 is rotated downwards towards the floor or ground and causes pedal switch 2540 to be activated.

Pedal switch 2540 is shown with more detail in FIG. 26, which shows an enlarged side view of a portion of pedal assembly 2410. Pedal switch 2540 can be mounted to pedal mount block 2520. Spring 2545 may extend from a pedal switch body 2541 and interface with pedal block core 2514. When pedal member 2412 is depressed, the rotation of block core 2514 can cause spring 2545 to depress switch 2540. When the user lifts his or her foot, pedal member 2412 returns to the non-depressed position and spring 2545 no longer depresses switch 2540.

Figure 27B:
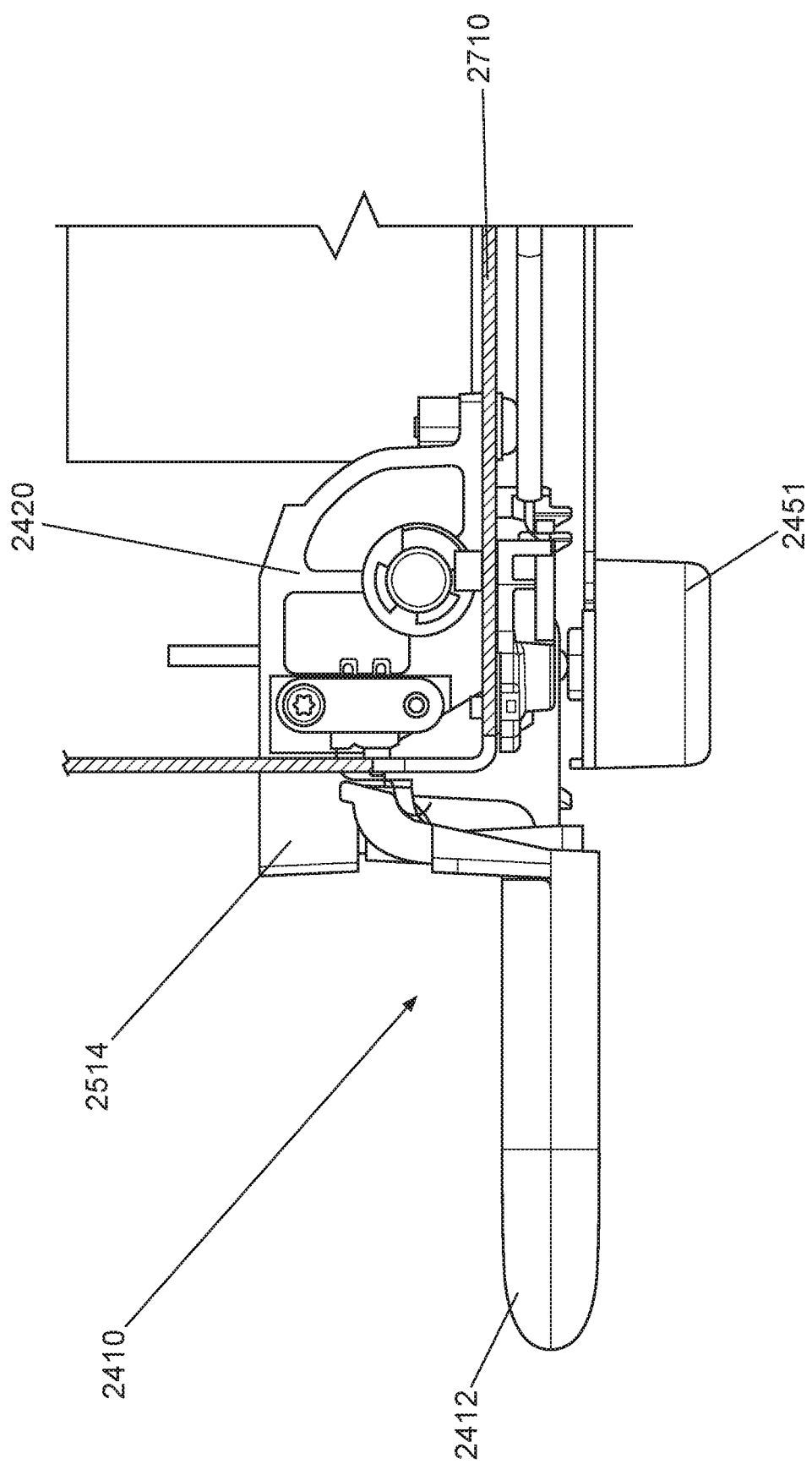
FIG. 27B shows an illustrative cross-sectional view taken along line B-B of FIG. 27A according to an embodiment.

FIG. 27A shows an illustrative bottom view of pedal assembly 2410 when viewed from the bottom of OMPA 2400 according to an embodiment. Enclosure 2710 can serve as a platform to which securing pedal mount block 2530 is secured (e.g., with screws or fasteners). FIG. 27B shows an illustrative cross-sectional view taken along line B-B of FIG. 27A. The cross-sectional view shows pedal mount block 2530 secured to enclosure 2710. Note that pedal member 2412 is in the non-depressed position and that a bottom plane 2413 is offset from a ground plane 2720 by a fixed distance (e.g., set by the height of device feet 2451-2454).

Figure 28:
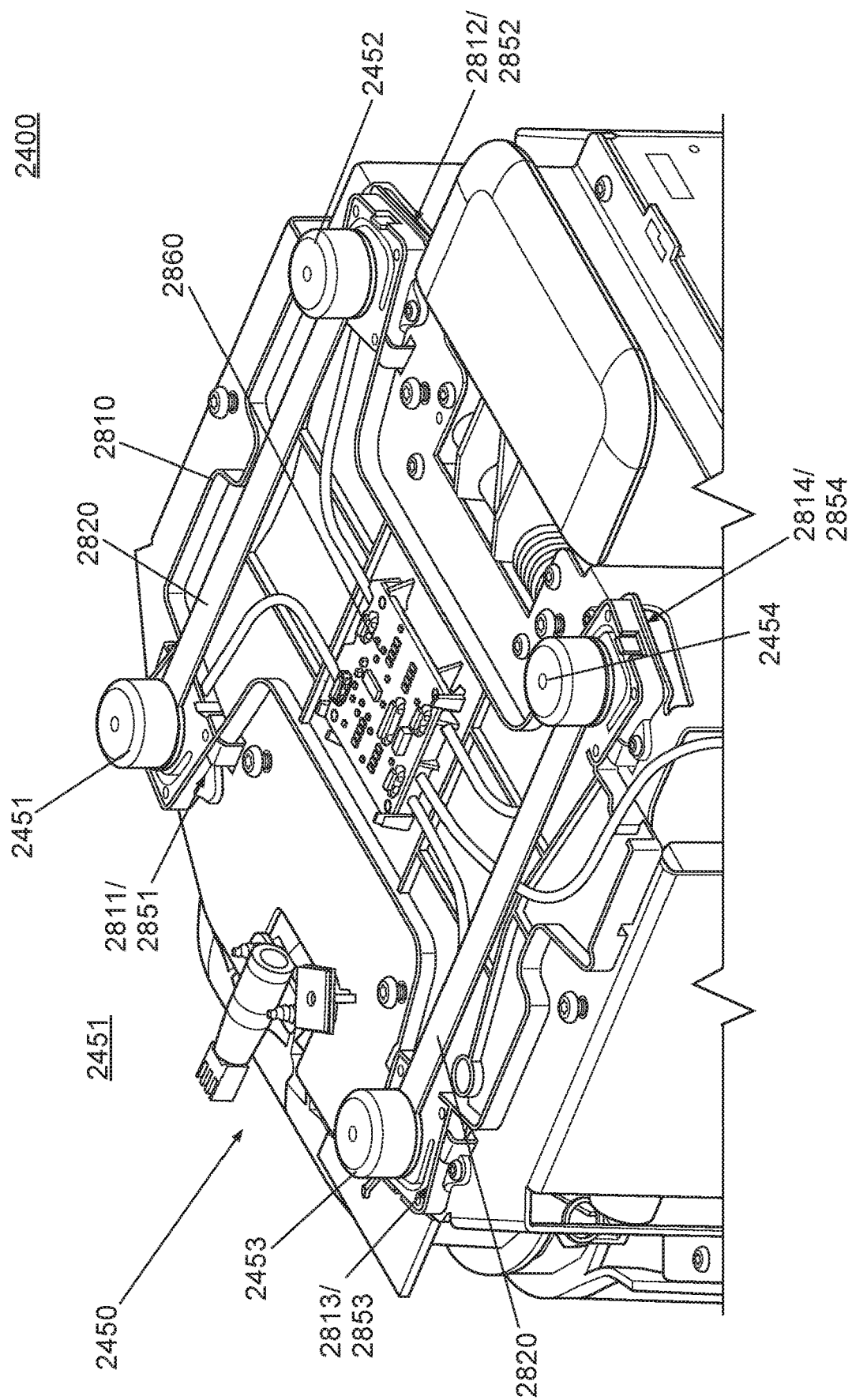
FIG. 28 shows an illustrative perspective view of a portion of the bottom of the OMPA according to an embodiment.
Figure 29:
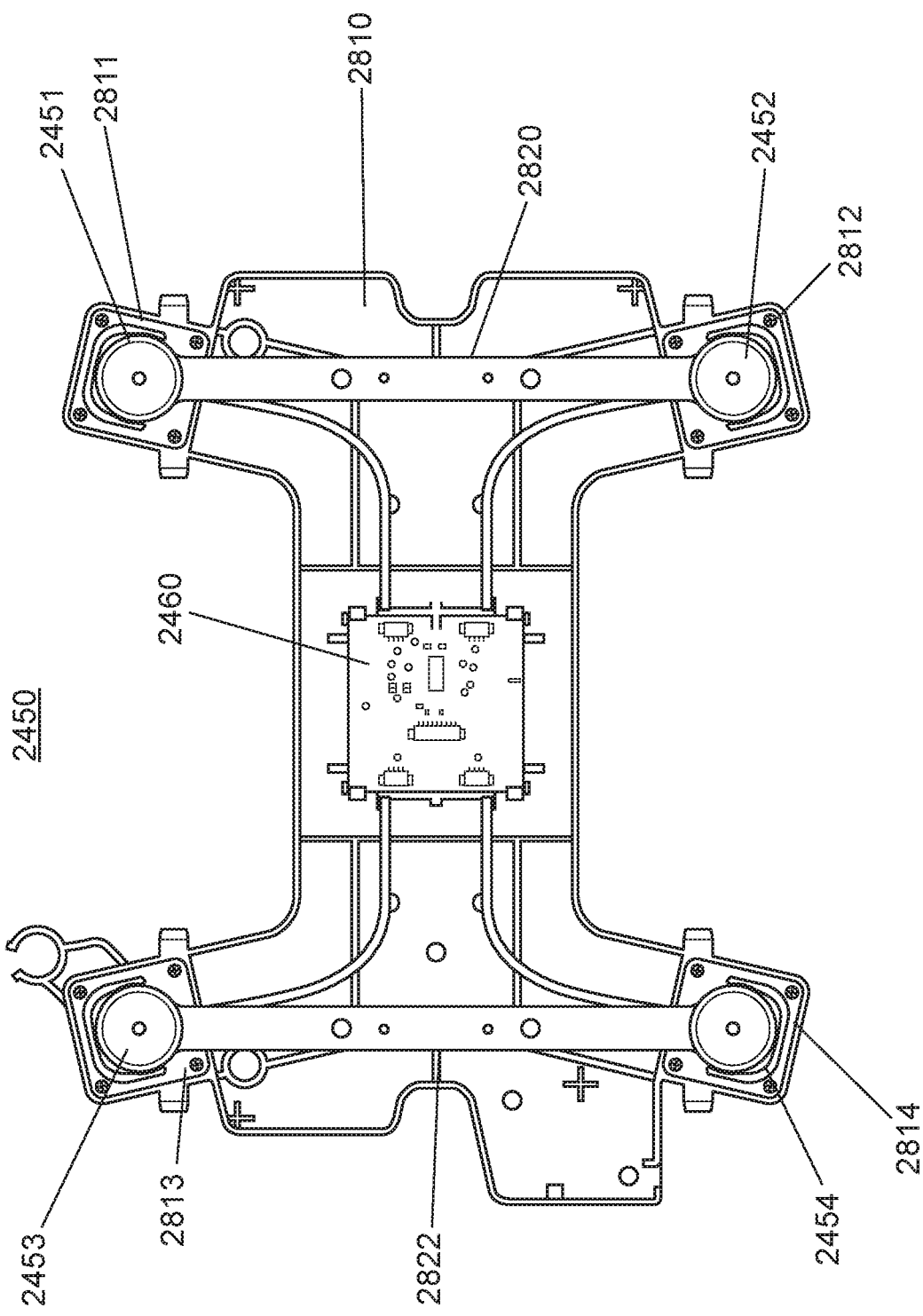
FIG. 29 shows components of a mass sensing system with other components of the OMPA omitted according to an embodiment.

FIG. 28 shows an illustrative perspective view of a portion of the bottom of the OMPA 2400 according to an embodiment. FIG. 29 shows components of mass sensing system 2450 with other components of the OMPA omitted. FIGS. 28 and 29 show many components of mass sensing system 2450, including feet 2451-2454, carrier 2810, feet retainers 2820 and 2822, load cells 2851-2854, circuit board 2860 with processor and thermistor. Carrier 2810 may be secured to enclosure 2710. Carrier 2810 has load cell retaining regions 2811-2814 for securing load cells 2851-2854 in place. Load cells 2851-2854 are secured in place in respective load cell retaining regions 2811-2814. Feet 2451 and 2452 are mounted to feet retainer 2820 and feet 2452 and 2453 are mounted to feet retainer 2822. As shown in FIG. 28, respective feet 2451-2454, load cells 2851-2854, and load cell retaining regions 2811-2814 are vertically stacked inline with each other. Thus, when OMPA 2400 is resting on feet 2451-2454, the weight of OMPA 2400 is supported by feet 2451-2454, load cells 2851-2854, carrier 2810 and enclosure 2710. Feet retainers 2820 and 2822 are secured to a cosmetic bottom (not shown in FIG. 28 but shown in FIGS. 30A-30D). In addition, feet retainer 2820 may span between load cell retaining regions 2811 and 2812 and feet retainer 2822 may span between load cell retaining regions 2812 and 2813. Feet retainers 2820 and 2822 are constructed to permit feet 2451-2454 to travel in a vertical direction (e.g., along a Y-axis) while being secured in place in both horizontal directions (e.g., along X and Z axes). A floating contact (not shown) existing between respective feet 2451-2454 and load cells 2851-2854 can transfer vertical loads therebetween. This load is measured by each load cell and the measurement is provided to the processor in circuit board 2860, which then computes the mass of the OMPA. The thermistor located on the circuit board may be used to temperature correct mass values measured by the load cells.

Figure 30A:
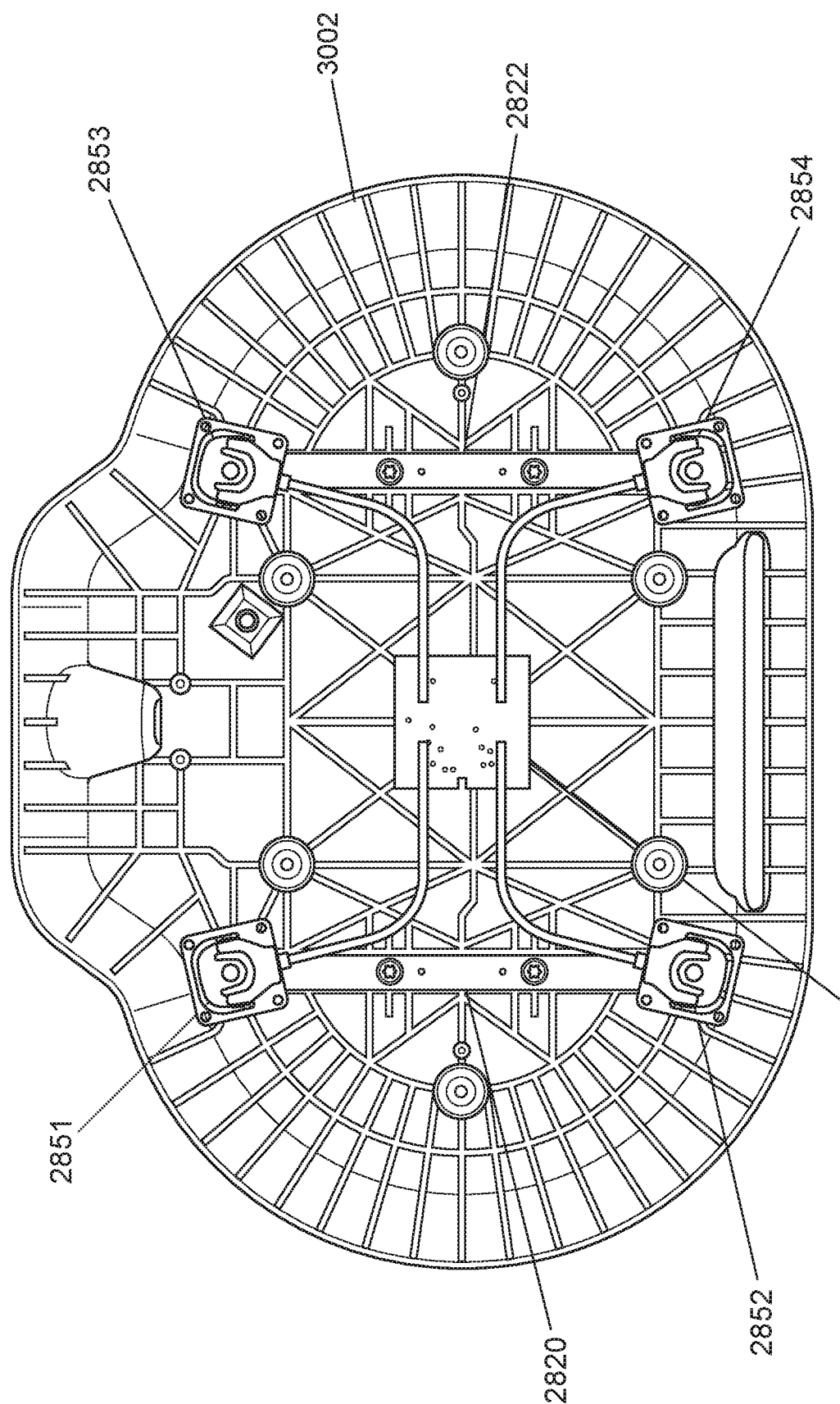
FIGS. 30A-30D show different parts of a mass sensor system according to various embodiments.
Figure 30B:
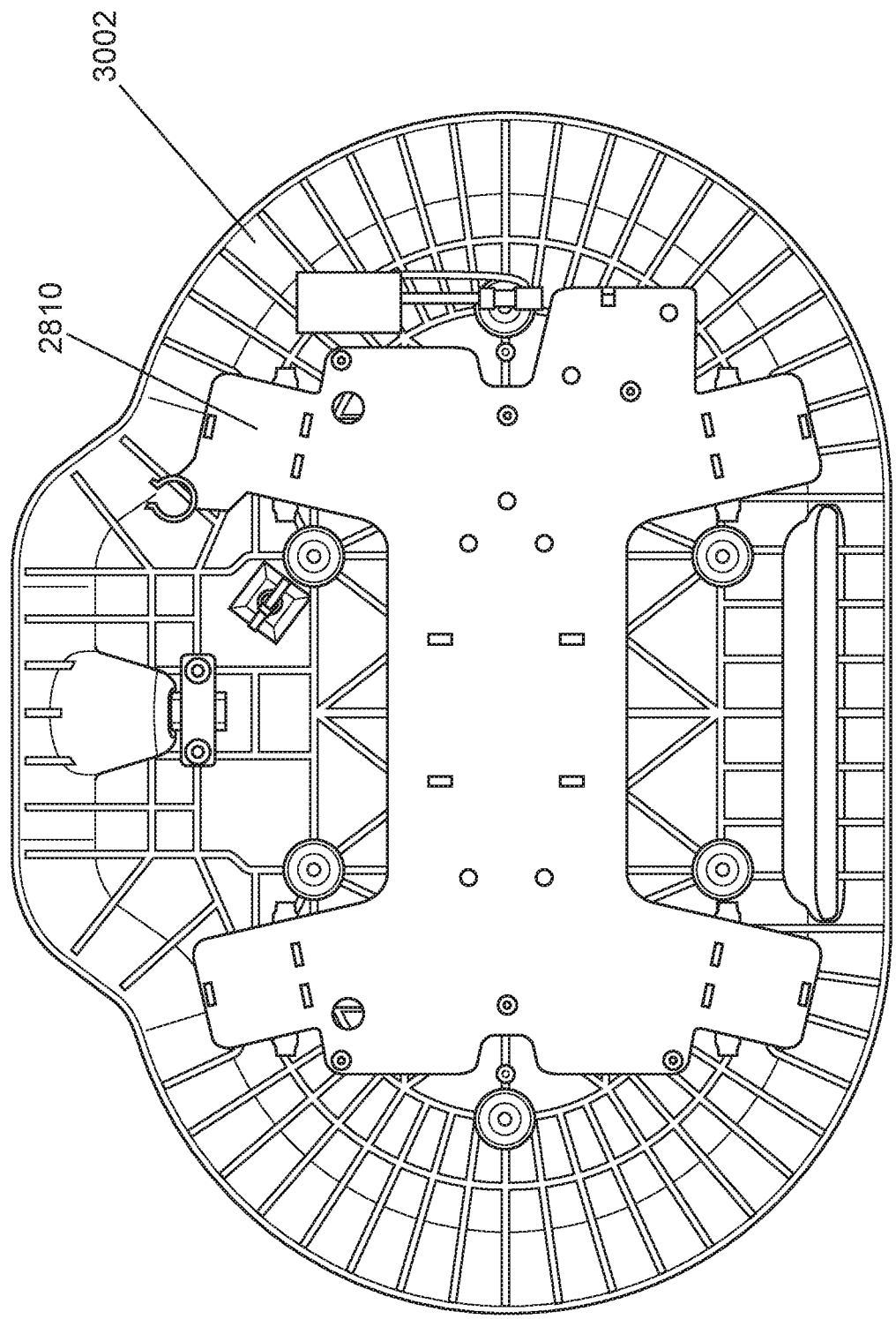
Figure 30C:
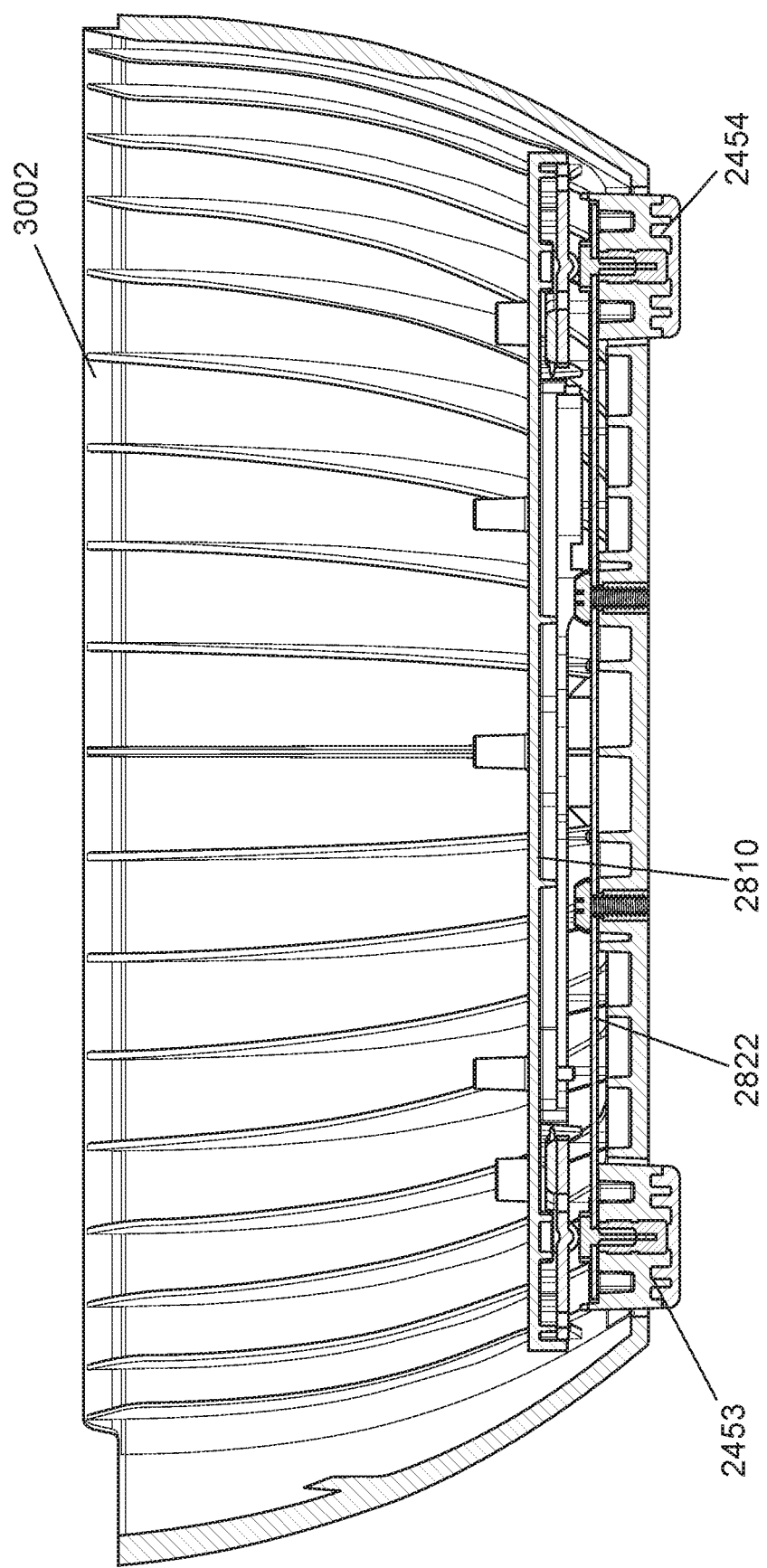
Figure 30D:
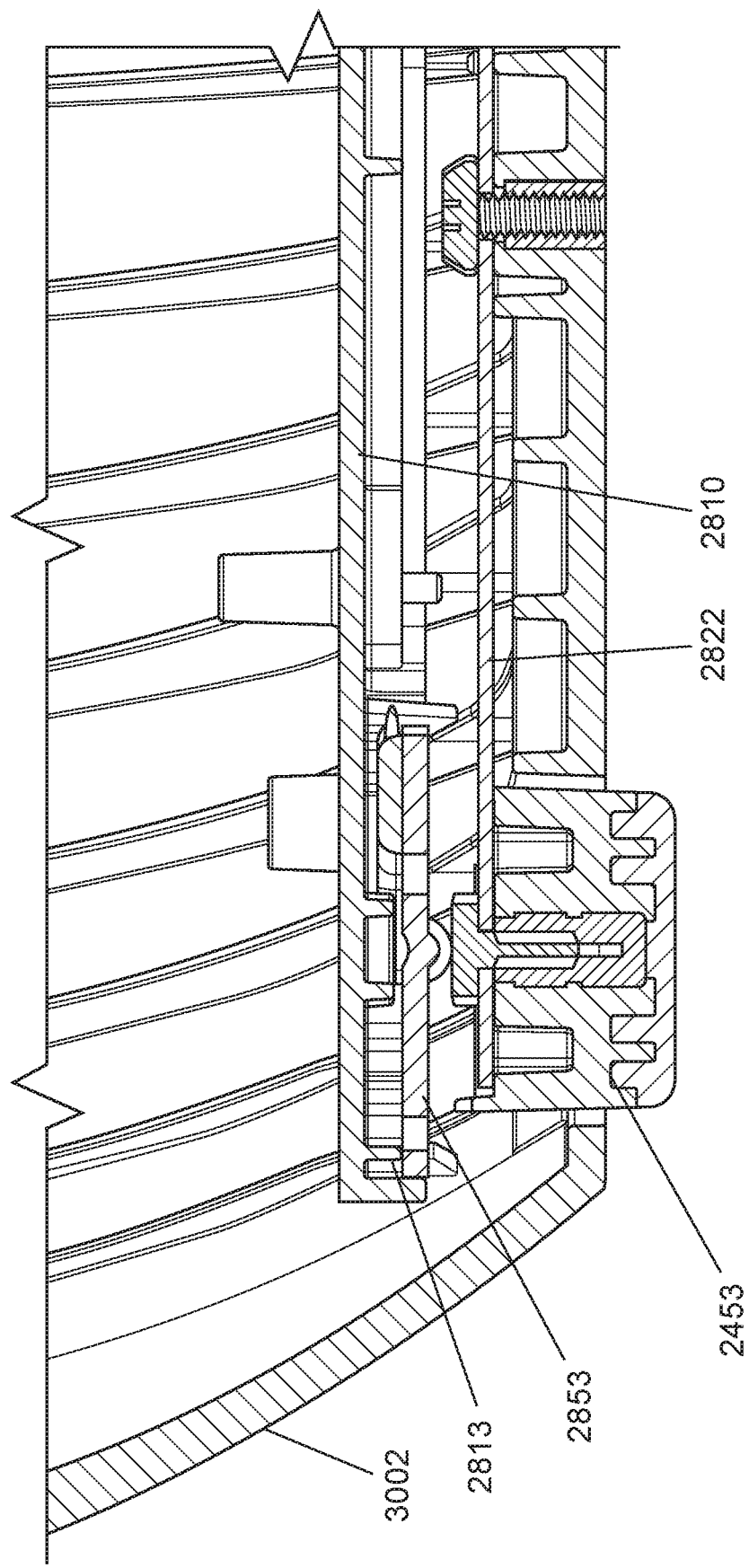

FIG. 30A shows parts of mass sensor system 2450 arranged with respect to a cosmetic bottom 3002 according to an embodiment. FIG. 30A shows an illustrative top view that includes load cells 2851-2854, feet retainers 2820 and 2822, and circuit board 2860. Feet 2451-2454 (not shown) are positioned below respective load cells 2851-2854. FIG. 30B shows carrier 2810 positioned above load cells 2851-2854, feet retainers 2820 and 2822, circuit board 2860, and feet 2451-2454 (none of which are shown). FIG. 30C shows an illustrative cross-sectional view a portion of mass sensor system and cosmetic bottom 3002. As shown, feet 2453 and 2454 extend through a holes existing in cosmetic bottom 3002. Feet retainer 2822 is shown positioned over feet 2453 and 2454 and secured to cosmetic bottom 3002 via screws or fasteners. Carrier 2810 is also shown with load cells 2853 and 2854 positioned above feet 2453 and 2454. Enclosure 2710, which the support structure carrier 2810 is secured to, is not shown. FIG. 30D shows an enlarged view of a portion of FIG. 30C according to an embodiment. FIG. 30D shows with more detail, cosmetic bottom 3002, foot 2453, feet retainer 2822, load cell 2853, load cell retaining region 2813, and carrier 2810.

Figure 31:
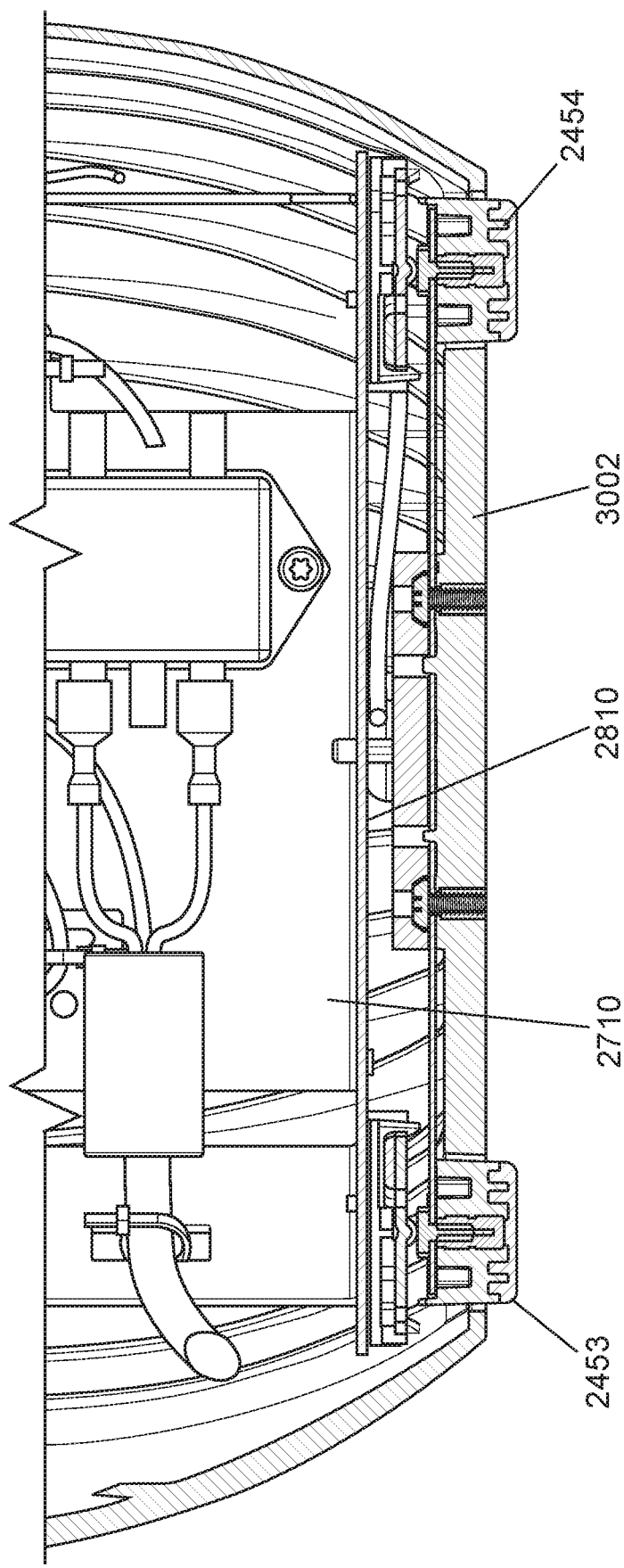
FIG. 31 shows an illustrative cross-sectional view the bottom portion of the OMPA with additional details not shown in FIGS. 30A-30D according to an embodiment.
Figure 32:
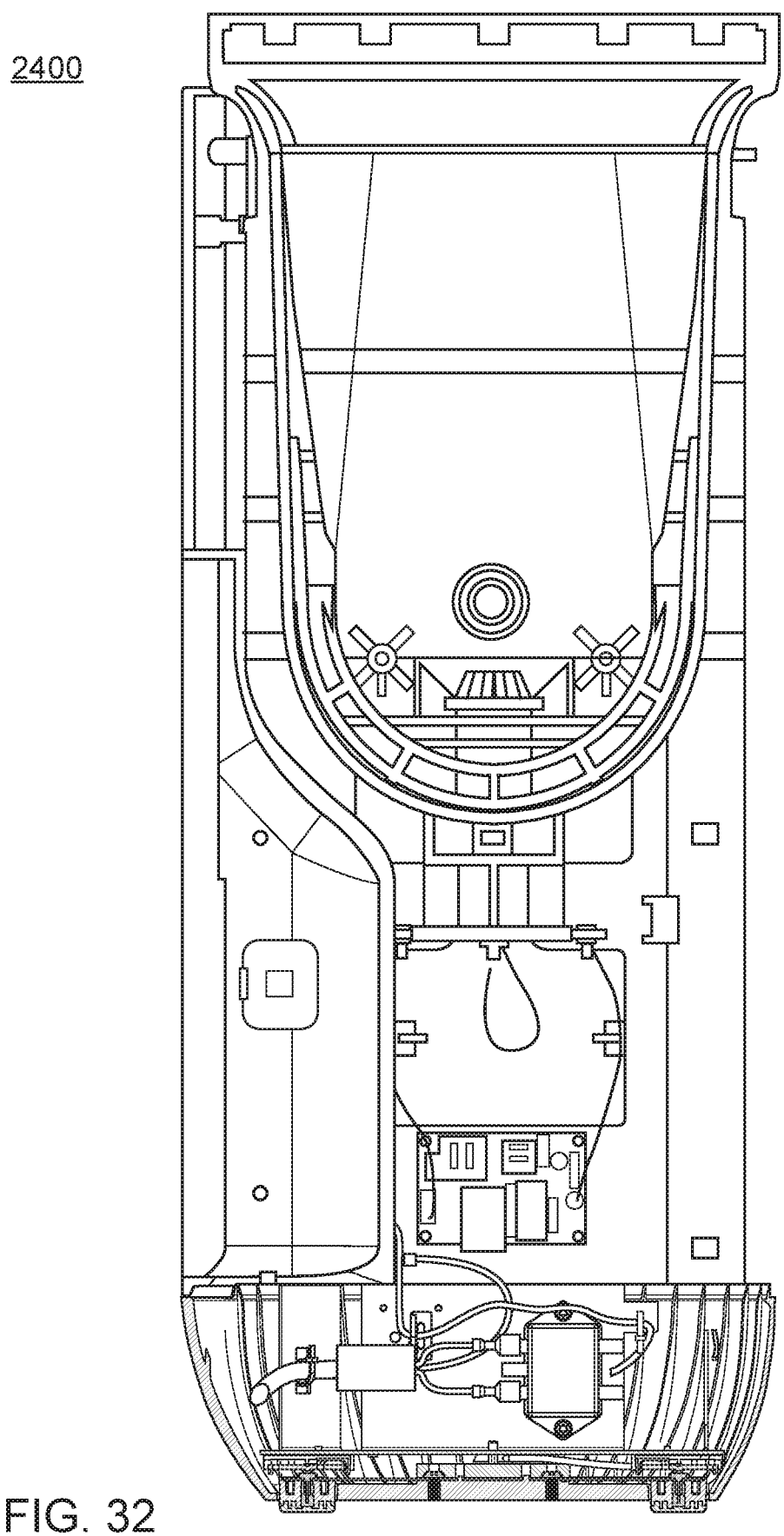
FIG. 32 shows that the entirety of the OMPA is supported by the mass sensing system according to an embodiment.

FIG. 31 shows an illustrative cross-sectional view the bottom portion of OMPA 2400 with additional details not shown in FIGS. 30A-30D. In FIG. 31, enclosure 2710 is shown with carrier 2810 attached thereto, along with load cells 2813 and 2814, feet 2513 and 2514, feet retainer 2822, and cosmetic bottom 3002. FIG. 32 shows an illustrative cross section of OMPA 2400 according to an embodiment. FIG. 32 shows that the entirety of the OMPA 2400 is supported by the mass sensing system. That is, the lid, bezel, bucket, grinding mechanism and motor, air treatment system, electronics, support structures, etc. are all being supported by the mass sensing system.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement" expressly extend beyond just the particular subset of statements but refers to any of the statements below.

Statement 1. An organic matter processing apparatus (OMPA), comprising:
- a bucket assembly for processing organic matter, the bucket assembly comprising a bucket, bucket heater, organic matter processing components, a motor, and at least one bucket temperature sensor;
- a lid assembly positioned above the bucket assembly and operative to open and close, the lid assembly comprising a lid fan, a lid heater, a first volatile organic compound (VOC) sensor, and a first temperature/humidity sensor;
- an air treatment system (ATS) coupled to receive untreated air from the bucket assembly, the air treatment system comprising an air treatment chamber, an ATS fan, and a second VOC sensor, and a second temperature/humidity sensor;
- a mass sensing system operative to measure mass; and
- a controller operative to control functions of the OMPA based at least in part on feedback data received from the at least one bucket temperature sensor, the first VOC sensor, the second VOC sensor, the first temperature/humidity sensor, and the second temperature/humidity sensor, and the mass sensing system.

Statement 2. The OMPA of any previous statement, wherein the air treatment system further comprises a third VOC sensor and a third temperature/humidity sensor, and wherein the controller is further operative to receive feedback data from the third VOC sensor and the third temperature/humidity sensor.

Statement 3. The OMPA of any previous statement, wherein the second VOC sensor and the second temperature/humidity sensor are positioned to monitor the untreated air upstream of the air treatment chamber, and wherein the third VOC sensor and the third temperature/humidity sensor are positioned to monitor treated air downstream of the air treatment chamber.

Statement 4. The OMPA of any previous statement, wherein the controller is operative to determine an end of life of the air treatment chamber based on the feedback data received from the second VOC sensor and the second temperature/humidity sensor and the third VOC sensor and the third temperature/humidity sensor Statement 5. The OMPA of any previous statement, wherein the controller is operative to receive additional feedback data from the group consisting of the motor, the bucket heater, the lid fan, the ATS fan, and the lid heater.

Statement 6. The OMPA of any previous statement, wherein the controller is operative to convert OMPA input to OMPA output by controlling the bucket motor, the bucket heater, the lid fan, and the lid heater in combination with the feedback data.

Statement 7. The OMPA of any previous statement, wherein the organic matter processing components comprise a cut and paddle assembly and a blade array, wherein the cut and paddle assembly is mechanically coupled to the bucket motor and operative to rotate around an axis and pass by the blade array during rotation.

Statement 8. The OMPA of any previous statement, wherein the second fan is operative to push the untreated air through the air treatment chamber to convert the untreated air to the treated air, and wherein the treated air is exhausted from the OMPA.

Statement 9. The OMPA of any previous statement, wherein the lid assembly further comprises:
- a first lid switch that provides feedback data to the controller indicative of whether a lid of the lid assembly is closed; and
- a latch switch that provides feedback data to the controller indicative of whether a latch of the lid assembly is locked.

Statement 10. The OMPA of any previous statement, wherein the lid assembly further comprises a second lid switch that provides feedback data indicative of whether the lid is closed.

Statement 11. The OMPA of any previous statement, wherein the lid assembly further comprises a physical safety switch that provides feedback data indicative of whether the lid is closed.

Statement 12. The OMPA of any previous statement, further comprising a blade position sensor that provides feedback indicative of a position of the organic matter processing components.

Statement 13. The OMPA of any previous statement, further comprising a bucket present switch that provides feedback indicative of whether the bucket is present.

Statement 14. The OMPA of any previous statement 14, wherein the bucket assembly comprises an electrical interface, the electrical interface including a thermistor operative to provide feedback indicative of whether the bucket is present.

Statement 15. The OMPA of any previous statement, further comprising a pedal switch that provides feedback indicative of a user activated lid open event.

Statement 16. The OMPA of any previous statement, wherein the lid assembly further comprises a lid motor and an encoder, wherein the controller is operative to receive feedback data from the motor and the encoder.

Statement 17. The OMPA of any previous statement, wherein the mass sensing system comprises:
  a plurality of mass sensors; and
  a printed circuit board comprising a fourth temperature sensor and a mass processor, the mass processor operative to:
    receive mass values from the plurality of mass sensors;
    calculate a total mass value based on the received mass values;
    compensate the total mass value based on feedback received from the fourth temperature sensor; and
    provide the compensated total mass value to the controller.

Statement 18. The OMPA of any previous statement, wherein the first fan is operative to pull ambient air into the lid assembly and push the ambient air into the bucket assembly.

Statement 19. The OMPA of any previous statement, wherein the lid assembly further comprises a lid motor and an encoder, wherein the lid motor is operative to open and close the lid, and wherein the encoder provides position information to the controller.

Statement 20. An organic matter processing apparatus (OMPA), comprising:
  a lid assembly comprising a movable lid, a first lid switch, a second lid switch, and a physical safety switch;
  a bucket assembly comprising a bucket, a bucket heater, a bucket motor; a first bucket temperature sensor; a second bucket temperature sensor; and a bucket present switch;
  AC cutoff operative to cut AC power to the bucket heater;
  DC cutoff operative to cut DC power to the bucket motor;
  a master control unit (MCU) operative to:
    receive MCU feedback comprising data received from the second lid switch and the second bucket temperature sensor; and
    enforce a safety protocol, based on the received MCU feedback data by deactivating the bucket heater and the bucket motor with signal control and by enabling the AC cutoff and the DC cutoff; and
  a safety monitor operative to:
    receive safety monitor feedback comprising data received from the first lid switch, the physical safety switch, the first bucket temperature sensor, and the bucket present switch; and
    enforce the safety protocol by enabling the AC cutoff and the DC cutoff.

Statement 21. The OMPA of any previous statement, wherein when the second lid switch indicates that the movable lid is open or when the second bucket temperature exceeds a temperature threshold, the MCU enforces the safety protocol.

Statement 22. The OMPA of any previous statement, wherein when the first lid switch indicates that the moveable lid is open, when the physical safety switch indicates that the movable lid is open, when the first bucket temperature exceeds a temperature threshold, when the bucket present switch indicates that the bucket is not present, the safety monitor enforces the safety protocol.

Statement 23. The OMPA of any previous statement, wherein the lid assembly further comprises a lid fan and lid heater, wherein the OMPA further comprises an air treatment system (ATS) comprising an ATS fan, wherein the AC cutoff is further operative to cut AC power to the lid heater, and wherein the DC cutoff is further operative to cut DC power to the lid fan and the ATS fan.

Statement 24. The OMPA of any previous statement, wherein the lid assembly further comprises a latch and a latch switch that detects whether the latch is locked, wherein the received MCU feedback comprises data received from the latch switch, and wherein when the latch switch indicates the latch is not locked, the MCU enforces the safety protocol.

Statement 25. The OMPA of any previous statement, further comprising a pedal and a pedal switch that detects whether the pedal has been depressed, wherein the received MCU feedback comprises data received from the pedal switch, and wherein when the pedal switch indicates the pedal is depressed, the MCU enforces the safety protocol.

Statement 26. The OMPA of any previous statement, further comprising a mass sensing system that measures mass, wherein the received MCU feedback comprises data received from the mass sensing system, and wherein if the measured mass dynamically changes within a fixed period of time, the MCU enforces the safety protocol.

Statement 27. The OMPA of any previous statement, wherein the fixed period of time ranges between 1 and 5 seconds.

Statement 28. The OMPA of any previous statement, wherein the safety monitor is further operative to verify that a plurality of electrically enabled components are reporting normal operation, and wherein if any one of the plurality of electrically enabled components is not reporting normal operation, the safety monitor enforces the safety protocol.

Statement 29. The OMPA of any previous statement 29, wherein the safety monitor is further operative to enforce the safety protocol by deactivating the bucket heater and the bucket motor with signal control.

Statement 30. An organic matter processing apparatus (OMPA), comprising:
  a master control unit (MCU) operative to control OMPA functionality based on received MCU feedback and enforce a safety protocol based on the received MCU feedback;
  a safety monitor operative to enforce the safety protocol based on received safety monitor feedback;
  MCU controlled components comprising safety protocol components; and
  a power cutoff operative to cut power to the safety protocol components, wherein the power cutoff is jointly controlled by the MCU and the safety monitor and is enabled when the received MCU feedback or the received safety monitor feedback includes data that require enforcement of the safety protocol.

Statement 31. The OMPA of any previous statement, wherein the received MCU feedback is obtained from sources that are mutually exclusive to sources that provide the received safety monitor feedback.

Statement 32. The OMPA of any previous statement, wherein the MCU is a firmware controller and the safety monitor is a ROM based controller that serves as a safety backup to the Statement 33. The OMPA of any previous statement, wherein the received MCU feedback comprises first lid open status obtained from a first lid switch and first bucket temperature obtained from a first temperature sensor, and wherein the received safety monitor feedback comprises second lid open status obtained from a second lid switch and a second bucket temperature obtained from a second temperature sensor.

Statement 34. The OMPA of any previous statement, wherein when the first lid open status indicates that a lid is open, the MCU enables the power cutoff, wherein when the second lid open status indicates that the lid is open, the safety monitor enables the power cutoff, wherein when the first bucket temperature exceeds a temperature threshold, the MCU enables the power cutoff, and wherein when the second bucket temperature exceeds the temperature threshold, the safety monitor enables the power cutoff.

Statement 35. The OMPA of any previous statement, wherein the received safety monitor feedback further comprises third lid open status obtained from a physical safety switch, and wherein when the third lid open status indicates that the lid is open, the safety monitor enables the power cutoff.

Statement 36. The OMPA of any previous statement, wherein the received safety monitor feedback further comprises bucket present status obtained from a bucket present switch, and wherein when the bucket present status indicates that a bucket is not present, the safety monitor enables the power cutoff.

Statement 37. The OMPA of any previous statement, wherein the safety protocol components comprise a bucket motor and a bucket heater.

Statement 38. The OMPA of any previous statement 38, wherein the safety protocol components further comprise a lid heater, a lid fan, and an air treatment system fan.

Statement 39. The OMPA of any previous statement, wherein the received MCU feedback comprises latch lock status obtained from a latch switch, and wherein when the latch lock status indicates that a latch is not locked, the MCU enables the power cutoff.

Statement 40. A method for operating an organic matter processing apparatus (OMPA) comprising a lid, a bucket, a bucket motor, a bucket heater, a master control unit (MCU), and a safety monitor, the method comprising:
controlling OMPA functionality via the MCU;
receiving MCU feedback at the MCU, wherein the MCU is operative to enforce a safety protocol based on the received MCU feedback;
receiving safety monitor feedback at the safety monitor, wherein the safety monitor is operative to enforce the safety protocol based on the received safety monitor feedback; and
jointly enforcing the safety protocol, via the MCU and the safety monitor, by cutting power to the bucket motor and the bucket heater when the received MCU feedback or the received safety monitor feedback includes data that require enforcement of the safety protocol.

Statement 41. The method of any previous statement, wherein the received MCU feedback is obtained from sources that are mutually exclusive to sources that provide the received safety monitor feedback.

Statement 42. The method of any previous statement, wherein the received MCU feedback comprises first lid open status obtained from a first lid switch and first bucket temperature obtained from a first temperature sensor, and wherein the received safety monitor feedback comprises second lid open status obtained from a second lid switch and a second bucket temperature obtained from a second temperature sensor.

Statement 43. The method of any previous statement, wherein when the first lid open status indicates that a lid is open, the MCU enables power cutoff, wherein when the second lid open status indicates that the lid is open, the safety monitor enables power cutoff, wherein when the first bucket temperature exceeds a temperature threshold, the MCU enables power cutoff, and wherein when the second bucket temperature exceeds the temperature threshold, the safety monitor enables power cutoff.

Statement 44. The method of any previous statement, wherein the received safety monitor feedback further comprises third lid open status obtained from a physical safety switch, and wherein when the third lid open status indicates that the lid is open, the safety monitor enables power cutoff.

Statement 45. The method of any previous statement, wherein the received safety monitor feedback further comprises bucket present status obtained from a bucket present switch, and wherein when the bucket present status indicates that a bucket is not present, the safety monitor enables power cutoff.

Statement 46. The method of any previous statement, wherein the received MCU feedback comprises latch lock status obtained from a latch switch, and wherein when the latch lock status indicates that a latch is not locked, the MCU enables power cutoff.

Statement 47. The method of any previous statement, wherein OMPA further comprises a lid heater, a lid fan, and an air treatment system fan, wherein said jointly enforcing the safety protocol, via the MCU and the safety monitor, further comprises cutting power to the lid heater, the lid fan, and the air treatment system fan when the received MCU feedback or the received safety monitor feedback includes data that require enforcement of the safety protocol.

Statement 48. The method of any previous statement, further comprising:
if the lid is open based on received MCU feedback or the received safety monitor feedback, cutting power to the bucket motor and the bucket heater; and
if the lid is closed and predetermined conditions are met to restore power to the bucket motor and the bucket heater, restoring power to the bucket motor and the bucket heater Statement 49. The method of any previous statement, further comprising verifying that a plurality of electrically enabled components are reporting normal operation, and wherein if any one of the plurality of electrically enabled components is not reporting normal operation, enforcing the safety protocol via the safety monitor.

Statement 50. A method for operating an organic matter processing apparatus (OMPA) comprising a lid, a lid heater, a lid fan, a bucket, a bucket motor, a bucket heater, an air treatment fan, a plurality of sensors, a plurality of switches, a mass sensing system, a master control unit (MCU), and a safety monitor, the method comprising:
executing OMPA processing to convert OMPA input to OMPA output;

monitoring operation of the bucket heater, the bucket motor, the lid heater, the lid fan, the air treatment fan, the mass sensing system, and the plurality of sensors;
adjusting the OMPA processing based on the monitoring; and
if monitored operation of any one of the bucket heater, the bucket motor, the lid heater, the lid fan, the air treatment fan, the mass sensing system, and the plurality of sensors is determined to be not normal, enforcing a safety protocol.

Statement 51. The method of any previous statement, wherein enforcing a safety protocol comprises cutting power to the bucket motor and the bucket heater.

Statement 52. The method of any previous statement 52, wherein enforcing a safety protocol comprises cutting power to the bucket motor, the bucket heater, the lid heater, the lid fan, and the AT fan.

Statement 53. The method of any previous statement, further comprising:
receiving MCU feedback by the MCU, wherein the MCU is operative to enforce the safety protocol based on the received MCU feedback; and
receiving safety monitor feedback by the safety monitor, wherein the safety monitor is operative to enforce the safety protocol based on the received safety protocol.

Statement 54. The method of any previous statement, wherein the received MCU feedback comprises data received from a first subset of the plurality of sensors and a first subset of the plurality of switches and wherein the received safety monitor feedback comprises data received from a second subset of the plurality of sensors and a second subset of the plurality of sensors, wherein the first subset and the second subset of the plurality of sensors are mutually exclusive, and wherein the first subset and the second subset of the plurality of switches are mutually exclusive.

Statement 55. The method of any previous statement, wherein the received MCU feedback comprises electrical characteristics of the bucket motor, the bucket heater, the lid fan, the lid heater, and the air treatment fan.

Statement 56. The method of any previous statement, wherein the OMPA further comprises a lid motor operative to open and close the lid, wherein the received MCU feedback comprises electrical characteristics of the lid motor, wherein the MCU is operative to disable the lid motor if current consumption by the lid motor exceeds a current threshold.

Statement 57. The method of any previous statement, further comprising confirming co-dependent components are operating within predetermined operating criteria.

Statement 58. The method of any previous statement, wherein said confirming co-dependent components are operating within predetermined operating criteria comprises:
confirming that the lid fan is operating before activating the lid heater;
confirming that the lid fan is operating before activating the bucket heater; and
confirming that the bucket motor is operating before activating the bucket heater.

Statement 59. The method of any previous statement, further comprising:
detecting receipt of OMPA input via the mass sensor system;
determining if mass of the received OMPA input contained the bucket is above a predetermined mass threshold;
if the determined mass is above the predetermined mass threshold, executing the OMPA processing; and
if the determined mass is not above the predetermined mass threshold, suspending operation of the bucket heater.

Statement 60. The method of any previous statement, further comprising:
sanitizing OMPA input;
deactivating the bucket heater, the bucket motor, and the lid heater when the sanitizing is complete; and
running the lid fan to cool the bucket when the sanitizing is complete.

Statement 61. The method of any previous statement, further comprising:
preventing the lid from opening while a bucket temperature exceeds a temperature threshold.

Statement 62. The method of any previous statement, further comprising preventing the lid from opening if a lid lock function is enabled.

Statement 63. The method of any previous statement, wherein the plurality of sensors comprise at least two temperature/humidity sensors, at least two bucket temperature sensors, and at least two volatile organic compound sensors.

Statement 64. The method of any previous statement, wherein the plurality of switches comprises at least two lid switches and a latch switch.

Statement 65. The method of any previous statement, wherein the plurality of switches further comprises a pedal switch and a bucket present switch.

What is claimed is:

1. A method for operating an organic matter processing apparatus (OMPA) comprising a lid, a bucket, a bucket motor, a bucket heater, a master control unit (MCU), and a safety monitor, the method comprising:
controlling OMPA functionality via the MCU;
receiving MCU feedback at the MCU, wherein the MCU is operative to enforce a safety protocol based on the received MCU feedback;
receiving safety monitor feedback at the safety monitor, wherein the safety monitor is operative to enforce the safety protocol based on the received safety monitor feedback; and
jointly enforcing the safety protocol, via the MCU and the safety monitor, by cutting power to the bucket motor and the bucket heater when the received MCU feedback or the received safety monitor feedback includes data that require enforcement of the safety protocol.

2. The method of claim 1, wherein the received MCU feedback is obtained from sources that are mutually exclusive to sources that provide the received safety monitor feedback.

3. The method of claim 1, wherein the received MCU feedback comprises first lid open status obtained from a first lid switch and first bucket temperature obtained from a first temperature sensor, and wherein the received safety monitor feedback comprises second lid open status obtained from a second lid switch and a second bucket temperature obtained from a second temperature sensor.

4. The method of claim 3, wherein when the first lid open status indicates that a lid is open, the MCU enables power cutoff, wherein when the second lid open status indicates that the lid is open, the safety monitor enables power cutoff, wherein when the first bucket temperature exceeds a temperature threshold, the MCU enables power cutoff, and wherein when the second bucket temperature exceeds the temperature threshold, the safety monitor enables power cutoff.

5. The method of claim 4, wherein the received safety monitor feedback further comprises third lid open status obtained from a physical safety switch, and wherein when the third lid open status indicates that the lid is open, the safety monitor enables power cutoff.

6. The method of claim 4, wherein the received safety monitor feedback further comprises bucket present status obtained from a bucket present switch, and wherein when the bucket present status indicates that a bucket is not present, the safety monitor enables power cutoff.

7. The method of claim 1, wherein the received MCU feedback comprises latch lock status obtained from a latch switch, and wherein when the latch lock status indicates that a latch is not locked, the MCU enables power cutoff.

8. The method of claim 1, wherein OMPA further comprises a lid heater, a lid fan, and an air treatment system fan, wherein said jointly enforcing the safety protocol, via the MCU and the safety monitor, further comprises cutting power to the lid heater, the lid fan, and the air treatment system fan when the received MCU feedback or the received safety monitor feedback includes data that require enforcement of the safety protocol.

9. The method of claim 1, further comprising:
if the lid is open based on received MCU feedback or the received safety monitor feedback, cutting power to the bucket motor and the bucket heater; and
if the lid is closed and predetermined conditions are met to restore power to the bucket motor and the bucket heater, restoring power to the bucket motor and the bucket heater.

10. The method of claim 1, further comprising verifying that a plurality of electrically enabled components are reporting normal operation, and wherein if any one of the plurality of electrically enabled components is not reporting normal operation, enforcing the safety protocol via the safety monitor.

11. A method for operating an organic matter processing apparatus (OMPA) comprising a lid, a lid heater, a lid fan, a bucket, a bucket motor, a bucket heater, an air treatment fan, a plurality of sensors, a plurality of switches, a mass sensing system, a master control unit (MCU), and a safety monitor, the method comprising:
executing OMPA processing to convert OMPA input to OMPA output;
monitoring operation of the bucket heater, the bucket motor, the lid heater, the lid fan, the air treatment fan, the mass sensing system, and the plurality of sensors;
adjusting the OMPA processing based on the monitoring; and
if monitored operation of any one of the bucket heater, the bucket motor, the lid heater, the lid fan, the air treatment fan, the mass sensing system, and the plurality of sensors is determined to be not normal, enforcing a safety protocol.

12. The method of claim 11, wherein enforcing a safety protocol comprises cutting power to the bucket motor and the bucket heater.

13. The method of claim 11, wherein enforcing a safety protocol comprises cutting power to the bucket motor, the bucket heater, the lid heater, the lid fan, and the AT fan.

14. The method of claim 11, further comprising:
receiving MCU feedback by the MCU, wherein the MCU is operative to enforce the safety protocol based on the received MCU feedback; and
receiving safety monitor feedback by the safety monitor, wherein the safety monitor is operative to enforce the safety protocol based on the received safety monitor feedback.

15. The method of claim 14, wherein the received MCU feedback comprises data received from a first subset of the plurality of sensors and a first subset of the plurality of switches and wherein the received safety monitor feedback comprises data received from a second subset of the plurality of sensors and a second subset of the plurality of sensors, wherein the first subset and the second subset of the plurality of sensors are mutually exclusive, and wherein the first subset and the second subset of the plurality of switches are mutually exclusive.

16. The method of claim 14, wherein the received MCU feedback comprises electrical characteristics of the bucket motor, the bucket heater, the lid fan, the lid heater, and the air treatment fan.

17. The method of claim 14, wherein the OMPA further comprises a lid motor operative to open and close the lid, wherein the received MCU feedback comprises electrical characteristics of the lid motor, wherein the MCU is operative to disable the lid motor if current consumption by the lid motor exceeds a current threshold.

18. The method of claim 11, further comprising confirming co-dependent components are operating within predetermined operating criteria.

19. The method of claim 18, wherein said confirming co-dependent components are operating within predetermined operating criteria comprises:
confirming that the lid fan is operating before activating the lid heater;
confirming that the lid fan is operating before activating the bucket heater; and
confirming that the bucket motor is operating before activating the bucket heater.

20. The method of claim 11, further comprising:
detecting receipt of OMPA input via the mass sensor system;
determining if mass of the received OMPA input contained the bucket is above a predetermined mass threshold;
if the determined mass is above the predetermined mass threshold, executing the OMPA processing; and
if the determined mass is not above the predetermined mass threshold, suspending operation of the bucket heater.

21. The method of claim 11, further comprising:
sanitizing OMPA input;
deactivating the bucket heater, the bucket motor, and the lid heater when the sanitizing is complete; and
running the lid fan to cool the bucket when the sanitizing is complete.

22. The method of claim 11, further comprising:
preventing the lid from opening while a bucket temperature exceeds a temperature threshold.

23. The method of claim 11, further comprising:
preventing the lid from opening if a lid lock function is enabled.

24. The method of claim 11, wherein the plurality of sensors comprise at least two temperature/humidity sensors, at least two bucket temperature sensors, and at least two volatile organic compound sensors.

25. The method of claim 11, wherein the plurality of switches comprises at least two lid switches and a latch switch.

26. The method of claim 25, wherein the plurality of switches further comprises a pedal switch and a bucket present switch.

* * * * *